(12) United States Patent
Gao et al.

(10) Patent No.: US 11,343,807 B2
(45) Date of Patent: May 24, 2022

(54) PUCCH TRANSMISSION METHOD, USER EQUIPMENT AND APPARATUS

(71) Applicant: CHINA ACADEMY OF TELECOMMUNICATIONS TECHNOLOGY, Beijing (CN)

(72) Inventors: Xuejuan Gao, Beijing (CN); Ekpenyong Tony, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 172 days.

(21) Appl. No.: 16/638,314

(22) PCT Filed: Jun. 26, 2018

(86) PCT No.: PCT/CN2018/092949
§ 371 (c)(1),
(2) Date: Feb. 11, 2020

(87) PCT Pub. No.: WO2019/029287
PCT Pub. Date: Feb. 14, 2019

(65) Prior Publication Data
US 2020/0229178 A1    Jul. 16, 2020

(30) Foreign Application Priority Data
Aug. 11, 2017   (CN) .......................... 201710687816.X

(51) Int. Cl.
*H04W 72/04*   (2009.01)
*H04L 5/00*    (2006.01)

(52) U.S. Cl.
CPC ....... *H04W 72/0413* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 2014/0086174 A1* | 3/2014 | Nam | ..................... | H04L 1/0026 370/329 |
| 2014/0119266 A1* | 5/2014 | Ng | ..................... | H04L 27/2602 370/312 |

(Continued)

FOREIGN PATENT DOCUMENTS

| | | |
|---|---|---|
| CN | 102098151 A | 6/2011 |
| CN | 105556869 A | 5/2016 |

(Continued)

OTHER PUBLICATIONS

ZTE "UL beam management for NR MIMO", 3GPP TSG RAN WG1 NR Ad-Hoc#2, Qingdao, P.R. China Jun. 27-30, 2017, total 8 pages, R1-1710184.

(Continued)

*Primary Examiner* — Michael J Moore, Jr.
*Assistant Examiner* — Gautam Sharma
(74) *Attorney, Agent, or Firm* — Kilpatrick Townsend & Stockton, LLP

(57) ABSTRACT

Disclosed are a physical uplink control channel (PUCCH) transmission method, a user equipment and an apparatus, used to solve the technical problem in existing technology wherein there is no specific method or apparatus to support a PUCCH transmission scenario in a new wireless communication system. The PUCCH transmission method comprises: on the basis of an acquired indication signaling, determining an uplink beam used when carrying out PUCCH transmission; and carrying out PUCCH transmission using the determined uplink beam.

20 Claims, 3 Drawing Sheets

(56) References Cited

U.S. PATENT DOCUMENTS

| | | | |
|---|---|---|---|
| 2014/0254516 A1* | 9/2014 | Lee | H04L 5/0016 370/329 |
| 2014/0334402 A1* | 11/2014 | Chen | H04B 7/024 370/329 |
| 2015/0029966 A1* | 1/2015 | Park | H04L 5/0053 370/329 |
| 2015/0207600 A1* | 7/2015 | Park | H04W 56/0005 370/329 |
| 2015/0230214 A1* | 8/2015 | Tong | H04W 72/042 370/329 |
| 2015/0236828 A1* | 8/2015 | Park | H04L 27/2656 375/340 |
| 2015/0312903 A1* | 10/2015 | Prasad | H04B 7/024 370/329 |
| 2015/0312958 A1* | 10/2015 | Cheng | H04L 5/0048 370/252 |
| 2016/0006547 A1 | 1/2016 | Kang et al. | |
| 2016/0105882 A1* | 4/2016 | Park | H04L 5/0053 370/329 |
| 2018/0054797 A1 | 2/2018 | Islam et al. | |
| 2018/0323855 A1* | 11/2018 | Noh | H04B 7/088 |
| 2019/0045494 A1* | 2/2019 | Ho | H04W 72/042 |
| 2019/0074880 A1* | 3/2019 | Frenne | H04B 7/024 |
| 2019/0215044 A1* | 7/2019 | Noh | H04B 7/0626 |
| 2019/0261383 A1* | 8/2019 | Kwak | H04L 1/1607 |
| 2020/0213058 A1* | 7/2020 | Choi | H04L 5/0094 |

FOREIGN PATENT DOCUMENTS

| | | |
|---|---|---|
| CN | 105940699 A | 9/2016 |
| EP | 3534636 A1 | 9/2019 |
| EP | 3624529 A1 | 3/2020 |
| JP | 2020504477 A | 2/2020 |
| TW | 201722182 A | 6/2017 |
| WO | 2016152655 A1 | 9/2016 |
| WO | 2017022902 A1 | 2/2017 |
| WO | 2018172994 A1 | 9/2018 |

OTHER PUBLICATIONS

ZTE, ZTE Microelectronics "QCL/QCB design for UL MIMO", 3GPP TSG RAN WG1 Meeting #88bis, Spokane, USA, Apr. 3-7, 2017, total 6 pages, R1-1704416.

Qualcomm Incorporated, "Control channel multi-beam operation", TSG-RAN WG1 #88bis, Spokane, USA, total 5 pages, R1-1705583.

Xinwei, "Beam Management Views and Designs", 3GPP TSG RAN WG1 Meeting #86b, R1-1609691, Oct. 14, 2016.

Qualcomm Incorporated, "Discussion on QCL", 3GPP TSG RAN WG1 #89, R1-1708601, Hangzhou, China May 15-19, 2017.

Nokia, Alcatel-Lucent Shanghai Bell, "BPL definition and Spatial QCL time indication", 3GPP TSG RAN WG1#89 R1-1708906, Hangzhou, P.R. China May 15-19, 2017.

* cited by examiner

PUCCH TRANSMISSION METHOD, USER EQUIPMENT AND APPARATUS

This application is a National Stage of International Application No. PCT/CN2018/092949, filed Jun. 26, 2018, which claims priority to China Patent Application No. 201710687816.X, filed with Chinese Patent Office on Aug. 11, 2017 and entitled "PUCCH Transmission Method, User Equipment and Apparatus", which is hereby incorporated by reference in its entirety.

FIELD

The present disclosure relates to the field of communications, and more particularly to a Physical Uplink Control Channel (PUCCH) transmission method, user equipment and an apparatus.

BACKGROUND

As the demand for mobile communication services develops and changes, organizations such as the International Telecommunication Union (ITU) and the 3rd Generation Partnership Project (3GPP) are beginning to research new wireless communication systems, such as a 5 Generation New RAT (5G NR).

A new working scene is defined in the new wireless communication systems. Two Transmission and Reception Points (TRPs) separately transmit a Physical Downlink Control Channel (PDCCH) and a corresponding Physical Downlink Shared Channel (PDSCH) to the same terminal. The PDCCHs and the PDSCHs from different TRPs are transmitted by using different beams. In this scene, there is no definite method how the corresponding terminal uses different TRPs of different beams for PUCCH transmission.

SUMMARY

Embodiments of the present disclosure provide a PUCCH transmission method, User Equipment (UE) and an apparatus, in order to solve the technical problem that there is no definite method or apparatus in the related art to support a PUCCH transmission scene in a new wireless communication system.

In a first aspect, the embodiment of the present disclosure provides a PUCCH transmission method, including: determining an uplink beam used for PUCCH transmission based on an acquired indication signaling; and performing the PUCCH transmission with the determined uplink beam.

In some embodiments, the step of determining the uplink beam used for PUCCH transmission based on the acquired indication signaling includes: determining a Beam Pair Linkage (BPL) based on the acquired indication signaling, where the BPL is configured to determine the uplink beam used for the PUCCH transmission or a Quasi-Co-Location (QCL) relationship between a Demodulation Reference Signal (DMRS) port of the PUCCH and a port on a resource of a first reference signal.

The step of performing the PUCCH transmission with the determined uplink beam includes: performing the PUCCH transmission with the uplink beam corresponding to the BPL; or, determining the QCL relationship between the DMRS port of the PUCCH and the port on the resource of the first reference signal according to the BPL, and performing the PUCCH transmission by the QCL relationship.

In some embodiments, the step of determining the uplink beam used for the PUCCH transmission based on the acquired indication signaling includes: determining a beam index for identifying the uplink beam for the PUCCH transmission based on the acquired indication signaling; and the step of performing the PUCCH transmission with the determined uplink beam includes: performing the PUCCH transmission with the uplink beam corresponding to the beam index.

In some embodiments, the step of determining the uplink beam used for PUCCH transmission based on the acquired indication signaling includes: determining QCL relationships between the DMRS port of the PUCCH and all the ports or the appointed ports on the resource of the first reference signal based on the acquired indication signaling; and the step of performing the PUCCH transmission with the determined uplink beam includes: performing the PUCCH transmission by the QCL relationships.

In some embodiments, the step of determining the QCL relationships between the DMRS port of the PUCCH and all the ports or the appointed ports on the resource of the first reference signal based on the acquired indication signaling, and performing the PUCCH transmission by the QCL relationships includes the following operations.

Determining a resource of a first reference signal in a plurality of pre-configured resources of the first reference signal based on an acquired indication signaling; determining that the DMRS port of the PUCCH and the port on the determined resource of the first reference signal have a QCL relationship; and performing the PUCCH transmission by the QCL relationship.

Or, determining a resource of a first reference signal in a plurality of pre-configured resources of the first reference signal and at least one port on the determined resource of the first reference signal based on the acquired indication signaling; determining that the DMRS port of the PUCCH and the at least one port on the determined resource of the first reference signal have a QCL relationship; and performing the PUCCH transmission by the QCL relationships.

In some embodiments, the step of determining the uplink beam used for the PUCCH transmission based on the acquired indication signaling includes: determining the uplink beam used for the PUCCH transmission based on an acquired high-layer signaling.

In some embodiments, the step of determining the uplink beam used for the PUCCH transmission based on the acquired high-layer signaling includes: informing, by the high-layer signaling, an uplink beam only, and determining the uplink beam informed by the high-layer signaling to perform the PUCCH transmission based on the acquired high-layer signaling.

In some embodiments, the step of determining the uplink beam used for the PUCCH transmission based on the acquired high-layer signaling includes the following operations.

Informing, by the high-layer signaling, a plurality of uplink beams, where each uplink beam corresponds to a downlink beam or a group of downlink beams; and when a PDCCH and/or a PDSCH using the downlink beam-x is received, and the downlink beam-x corresponds to a first uplink beam in the plurality of uplink beams informed by the high-layer signaling: determining that the first uplink beam is used for the PUCCH transmission, where the PUCCH carries at least an acknowledgement (ACK)/a non-acknowledgement (NACK) related to the PDCCH and/or PDSCH using the downlink beam-x.

Or, informing, by the high-layer signaling, a plurality of uplink beams, where each uplink beam corresponds to a downlink beam or a group of downlink beams; and when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: determining that the first uplink beam is used to execute the following operation: transmitting the PUCCH configured to carry the ACK/NACK related to the PDCCH and/or PDSCH using the downlink beam-x, and determining that the second uplink beam is used to execute the following operation: transmitting the PUCCH configured to carry the ACK/NACK related to the PDCCH and/or PDSCH using the downlink beam-y; or, determining that the first uplink beam is used to execute the following operation: transmitting the ACK/NACK related to the PDCCH and/or PDSCH using the downlink beam-x and the ACK/NACK related to the PDCCH and/or PDSCH using the downlink beam-y on the same PUCCH.

Or, informing, by the high-layer signaling, a plurality of uplink beams, where each uplink beam corresponds to a downlink beam or a group of downlink beams; and when only the PDCCH and/or PDSCH using the downlink beam-y is received, and the downlink beam-y corresponds to a second uplink beam in the plurality of uplink beams informed by the high-layer signaling: determining that the second uplink beam is used to perform the PUCCH transmission; or, determining that the first uplink beam is used to perform the PUCCH transmission, where the first uplink beam is different from the second uplink beam, and the PUCCH carries the ACK/NACK related to the PDCCH and/or PDSCH using the downlink beam-y.

In some embodiments, the step of determining the uplink beam used for PUCCH transmission based on the acquired indication signaling includes: determining the uplink beam used for the PUCCH transmission based on an indication signaling received from the PDCCH.

In some embodiments, the ACK/NACK corresponding to the PDCCH is carried in the PUCCH, and the PDCCH indicates a downlink Semi-persistent Scheduling (SPS) resource to be released; and/or, the PDCCH corresponds to a PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, any one or a combination of the following methods is used.

Method 1: taking uplink beams determined based on the indication signalings in the plurality of PDCCHs as the uplink beams used for the PUCCH transmission, where indication contents of the various indication signalings received by the plurality of PDCCHs are the same; and transmitting the ACKs/NACKs related to the plurality of PDCCHs on the same PUCCH with the determined uplink beams.

Method 2: determining at least one uplink beam based on various indication signalings received through the plurality of PDCCHs, and selecting an uplink beam from the at least one uplink beam as the uplink beam used for the PUCCH transmission; and transmitting the ACKs/NACKs related to the plurality of PDCCHs on the same PUCCH with the determined uplink beams.

Method 3: selecting a PDCCH from the plurality of PDCCHs, and determining the uplink beam used for the PUCCH transmission according to the indication signaling received from the selected PDCCH; and transmitting the ACKs/NACKs related to the plurality of PDCCHs on the same PUCCH with the determined uplink beam.

In some embodiments, the step of selecting the uplink beam from the at least one uplink beam as the uplink beam used for the PUCCH transmission includes the following operations.

Selecting the uplink beam in the at least one uplink beam as the uplink beam used for the PUCCH transmission according to a pre-configured or appointed uplink beam priority level or cell priority level.

Or, when the at least one uplink beam includes a pre-configured or appointed uplink main beam, determining that the pre-configured or appointed uplink main beam is taken as the uplink beam used for the PUCCH transmission; and when the at least one uplink beam does not include the uplink main beam, determining that an auxiliary beam with a specified number in the at least one uplink beam is taken as the uplink beam used for the PUCCH transmission, where the uplink main beam is pre-configured or appointed.

Or, when the at least one uplink beam includes an uplink beam corresponding to a pre-configured or appointed main cell, determining that the uplink beam corresponding to the pre-configured or appointed main cell is taken as the uplink beam used for the PUCCH transmission; and when the at least one uplink beam does not include an uplink beam corresponding to the main cell, determining that an uplink beam corresponding to an auxiliary cell is taken as the uplink beam used for the PUCCH transmission.

In some embodiments, the step of selecting the PDCCH from the plurality of PDCCHs, and determining the uplink beam used for the PUCCH transmission according to the indication signaling received from the selected PDCCH includes the following operations.

Selecting a PDCCH with the highest priority level from the plurality of PDCCHs according to a pre-configured or appointed downlink beam priority level, downlink beam group priority level or cell priority level, and determining the uplink beam used for the PUCCH transmission according to the indication signaling received from the selected PDCCH.

Or, determining the uplink beam used for the PUCCH transmission according to the indication signaling in a PDCCH transmitted by using a downlink main beam; and/or, determining the uplink beam used for the PUCCH transmission according to the indication signaling in a PDCCH received from a main cell; and, when no PDCCH transmitted by using the downlink main beam is received or no PDCCH is received from the main cell, determining the uplink beam used for the PUCCH transmission according to the indication signaling in a received PDCCH using a specifically numbered downlink auxiliary beam; and/or, determining the uplink beam used for the PUCCH transmission according to the indication signaling in a PDCCH received from a specifically numbered auxiliary cell, where the downlink main beam and the main cell are pre-configured or appointed.

Or, determining the uplink beam used for the PUCCH transmission according to the indication signaling in a PDCCH transmitted by using at least one downlink beam in a downlink main beam group; and when no PDCCH using any one downlink beam in the downlink main beam group is received, determining the uplink beam used for the PUCCH transmission according to the indication signaling in a PDCCH transmitted by using a downlink beam in an auxiliary beam group, where when a beam group includes a plurality of downlink beams, contents indicated by the indication signalings in the plurality of PDCCHs needing to perform the ACK/NACK feedbacks at the same moment in the same downlink beam group are the same, where the downlink main beam group is pre-configured or appointed.

In some embodiments, when a plurality of downlink beams and a plurality of uplink beams are divided into a plurality of groups, and indication signalings in PDCCHs using downlink beams in the same group indicate uplink beams in the same group, the method further includes: transmitting a PUCCH carrying an ACK/NACK related to a PDCCH using a downlink beam by an uplink beam determined according to an indication signaling in the PDCCH using the downlink beam, where the downlink beam and the uplink beam are in the same group.

In some embodiments, when a plurality of downlink beams and a plurality of uplink beams are divided into a plurality of groups, and the indication signalings in the PDCCHs using the downlink beams in the same group indicate the uplink beams in the same group, the method further includes: transmitting the PUCCH carrying the ACK/NACK related to the PDCCH using a downlink beam-x by a first uplink beam determined according to the indication signaling in the PDCCH using the downlink beam-x, where the downlink beam-x and the first uplink beam are in the same group; transmitting the PUCCH carrying the ACK/NACK related to the PDCCH using a downlink beam-y by a second uplink beam determined according to the indication signaling in the PDCCH using the downlink beam-y, where the downlink beam-y and the second uplink beam are in the same group. The indication contents of the indication signalings in the PDCCHs received by the downlink beams of the same group are the same.

In some embodiments, the step of determining the uplink beam used for PUCCH transmission based on the acquired indication signaling includes the following operations.

Pre-configuring, by the high-layer signaling, a downlink main beam, determining an uplink main beam according to the downlink main beam, and determining that the uplink main beam is taken as the uplink beam used for the PUCCH transmission.

Or, pre-configuring, by the high-layer signaling, a main beam pair including an uplink main beam and a downlink main beam, and determining that the uplink main beam in the main beam pair is taken as the uplink beam used for the PUCCH transmission.

Or, pre-configuring, by the high-layer signaling, a plurality of beam groups, where each beam group corresponds to an uplink main beam, and each beam group includes one or more downlink beams; when the PDCCH and/or PDSCH transmitted by using the downlink beam in the first beam group is received, determining that the first uplink main beam corresponding to the first beam group is used for the PUCCH transmission, where the PUCCH carries at least the ACK/NACK related to the PDCCH and/or PDSCH transmitted by using the downlink beam in the first beam group.

Or, pre-configuring, by the high-layer signaling, a plurality of beam groups, where each beam group corresponds to an uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: determining that the first uplink main beam corresponding to the first beam group is used to transmit the PUCCH carrying the ACK/NACK related to the PDCCH and/or PDSCH transmitted by using the beams in the first beam group, and determining that the second uplink main beam corresponding to the second beam group is used to transmit the PUCCH carrying the ACK/NACK related to the PDCCH and/or PDSCH transmitted by using the beams in the second beam group; or, determining that the first uplink main beam corresponding to the first beam group is used to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, pre-configuring, by the high-layer signaling, a plurality of beam groups, where each beam group corresponds to an uplink main beam, and each beam group includes one or more downlink beams; when only the PDCCH and/or PDSCH transmitted by using the downlink beam in the second beam group is received, determining that the second uplink main beam corresponding to the second beam group is used for the PUCCH transmission, or determining that the first uplink main beam corresponding to the first beam group is used for the PUCCH transmission, where the PUCCH carries the ACK/NACK related to the PDCCH and/or PDSCH transmitted by using the downlink beam in the second beam group.

In a second aspect, the embodiment of the present disclosure provides a PUCCH transmission method, including: transmitting an indication signaling, the indication signaling being used by a terminal to determine an uplink beam used for PUCCH transmission; and determining that the terminal transmits a PUCCH according to the uplink beam determined on the basis of the indication signaling.

In some embodiments, the step of transmitting the indication signaling, the indication signaling being used by the terminal to determine the uplink beam used for PUCCH transmission includes: indicating a BPL based on the indication signaling, where the BPL is configured to determine the uplink beam used for the PUCCH transmission or a QCL relationship between a DMRS port of the PUCCH and a port on a resource of a first reference signal.

The step of determining that the terminal transmits the PUCCH according to the uplink beam determined on the basis of the indication signaling includes: determining that the terminal transmits the PUCCH with the uplink beam corresponding to the BPL; or, determining that the terminal determines the QCL relationship between the DMRS port of the PUCCH and the port on the resource of the first reference signal, and transmits the PUCCH by the QCL relationship.

In some embodiments, the step of transmitting the indication signaling, the indication signaling being used by the terminal to determine the uplink beam used for the PUCCH transmission includes: indicating a beam index for identifying the uplink beam for the PUCCH transmission by the indication signaling.

The step of determining that the terminal transmits the PUCCH according to the uplink beam determined on the basis of the indication signaling includes: determining that the terminal transmits the PUCCH with the uplink beam corresponding to the beam index.

In some embodiments, the step of transmitting the indication signaling, the indication signaling being used by the terminal to determine the uplink beam used for PUCCH transmission includes: indicating QCL relationships between the DMRS port of the PUCCH and all the ports or the appointed ports on the resource of the first reference signal by the indication signaling.

The step of determining that the terminal transmits the PUCCH according to the uplink beam determined on the basis of the indication signaling includes: determining that the terminal transmits the PUCCH by the QCL relationships.

In some embodiments, the step of indicating the QCL relationships between the DMRS port of the PUCCH and all the ports or the appointed ports on the resource of the first reference signal by the indication signaling, and performing the PUCCH transmission by the QCL relationships includes the following operations.

Indicating a resource of a first reference signal in a plurality of pre-configured resources of the first reference signal by the indication signaling; determining that the terminal transmits the PUCCH according to the QCL relationship between the DMRS port of the PUCCH and the port on the indicated first reference signal resource.

Or, indicating at least one port on the resource of the first reference signal in a plurality of pre-configured resources of the first reference signal by the indication signaling; determining that the terminal transmits the PUCCH according to the QCL relationship between the DMRS port of the PUCCH and the at least one port on a resource of a first reference signal.

In some embodiments, the step of transmitting the indication signaling, the indication signaling being used by the terminal to determine the uplink beam used for the PUCCH transmission includes: transmitting the indication signaling through a high-layer signaling.

In some embodiments, the step of transmitting the indication signaling through the high-layer signaling includes: informing, by the high-layer signaling, an uplink beam, and determining that the terminal transmits the PUCCH with the uplink beam informed by the high-layer signaling.

In some embodiments, the step of transmitting the indication signaling through the high-layer signaling includes the following operations.

Informing, by the high-layer signaling, a plurality of uplink beams, where each uplink beam corresponds to a downlink beam or a group of downlink beams; and when a PDCCH and/or a PDSCH using a downlink beam-x is received, and the downlink beam-x corresponds to a first uplink beam in the plurality of uplink beams informed by the high-layer signaling: determining that the terminal transmits the PUCCH by the first uplink beam, where the PUCCH carries at least an ACK/NACK related to the PDCCH and/or PDSCH using the downlink beam-x.

Or, informing, by the high-layer signaling, a plurality of uplink beams, where each uplink beam corresponds to a downlink beam or a group of downlink beams; and when a PDCCH and/or a PDSCH using a downlink beam-x is received, and the downlink beam-x corresponds to a first uplink beam in the plurality of uplink beams informed by the high-layer signaling, a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: determining that the terminal uses the first uplink beam to execute the following operations: transmitting the PUCCH configured to carry the ACK/NACK related to the PDCCH and/or PDSCH using the downlink beam-x, and determining that the terminal uses the second uplink beam to execute the following operations: transmitting the PUCCH configured to carry the ACK/NACK related to the PDCCH and/or PDSCH using the downlink beam-y; or, determining that the terminal uses the first uplink beam to execute the following operation: transmitting the ACK/NACK related to the PDCCH and/or PDSCH using the downlink beam-x and the ACK/NACK related to the PDCCH and/or PDSCH using the downlink beam-y on the same PUCCH.

Or, informing, by the high-layer signaling, a plurality of uplink beams, where each uplink beam corresponds to a downlink beam or a group of downlink beams; and when only the PDCCH and/or PDSCH using the downlink beam-y is received, and the downlink beam-y corresponds to a second uplink beam in the plurality of uplink beams informed by the high-layer signaling: determining that the terminal transmits the PUCCH by using the second uplink beam; or, determining that the terminal transmits the PUCCH by using the first uplink beam, wherein the first uplink beam is different from the second uplink beam; where the PUCCH carries the ACK/NACK related to the PDCCH and/or PDSCH using the downlink beam-y.

In some embodiments, the step of transmitting the indication signaling, the indication signaling being used by the terminal to determine the uplink beam used for PUCCH transmission includes: transmitting the indication signaling through the PDCCH.

In some embodiments, the ACK/NACK corresponding to the PDCCH is carried in the PUCCH, and the PDCCH indicates a downlink SPS resource to be released; and/or, the PDCCH corresponds to a PDSCH, and an ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, the terminal is determined to use any one or a combination of the following methods.

Method 1: taking uplink beams determined based on the indication signalings in the plurality of PDCCHs as the uplink beams used for the PUCCH transmission, where indication contents of the various indication signalings received by the plurality of PDCCHs are the same; and transmitting the ACKs/NACKs related to the plurality of PDCCHs on the same PUCCH with the determined uplink beams.

Method 2: determining at least one uplink beam based on various indication signalings received through the plurality of PDCCHs, and selecting an uplink beam from the at least one uplink beam as the uplink beam used for the PUCCH transmission; and transmitting the ACKs/NACKs related to the plurality of PDCCHs on the same PUCCH with the determined uplink beam.

Method 3: selecting a PDCCH from the plurality of PDCCHs, and determining the uplink beam used for the PUCCH transmission according to an indication signaling received from the selected PDCCH; and transmitting the ACKs/NACKs related to the plurality of PDCCHs on the same PUCCH with the determined uplink beam.

In some embodiments, the step of selecting the uplink beam from the at least one uplink beam as the uplink beam used for the PUCCH transmission includes the following operations.

Selecting the uplink beam in the at least one uplink beam as the uplink beam used for the PUCCH transmission according to a pre-configured or appointed uplink beam priority level or cell priority level.

Or, when the at least one uplink beam includes a pre-configured or appointed uplink main beam, determining that the pre-configured or appointed uplink main beam is taken as the uplink beam used for the PUCCH transmission; and when the at least one uplink beam does not include an uplink main beam, determining that an auxiliary beam with a specified number in the at least one beam is taken as the uplink beam used for the PUCCH transmission, where the uplink main beam is pre-configured or appointed.

Or, when the at least one uplink beam includes an uplink beam corresponding to a pre-configured or appointed main cell, determining that the uplink beam corresponding to the pre-configured or appointed main cell is taken as the uplink beam used for the PUCCH transmission; and when the at least one uplink beam does not include an uplink beam corresponding to the main cell, determining that an uplink beam corresponding to an auxiliary cell is taken as the uplink beam used for the PUCCH transmission.

In some embodiments, the step of selecting the PDCCH from the plurality of PDCCHs, and determining the uplink beam used for the PUCCH transmission according to the indication signaling received from the selected PDCCH includes the following operations.

Selecting a PDCCH with the highest priority level from the plurality of PDCCHs according to a pre-configured or appointed downlink beam priority level, downlink beam group priority level or cell priority level, and determining the uplink beam used for the PUCCH transmission according to the indication signaling received from the selected PDCCH.

Or, determining the uplink beam used for the PUCCH transmission according to the indication signaling in a PDCCH transmitted by using a downlink main beam; and/or, determining the uplink beam used for the PUCCH transmission according to the indication signaling in a PDCCH received from a main cell; and, when no PDCCH transmitted by using the downlink main beam is received or no PDCCH is received from the main cell, determining the uplink beam used for the PUCCH transmission according to the indication signaling in a received PDCCH using a specifically numbered downlink auxiliary beam; and/or, determining the uplink beam used for the PUCCH transmission according to the indication signaling in a PDCCH received from a specifically numbered auxiliary cell, where the downlink main beam and the main cell are pre-configured or appointed.

Or, determining the uplink beam used for the PUCCH transmission according to the indication signaling in a PDCCH transmitted by at least one downlink beam in a downlink main beam group; and when no PDCCH using any one downlink beam in the downlink main beam group is received, determining the beam used for the PUCCH transmission according to the indication signaling in a PDCCH transmitted by using a downlink beam in an auxiliary beam group, wherein if a beam group includes a plurality of downlink beams, contents indicated by the indication signalings in the plurality of PDCCHs needing the ACK/NACK feedback at the same moment in the same downlink beam group are the same, where the downlink main beam group is pre-configured or appointed.

In some embodiments, when a plurality of downlink beams and a plurality of uplink beams are divided into a plurality of groups, and indication signalings in PDCCHs using downlink beams in the same group indicate uplink beams in the same group, the terminal is determined to execute following operations: determining that indication contents of indication signalings in PDCCHs received by using downlink beams of the same group are the same; transmitting a PUCCH carrying an ACK/NACK related to a PDCCH using a downlink beam by an uplink beam determined according to an indication signaling in the PDCCH using the downlink beam, where the downlink beam and the uplink beam are in the same group.

In some embodiments, when a plurality of downlink beams and a plurality of uplink beams are divided into a plurality of groups, the indication signalings in the PDCCHs using the downlink beams in the same group indicate the uplink beams in the same group, and the terminal is determined to execute the following processes: determining that the indication contents of the indication signalings in the PDCCHs received by the downlink beams of the same group are the same; transmitting the PUCCH carrying the ACK/NACK related to the PDCCH using the downlink beam-x by the first uplink beam determined according to the indication signaling in the PDCCH using the downlink beam-x, wherein the downlink beam-x and the first uplink beam are in the same group; transmitting the PUCCH carrying the ACK/NACK related to the PDCCH using the downlink beam-y by the second uplink beam determined according to the indication signaling in the PDCCH using the downlink beam-y, wherein the downlink beam-y and the second uplink beam are in the same group.

In some embodiments, the step of transmitting the indication signaling, the indication signaling being used by the terminal to determine the uplink beam used for the PUCCH transmission includes the following operations.

Pre-configuring, by the high-layer signaling, a downlink main beam, determining that the terminal determines an uplink main beam according to the downlink main beam and takes the uplink main beam as the uplink beam used for the PUCCH transmission.

Or, pre-configuring, by the high-layer signaling, a main beam pair including an uplink main beam and a downlink main beam, and determining that the terminal takes the uplink main beam in the main beam pair as the uplink beam used for the PUCCH transmission.

Or, pre-configuring, by the high-layer signaling, a plurality of beam groups, wherein each beam group corresponds to an uplink main beam, and each beam group includes one or more downlink beams; when the PDCCH and/or PDSCH transmitted by using the downlink beam in the first beam group is received, determining that the terminal transmits the PUCCH by using the first uplink main beam corresponding to the first beam group, wherein the PUCCH at least carries the ACK/NACK related to the PDCCH and/or PDSCH transmitted by using the downlink beam in the first beam group.

Or, pre-configuring, by the high-layer signaling, a plurality of beam groups, wherein each beam group corresponds to an uplink main beam, and each beam group includes one or more downlink beams; when the PDCCH and/or PDSCH transmitted by using a downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and an ACK/NACK related to the PDCCH and/or PDSCH transmitted by using the downlink beam in the first beam group are transmitted at the same moment: determining that the terminal uses the first uplink main beam corresponding to the first beam group to transmit the PUCCH carrying the ACK/NACK related to the PDCCH and/or PDSCH transmitted by using the beams in the first beam group; and determining that the terminal uses the second uplink main beam corresponding to the second beam group to transmit the PUCCH carrying the ACK/NACK related to the PDCCH and/or PDSCH transmitted by using the beams in the second beam group; or, determining that the terminal uses the first uplink main beam corresponding to the first beam group to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, pre-configuring, by the high-layer signaling, a plurality of beam groups, wherein each beam group corresponds to an uplink main beam, and each beam group includes one or more downlink beams; when only the PDCCH and/or PDSCH transmitted by using the downlink beam in the second beam group is received, determining that the terminal transmits the PUCCH by using the second uplink main beam corresponding to the second beam group, or determining that the terminal transmits the PUCCH by using the first uplink main beam corresponding to the first beam group, where the PUCCH carries the ACK/NACK related to the PDCCH and/or PDSCH transmitted by using the downlink beam in the second beam group.

In a third aspect, the embodiment of the present disclosure provides another UE. The UE includes a processor, and a memory and a transceiver connected with the processor. The processor is configured to read a program in the memory and execute the following processes: determining an uplink beam used for PUCCH transmission based on an acquired indication signaling; and controlling the transceiver to perform the PUCCH transmission with the determined uplink beam.

In some embodiments, the step of determining the uplink beam used for PUCCH transmission based on the acquired indication signaling includes: determining a BPL based on the acquired indication signaling, where the BPL is configured to determine the uplink beam used for the PUCCH transmission or a QCL relationship between a DMRS port of a PUCCH and a port on a resource of a first reference signal.

The process of controlling the transceiver to perform the PUCCH transmission with the determined uplink beam includes: controlling the transceiver to perform the PUCCH transmission with the uplink beam corresponding to the BPL; or, determining the QCL relationship between the DMRS port of the PUCCH and the port on the resource of the first reference signal according to the BPL, and controlling the transceiver to perform the PUCCH transmission by the QCL relationship.

In some embodiments, the step of determining the uplink beam used for PUCCH transmission based on the acquired indication signaling includes: determining a beam index for identifying the uplink beam for the PUCCH transmission based on the acquired indication signaling; and the process of controlling the transceiver to perform the PUCCH transmission with the determined uplink beam includes: controlling the transceiver to perform the PUCCH transmission with the uplink beam corresponding to the beam index.

In some embodiments, the step of determining the uplink beam used for PUCCH transmission based on the acquired indication signaling includes: determining QCL relationships between the DMRS port of the PUCCH and all the ports or the appointed ports on the resource of the first reference signal based on the acquired indication signaling; and the process of controlling the transceiver to perform the PUCCH transmission with the determined uplink beam includes: controlling the transceiver to perform the PUCCH transmission by the QCL relationships.

In some embodiments, the process of determining the QCL relationships between the DMRS port of the PUCCH and all the ports or the appointed ports on the resource of the first reference signal based on the acquired indication signaling, and performing the PUCCH transmission by the QCL relationships includes the following operations.

Determining a resource of a first reference signal in a plurality of pre-configured resources of the first reference signal based on an acquired indication signaling; determining that the DMRS port of the PUCCH and the port on the determined resource of the first reference signal have a QCL relationship; and controlling the transceiver to perform the PUCCH transmission by the QCL relationship.

Or, determining a resource of a first reference signal in a plurality of pre-configured resources of the first reference signal and at least one port on the resource of the first reference signal based on the acquired indication signaling; determining that the DMRS port of the PUCCH and the at least one port on the determined resource of the first reference signal have a QCL relationship; and controlling the transceiver to perform the PUCCH transmission by the QCL relationship.

In some embodiments, the process of determining the uplink beam used for PUCCH transmission based on the acquired indication signaling includes: determining the uplink beam used for the PUCCH transmission based on an acquired high-layer signaling.

In some embodiments, the process of determining the uplink beam used for the PUCCH transmission based on the acquired high-layer signaling includes: informing, by the high-layer signaling, an uplink beam, and determining that the uplink beam informed by the high-layer signaling is used to perform the PUCCH transmission based on the acquired high-layer signaling.

In some embodiments, the process of determining the uplink beam used for the PUCCH transmission based on the acquired high-layer signaling includes the following operations.

Informing, by the high-layer signaling, a plurality of uplink beams, where each uplink beam corresponds to a downlink beam or a group of downlink beams; and when a PDCCH and/or a PDSCH using a downlink beam-x is received, and the downlink beam-x corresponds to a first uplink beam in the plurality of beams informed by the high-layer signaling: determining that the first uplink beam is used for the PUCCH transmission, wherein the PUCCH at least carries an ACK/NACK related to the PDCCH and/or PDSCH using the downlink beam-x.

Or, informing, by the high-layer signaling, a plurality of uplink beams, where each uplink beam corresponds to a downlink beam or a group of downlink beams; and when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: determining that the first uplink beam is used to execute the following operations: controlling the transceiver to transmit the PUCCH configured to carry the ACK/NACK related to the PDCCH and/or PDSCH using the downlink beam-x, and determining that the second uplink beam is used to execute the following operations: transmitting the PUCCH configured to carry the ACK/NACK related to the PDCCH and/or PDSCH using the downlink beam-y; or, determining that the first uplink beam is used to execute the following operation: controlling the transceiver to transmit the ACK/NACK related to the PDCCH and/or PDSCH using the downlink beam-x and the ACK/NACK related to the PDCCH and/or PDSCH using the downlink beam-y on the same PUCCH.

Or, informing, by the high-layer signaling, a plurality of uplink beams, wherein each uplink beam corresponds to a downlink beam or a group of downlink beams; and when only the PDCCH and/or PDSCH using the downlink beam-y is received, and the downlink beam-y corresponds to a second uplink beam in the plurality of uplink beams informed by the high-layer signaling: determining that the second uplink beam is used to perform the PUCCH transmission; or, determining that the first uplink beam is used to perform the PUCCH transmission, wherein the first uplink beam is different from the second uplink beam, where the PUCCH carries the ACK/NACK related to the PDCCH and/or PDSCH using the downlink beam-y.

In some embodiments, the process of determining the uplink beam used for PUCCH transmission based on the acquired indication signaling includes: determining the uplink beam used for the PUCCH transmission based on an indication signaling received from the PDCCH.

In some embodiments, the ACK/NACK corresponding to the PDCCH is carried in the PUCCH, and the PDCCH is configured to indicate a downlink Semi-persistent Scheduling (SPS) resource to be released; and/or, the PDCCH corresponds to a PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, any one or a combination of the following methods is used.

Method 1: taking uplink beams determined based on the indication signalings in the plurality of PDCCHs as the uplink beams used for the PUCCH transmission, wherein indication contents of the various indication signalings received by the plurality of PDCCHs are the same; controlling the transceiver to transmit the ACKs/NACKs related to the plurality of PDCCHs on the same PUCCH with the determined uplink beams.

Method 2: determining at least one uplink beam based on various indication signalings received through the plurality of PDCCHs, and selecting an uplink beam from the at least one uplink beam as the uplink beam used for the PUCCH transmission; and controlling the transceiver to transmit the ACKs/NACKs related to the plurality of PDCCHs on the same PUCCH with the determined uplink beam.

Method 3: selecting a PDCCH from the plurality of PDCCHs, and determining the uplink beam used for the PUCCH transmission according to the indication signaling received from the selected PDCCH; and controlling the transceiver to transmit the ACKs/NACKs related to the plurality of PDCCHs on the same PUCCH with the determined uplink beam.

In some embodiments, the process of selecting a beam in the at least one uplink beam as the uplink beam used for the PUCCH transmission includes the following operations.

Selecting a beam in the at least one uplink beam as the uplink beam used for the PUCCH transmission according to a pre-configured or appointed uplink beam priority level or cell priority level.

Or, when the at least one uplink beam includes a pre-configured or appointed uplink main beam, determining that the uplink main beam is taken as the uplink beam used for the PUCCH transmission; and when the at least one uplink beam does not include the uplink main beam, determining that an auxiliary beam with a specified number in the at least one beam is taken as the uplink beam used for the PUCCH transmission, where the uplink main beam is pre-configured or appointed.

Or, when the at least one uplink beam includes an uplink beam corresponding to a pre-configured or appointed main cell, determining that the uplink beam corresponding to the main cell is taken as the uplink beam used for the PUCCH transmission; and when the at least one uplink beam does not include an uplink beam corresponding to the main cell, determining that an uplink beam corresponding to an auxiliary cell is taken as the uplink beam used for the PUCCH transmission.

In some embodiments, the process of selecting a PDCCH from the plurality of PDCCHs, and determining the uplink beam used for the PUCCH transmission according to the indication signaling received from the selected PDCCH includes the following operations.

Selecting a PDCCH with the highest priority level from the plurality of PDCCHs according to a pre-configured or appointed downlink beam priority level, downlink beam group priority level or cell priority level, and determining the uplink beam used for the PUCCH transmission according to the indication signaling received from the selected PDCCH.

Or, determining the uplink beam used for the PUCCH transmission according to the indication signaling in a PDCCH transmitted by using a downlink main beam; and/or, determining the uplink beam used for the PUCCH transmission according to the indication signaling in a PDCCH received from a main cell; and, when no PDCCH transmitted by using the downlink main beam is received or no PDCCH is received from the main cell, determining the uplink beam used for the PUCCH transmission according to the indication signaling in a received PDCCH using a specifically numbered downlink auxiliary beam; and/or, determining the uplink beam used for the PUCCH transmission according to the indication signaling in a PDCCH received from a specifically numbered auxiliary cell, where the downlink main beam and the main cell are pre-configured or appointed.

Or, determining the uplink beam used for the PUCCH transmission according to the indication signaling in a PDCCH transmitted by at least one downlink beam in a downlink main beam group; and when no PDCCH using any one downlink beam in the downlink main beam group is received, determining the beam used for the PUCCH transmission according to the indication signaling in a PDCCH transmitted by using a downlink beam in an auxiliary beam group, where if a beam group includes a plurality of downlink beams, contents indicated by the indication signalings in the plurality of PDCCHs needing the ACK/NACK feedback at the same moment in the same downlink beam group are the same, where the downlink main beam group is pre-configured or appointed.

In some embodiments, when a plurality of downlink beams and a plurality of uplink beams are divided into a plurality of groups, and indication signalings in PDCCHs using downlink beams in the same group indicate uplink beams in the same group, the processor is configured to: determine that indication contents of the indication signalings in the PDCCHs received by the downlink beams of the same group are the same; transmit a PUCCH carrying an ACK/NACK related to a PDCCH using a downlink beam by an uplink beam determined according to an indication signaling in the PDCCH using the downlink beam, where the downlink beam and the uplink beam are in the same group.

In some embodiments, when a plurality of downlink beams and a plurality of uplink beams are divided into a plurality of groups, and the indication signalings in the PDCCHs using the downlink beams in the same group indicate the uplink beams in the same group, the following processes are realized: determining that the indication contents of the indication signalings in the PDCCHs received by the downlink beams of the same group are the same; controlling the transceiver to transmit the PUCCH carrying the ACK/NACK related to the PDCCH using the downlink beam-x by the first uplink beam determined according to the indication signaling in the PDCCH using the downlink beam-x, wherein the downlink beam-x and the first uplink beam are in the same group; and controlling the transceiver to transmit the PUCCH carrying the ACK/NACK related to the PDCCH using the downlink beam-y by the second uplink beam determined according to the indication signaling in the PDCCH using the downlink beam-y, wherein the downlink beam-y and the second uplink beam are in the same group.

In some embodiments, the process of determining the uplink beam used for PUCCH transmission based on the acquired indication signaling includes the following operations.

Pre-configuring, by the high-layer signaling, a downlink main beam, determining an uplink main beam according to the downlink main beam, and determining that the uplink main beam is taken as the uplink beam used for the PUCCH transmission.

Or, pre-configuring, by the high-layer signaling, a main beam pair including an uplink main beam and a downlink main beam, and determining that the uplink main beam in the main beam pair is taken as the uplink beam used for the PUCCH transmission.

Or, pre-configuring, by the high-layer signaling, a plurality of beam groups, wherein each beam group corresponds to an uplink main beam, and each beam group includes one or more downlink beams; when the PDCCH and/or PDSCH transmitted by using the downlink beam in the first beam group is received, determining that the first uplink main beam corresponding to the first beam group is used for the PUCCH transmission, where the PUCCH at least carries the ACK/NACK related to the PDCCH and/or PDSCH transmitted by using the downlink beam in the first beam group.

Or, pre-configuring, by the high-layer signaling, a plurality of beam groups, wherein each beam group corresponds to an uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: determining that the first uplink main beam corresponding to the first beam group is used to transmit the PUCCH carrying the ACK/NACK related to the PDCCH and/or PDSCH transmitted by using the beams in the first beam group; and determining that the second uplink main beam corresponding to the second beam group is used to transmit the PUCCH carrying the ACK/NACK related to the PDCCH and/or PDSCH transmitted by using the beams in the second beam group; or, determining that the first uplink main beam corresponding to the first beam group is used to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, pre-configuring, by the high-layer signaling, a plurality of beam groups, wherein each beam group corresponds to an uplink main beam, and each beam group includes one or more downlink beams; when only the PDCCH and/or PDSCH transmitted by using the downlink beam in the second beam group is received, determining that the second uplink main beam corresponding to the second beam group is used for the PUCCH transmission, or determining that the first uplink main beam corresponding to the first beam group is used for the PUCCH transmission, where the PUCCH carries the ACK/NACK related to the PDCCH and/or PDSCH transmitted by using the downlink beam in the second beam group.

In a sixth aspect, the embodiment of the present disclosure provides another apparatus. The apparatus includes a processor, and a memory and a transceiver connected with the processor. The processor is configured to read a program in the memory and execute the following processes: controlling the transceiver to transmit an indication signaling, the indication signaling being used by a terminal to determine an uplink beam used for PUCCH transmission; and determining that the terminal transmits a PUCCH according to the uplink beam determined on the basis of the indication signaling.

In some embodiments, the process of transmitting the indication signaling, the indication signaling being used by the terminal to determine the uplink beam used for PUCCH transmission includes: indicating a BPL based on the indication signaling, where the BPL is configured to determine the uplink beam used for the PUCCH transmission or a QCL relationship between a DMRS port of a PUCCH and a port on a resource of a first reference signal.

The process of determining that the terminal transmits the PUCCH according to the uplink beam determined on the basis of the indication signaling includes: determining that the terminal transmits the PUCCH with the uplink beam corresponding to the BPL; or, determining that the terminal determines the QCL relationship between the DMRS port of the PUCCH and the port on the resource of the first reference signal on the bais of the BPL, and transmits the PUCCH by the QCL relationship.

In some embodiments, the process of controlling the transceiver to transmit the indication signaling, the indication signaling being used by the terminal to determine the uplink beam used for PUCCH transmission includes: indicating a beam index for identifying the uplink beam for the PUCCH transmission by the indication signaling.

The process of determining that the terminal transmits the PUCCH according to the uplink beam determined on the basis of the indication signaling includes: determining that the terminal transmits the PUCCH with the uplink beam corresponding to the beam index.

In some embodiments, the process of controlling the transceiver to transmit the indication signaling, the indication signaling being used by the terminal to determine the uplink beam used for PUCCH transmission includes: indicating QCL relationships between the DMRS port of the PUCCH and all the ports or the appointed ports on the resource of the first reference signal by the indication signaling; and the process of determining that the terminal transmits the PUCCH according to the uplink beam determined on the basis of the indication signaling includes: determining that the terminal transmits the PUCCH by the QCL relationships.

In some embodiments, the process of indicating the QCL relationships between the DMRS port of the PUCCH and all the ports or the appointed ports on the resource of the first reference signal by the indication signaling, and performing the PUCCH transmission by the QCL relationships includes the following operations.

Indicating a resource of a first reference signal in a plurality of pre-configured resources of the first reference signal by the indication signaling; and determining that the terminal transmits the PUCCH according to the QCL relationship between the DMRS port of the PUCCH and the port on the resource of the first reference signal.

Or, indicating at least one port on a resource of a first reference signal in a plurality of pre-configured resources of the first reference signal by the indication signaling; determining that the terminal transmits the PUCCH according to the QCL relationship between the DMRS port of the PUCCH and the at least one port on the resource of the first reference signal.

In some embodiments, the process of controlling the transceiver to transmit the indication signaling, the indication signaling being used by the terminal to determine the uplink beam used for PUCCH transmission includes: controlling the transceiver to transmit the indication signaling through a high-layer signaling.

In some embodiments, the process of controlling the transceiver to transmit the indication signaling through the high-layer signaling includes: informing, by the high-layer signaling, an uplink beam, and determining that the terminal transmits the PUCCH with the uplink beam informed by the high-layer signaling.

In some embodiments, the process of controlling the transceiver to transmit the indication signaling through the high-layer signaling includes the following operations.

Informing, by the high-layer signaling, a plurality of uplink beams, wherein each uplink beam corresponds to a downlink beam or a group of downlink beams; and when a PDCCH and/or a PDSCH using a downlink beam-x is received, and the downlink beam-x corresponds to a first uplink beam in the plurality of beams informed by the high-layer signaling: determining that the terminal transmits the PUCCH by the first uplink beam, wherein the PUCCH at least carries an acknowledgement (ACK)/a non-acknowledgement (NACK) related to the PDCCH and/or PDSCH using the downlink beam-x.

Or, informing, by the high-layer signaling, a plurality of uplink beams, wherein each uplink beam corresponds to a downlink beam or a group of downlink beams; and when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: determining that the terminal uses the first uplink beam to execute the following operations: transmitting the PUCCH configured to carry the ACK/NACK related to the PDCCH and/or PDSCH using the downlink beam-x, and determining that the terminal uses the second uplink beam to execute the following operations: transmitting the PUCCH configured to carry the ACK/NACK related to the PDCCH and/or PDSCH using the downlink beam-y; or, determining that the terminal uses the first uplink beam to execute the following operation: transmitting the PUCCH configured to carry the ACK/NACK related to the PDCCH and/or PDSCH using the downlink beam-x and the ACK/NACK related to the PDCCH and/or PDSCH using the downlink beam-y.

Or, informing, by the high-layer signaling, a plurality of uplink beams, wherein each uplink beam corresponds to a downlink beam or a group of downlink beams; and when only the PDCCH and/or PDSCH using the downlink beam-y is received, and the downlink beam-y corresponds to a second uplink beam in the plurality of uplink beams informed by the high-layer signaling: determining that the terminal transmits the PUCCH by using the second uplink beam; or, determining that the terminal transmits the PUCCH by using the first uplink beam, where the first uplink beam is different from the second uplink beam, and the PUCCH carries the ACK/NACK related to the PDCCH and/or PDSCH using the downlink beam-y.

In some embodiments, the process of controlling the transceiver to transmit the indication signaling, the indication signaling being used by the terminal to determine the uplink beam used for PUCCH transmission includes: controlling the transceiver to transmit the indication signaling through the PDCCH.

In some embodiments, the ACK/NACK corresponding to the PDCCH is carried in the PUCCH, and the PDCCH is configured to indicate a downlink SPS resource to be released; and/or, the PDCCH corresponds to a PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, the terminal is determined to use any one or a combination of the following methods.

Method 1: taking uplink beams determined based on the indication signalings in the plurality of PDCCHs as the uplink beams used for the PUCCH transmission, where indication contents of the various indication signalings received by the plurality of PDCCHs are the same; transmitting the ACKs/NACKs related to the plurality of PDCCHs on the same PUCCH with the determined uplink beams.

Method 2: determining at least one uplink beam based on various indication signalings received through the plurality of PDCCHs, and selecting an uplink beam from the at least one uplink beam as the uplink beam used for the PUCCH transmission; and transmitting the ACKs/NACKs related to the plurality of PDCCHs on the same PUCCH with the determined uplink beam.

Method 3: selecting a PDCCH from the plurality of PDCCHs, and determining the uplink beam used for the PUCCH transmission according to the indication signaling received from the selected PDCCH; and transmitting the ACKs/NACKs related to the plurality of PDCCHs on the same PUCCH with the determined uplink beams.

In some embodiments, the process of selecting a beam in the at least one uplink beam as the uplink beam used for PUCCH transmission includes the following operations.

Selecting a beam in the at least one uplink beam as the uplink beam used for the PUCCH transmission according to a pre-configured or appointed uplink beam priority level or cell priority level.

Or, when the at least one uplink beam includes a pre-configured or appointed uplink main beam, determining that the uplink main beam is taken as the uplink beam used for the PUCCH transmission; and when the at least one uplink beam does not include the uplink main beam, determining that an auxiliary beam with a specified number in the at least one beam is taken as the uplink beam used for the PUCCH transmission, where the uplink main beam is pre-configured or appointed.

Or, when the at least one uplink beam includes an uplink beam corresponding to a pre-configured or appointed main cell, determining that the uplink beam corresponding to the main cell is taken as the uplink beam used for the PUCCH transmission; and when the at least one uplink beam does not include an uplink beam corresponding to the main cell, determining that an uplink beam corresponding to an auxiliary cell is taken as the uplink beam used for the PUCCH transmission.

In some embodiments, the process of selecting a PDCCH from the plurality of PDCCHs, and determining the uplink beam used for the PUCCH transmission according to the indication signaling received from the selected PDCCH includes the following operations.

Selecting a PDCCH with the highest priority level from the plurality of PDCCHs according to a pre-configured or appointed downlink beam priority level, downlink beam group priority level or cell priority level, and determining the uplink beam used for the PUCCH transmission according to the indication signaling received from the selected PDCCH.

Or, determining the uplink beam used for the PUCCH transmission according to the indication signaling in a PDCCH transmitted by using a downlink main beam; and/or, determining the uplink beam used for the PUCCH transmission according to the indication signaling in a PDCCH received from a main cell; and, when no PDCCH transmitted by using the downlink main beam is received or no PDCCH is received from the main cell, determining the uplink beam used for the PUCCH transmission according to the indication signaling in a received PDCCH using a specifically numbered downlink auxiliary beam; and/or, determining the uplink beam used for the PUCCH transmission according to the indication signaling in a PDCCH received from a specifically numbered auxiliary cell, where the downlink main beam and the main cell are pre-configured or appointed.

Or, determining the uplink beam used for the PUCCH transmission according to the indication signaling in a PDCCH transmitted by at least one downlink beam in a downlink main beam group; and when no PDCCH using any one downlink beam in the downlink main beam group is received, determining the beam used for the PUCCH transmission according to the indication signaling in a PDCCH transmitted by using a downlink beam in an auxiliary beam group, where if a beam group includes a plurality of downlink beams, contents indicated by the indication signalings in the plurality of PDCCHs needing the ACK/NACK feedback at the same moment in the same downlink beam group are the same, and the downlink main beam group is pre-configured or appointed.

In some embodiments, when a plurality of downlink beams and a plurality of uplink beams are divided into a plurality of groups, and indication signalings in PDCCHs using downlink beams in the same group indicate uplink beams in the same group, the processor is configured to: determine that indication contents of the indication signalings in the PDCCHs received by the downlink beams of the same group are the same; transmit a PUCCH carrying an ACK/NACK related to a PDCCH using a downlink beam by an uplink beam determined according to an indication signaling in the PDCCH using the downlink beam, where the downlink beam and the uplink beam are in the same group.

In some embodiments, when a plurality of downlink beams and a plurality of uplink beams are divided into a plurality of groups, the indication signalings in the PDCCHs using the downlink beams in the same group indicate the uplink beams in the same group, and the terminal is determined to execute the following processes: determining that the indication contents of the indication signalings in the PDCCHs received by the downlink beams of the same group are the same; transmitting the PUCCH carrying the ACK/NACK related to the PDCCH using the downlink beam-x by the first uplink beam determined according to the indication signaling in the PDCCH using the downlink beam-x, wherein the downlink beam-x and the first uplink beam are in the same group; and transmitting the PUCCH carrying the ACK/NACK related to the PDCCH using the downlink beam-y by the second uplink beam determined according to the indication signaling in the PDCCH using the downlink beam-y, wherein the downlink beam-y and the second uplink beam are in the same group.

In some embodiments, the process of controlling the transceiver to transmit the indication signaling, the indication signaling being used by the terminal to determine the uplink beam used for PUCCH transmission includes the following operations.

Pre-configuring, by the high-layer signaling, a downlink main beam, determining that the terminal determines an uplink main beam according to the downlink main beam and takes the uplink main beam as the uplink beam used for the PUCCH transmission.

Or, pre-configuring, by the high-layer signaling, a main beam pair including an uplink main beam and a downlink main beam, and determining that the terminal takes the uplink main beam in the main beam pair as the uplink beam used for the PUCCH transmission.

Or, pre-configuring, by the high-layer signaling, a plurality of beam groups, wherein each beam group corresponds to an uplink main beam, and each beam group includes one or more downlink beams; when the PDCCH and/or PDSCH transmitted by using the downlink beam in the first beam group is received, determining that the terminal transmits the PUCCH by using the first uplink main beam corresponding to the first beam group, wherein the PUCCH at least carries the ACK/NACK related to the PDCCH and/or PDSCH transmitted by using the downlink beam in the first beam group.

Or, pre-configuring, by the high-layer signaling, a plurality of beam groups, wherein each beam group corresponds to an uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: determining that the terminal uses the first uplink main beam corresponding to the first beam group to transmit the PUCCH carrying the ACK/NACK related to the PDCCH and/or PDSCH transmitted by using the beams in the first beam group; and determining that the terminal uses the second uplink main beam corresponding to the second beam group to transmit the PUCCH carrying the ACK/NACK related to the PDCCH and/or PDSCH transmitted by using the beams in the second beam group; or, determining that the terminal uses the first uplink main beam corresponding to the first beam group to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, pre-configuring, by the high-layer signaling, a plurality of beam groups, wherein each beam group corresponds to an uplink main beam, and each beam group includes one or more downlink beams; when only the PDCCH and/or PDSCH transmitted by using the downlink beam in the second beam group is received, determining that the terminal transmits the PUCCH by using the second uplink main beam corresponding to the second beam group, or determining that the terminal transmits the PUCCH by using the first uplink main beam corresponding to the first beam group, where the PUCCH carries the ACK/NACK related to the PDCCH and/or PDSCH transmitted by using the downlink beam in the second beam group.

One or more the above technical solutions have the following technical effects or advantages.

In the embodiments of the present disclosure, the method for determining the uplink beam used for the PUCCH transmission in a 5G NR is provided, and can support a PUCCH transmission scene in a new wireless communication system to ensure correct transmission of the PUCCH.

Further, in the embodiments of the disclosure, the uplink beam used for the PUCCH transmission is determined on the basis of the acquired indication signaling, so that the PUCCH transmission method in the embodiments of the present disclosure can adjust the uplink beam needing to be used through the indication signaling according to an actual need, and can adapt to various working environments and meet a demand for high reliability.

BRIEF DESCRIPTION OF THE DRAWINGS

To describe the embodiments of the present disclosure or the technical solutions in the related art more clearly, drawings required to be used in the embodiments or the illustration of the related art will be briefly introduced below. Obviously, the drawings in the illustration below are some embodiments of the present disclosure. Those ordinarily skilled in the art also can acquire other drawings according to the provided drawings without doing creative work.

DETAILED DESCRIPTION OF THE EMBODIMENTS

Figure 1:
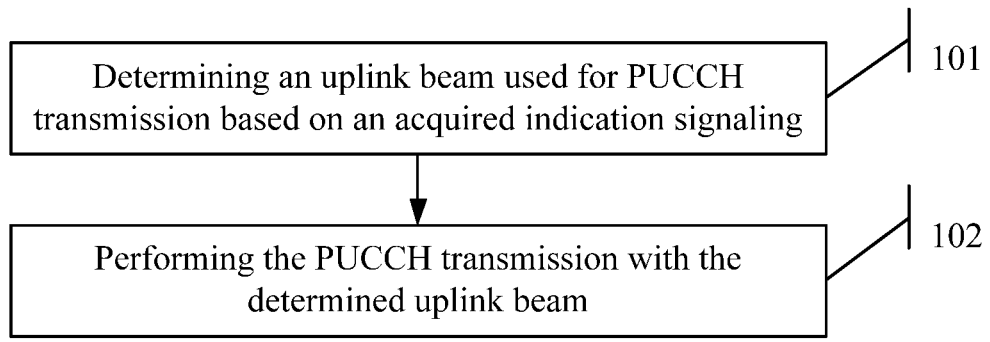
FIG. 1 is a flow diagram of a PUCCH transmission method in an embodiment of the present disclosure.

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. Based on the embodiments in the present disclosure, all other embodiments acquired by those ordinarily skilled in the art without doing creative work shall fall within the protection scope of the present disclosure.

It should be understood that the technical solutions of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) System, a Universal Mobile Telecommunication System (UMTS), and a New Radio (NR).

It should be further understood that, in the embodiments of the present disclosure, User Equipment (UE) includes, but not limited to, a Mobile Station (MS), a mobile terminal, a mobile telephone, a handset, a portable device and the like. The UE may communicate with one or more core networks via a Radio Access Network (RAN). For example, the UE may be a mobile telephone (or a "cellular" phone), a computer with a wireless communication function and the like. The UE may also be a portable, pocket-sized, handheld, computer built-in or in-vehicle mobile device.

In an embodiment of the present disclosure, a base station (e.g., an access point) may refer to a device, and the device communicates with a wireless terminal through one or more sectors on an air interface in an access network. The base station may be configured to mutually convert a received air frame and an Internet Protocol (IP) packet, and used as a router between the wireless terminal and other portions of the access network. The other portions of the access network may include an IP network. The base station may further coordinate the attribute management of the air interface. For example, the base station may be a Base Transceiver Station (BTS) in the GSM or CDMA, or may be a base station (e.g. NodeB) in a Time Division-Synchronous Code Division Multiple Access (TD-SCDMA) or the WCDMA, also may be an evolutional Node B (eNodeB or eNB or e-NodeB), or a base station (e.g. gNB) in a 5G NR. The present disclosure is not limited thereto.

In order to make the objectives, technical solutions and advantages of the present disclosure clearer, the technical solutions in the embodiments of the present disclosure will be described clearly and completely below in combination with the drawings in the embodiments of the present disclosure. Obviously, the embodiments described herein are only part of the embodiments of the present disclosure, not all the embodiments.

Based on the embodiments in the present disclosure, all other embodiments obtained by those ordinarily skilled in the art without doing creative work shall fall within the protection scope of the present disclosure. The embodiments in the present disclosure and features in the embodiments may be randomly combined with each other without conflicts. Furthermore, a logic order is shown in the flow diagram, but in some cases, the steps shown or described can be executed in an order different from this order.

In addition, the term "and/or" herein is only an association relationship that describes associated objects, and represents that there may be three relationships. For example, A and/or B can represent that: A exists alone, A and B exist simultaneously, and B exists alone. In addition, the character "/" herein, unless otherwise specified, generally indicates that the front and back associated objects are in an "or" relationship.

First, an application scene of the present disclosure is described.

A PUCCH is configured to transmit Uplink Control Information (UCI). The UCI includes an acknowledgement/a non-acknowledgement (ACK/NACK), Channel State Information (CSI), Scheduling Requests (SRs) and other information.

In a 5G NR system, different Transmission and Reception Points (TRPs) use different beam transmissions. When one TRP uses a transmission beam to transmit one downlink transmission, such as a Pysical Downlink Control Channel (PDCCH) or a Physical Downlink Shared Channel (PDSCH) or downlink reference information (such as CSI-RS), a terminal uses different receiving beams to receive the downlink transmission, that is, there is a pairing relationship between one transmission beam and one receiving beam, and the pairing relationship is called Beam Pair Linkage (BPL). In the same way for uplink transmissions, there will also be a corresponding BPL. The BPL can be obtained through beam training. Generally, the network side may pre-configure a downlink beam corresponding to one or more PDCCHs to the terminal for the terminal to detect the PDCCHs. The beam can be embodied by notifying the terminal that a Demodulation Reference Signal (DMRS) port of one channel has a Quasi-Co-Location (QCL) relationship with different CSI-RS configurations (such as ports and resources), so the aim of informing the terminal of the used beam can be achieved by informing a certain CSI-RS configuration. The beam can also be embodied by the BPL. At this time, the terminal may be pre-configured with a plurality of BPLs. When the terminal is informed of an index of one BPL, the terminal can determine the corresponding BPL according to the informed BPL index, and determine the used beam according to a transmission and receiving beam pair defined in the BPL.

For the above two embodiment methods, it is equivalent that the beam does not need to be defined, and the meaning of the beam is impliedly embodied by other defining methods. Of course, the beam can also be directly embodied through a beam index. At this time, the terminal is pre-configured or defined with a plurality of beams in advance, and can determine the used beam according to an informed beam index. The definitions of both uplink and downlink beams are applicable. The definitions of the uplink and downlink beams can use the same or different methods. For example, the two beams are defined with the BPL or the QCL or the beam index, and the downlink beam can be defined with the BPL or the QCL, and the uplink beam can be defined with the beam index. An uplink BPL is a beam pair used for uplink channel transmission, and a downlink BPL is a beam pair used for downlink channel transmission. The uplink beam is a beam configured to transmit an uplink channel on a terminal side and a beam configured to receive the uplink channel on a base station side. The downlink beam is a beam configured to receive a downlink channel on the terminal side and a beam configured to transmit the downlink channel.

It should be noted that the various embodiments below are based on the same inventive concept. In understanding or explaining of the content of any of the embodiments, reference may be made to the content described in the other embodiments.

In order to better understand the above technical solution, the above technical solution will be described in detail below with reference to the accompanying drawings and specific implementation manners of the present disclosure.

Embodiment I

Referring to FIG. 1, the embodiment of the present disclosure provides a PUCCH transmission method. The method may be used for PUCCH transmission between devices. For example, it can be that UE transmits a PUCCH to a base station. The UE may be a Personal Computer (PC), a notebook computer, a mobile phone, Internet of Things equipment, wearable equipment and the like. The embodiment of the present disclosure does not limit the specific type of the UE. The base station may be any reception node, such as a TRP, a conventional base station and a relay node.

The flow of the PUCCH transmission method in the embodiment of the present disclosure is described as follows.

Step 101: determining an uplink beam used for PUCCH transmission based on an acquired indication signaling.

Step 102: performing the PUCCH transmission with the determined uplink beam.

An uplink beam or a downlink beam in the embodiment of the present disclosure is specifically embodied as at least one of the followings.

First, a BPL: the BPL from a base station to a terminal and the BPL from a terminal to a base station may be obtained by beam training. Of course, in case of the reciprocity of uplink and downlink channels, the BPL from the terminal to the base station may also be obtained through the reciprocity based on the BPL from the base station to the terminal. That is, a beam used for uplink transmission may be determined based on a beam used for downlink transmission.

Or, second, a beam index: results of different transmission and reception combinations obtained on a plurality of configured first reference signal resources through measurement/training are recorded, are directly defined as different beams and represented by the beam index, and may be respectively defined as uplink beams and downlink beams. Of course, in case of the reciprocity of the uplink and downlink channels, the corresponding uplink beam may also be obtained through the reciprocity based on the downlink beam.

Or, third, a QCL relationship between a Demodulation Reference Signal (DMRS) port of the PUCCH and all ports or specified ports on one first reference signal resource: the first reference signal is one or more of CSI-RS and SRS signals. That is, resources or resources and ports of a plurality of first reference signals are pre-configured. Under the condition that different resources or different resources and ports are combined, results of different transmission and reception combinations obtained by measurement/training are recorded as transmission solutions on the corresponding resources or the corresponding resources and ports. When the terminal is informed of one first reference signal resource or resource and port, it is equivalent that the terminal is informed that the DMRS of a transmission channel and the port of the informed first reference signal resource have a QCL relationship, i.e., transmission (receiving or sending) needs to be realized by using the transmission solution on the resource or the corresponding resource and port, i.e., a recorded corresponding received or transmitted precoding matrix is used to perform the transmission. Of course, in case of the uplink and downlink reciprocity, an uplink QCL relationship may also be obtained through a downlink QCL relationship.

In some embodiments, the operation that the uplink beam used for PUCCH transmission is determined based on the acquired indication signaling includes that: a BPL is determined based on the acquired indication signaling, where the BPL is configured to determine the uplink beam used for the PUCCH transmission or a QCL relationship between a Demodulation Reference Signal (DMRS) port of the PUCCH and a port on a resource of a first reference signal.

The operation that the PUCCH transmission is performed with the determined uplink beam includes that: the PUCCH transmission is performed with the uplink beam corresponding to the BPL; or, the QCL relationship between the DMRS port of the PUCCH and the port on the resource of the first reference signal is determined according to the BPL, and the PUCCH transmission is performed by the QCL relationship.

In some embodiments, the operation that the uplink beam used for PUCCH transmission is determined based on the acquired indication signaling includes that: a beam index for identifying the uplink beam for the PUCCH transmission is determined based on the acquired indication signaling.

The operation that the PUCCH transmission is performed with the determined uplink beam includes that: the PUCCH transmission is performed with the uplink beam corresponding to the beam index.

In some embodiments, the operation that the uplink beam used for PUCCH transmission is determined based on the acquired indication signaling includes that: QCL relationships between the DMRS port of the PUCCH and all the ports or the appointed ports on the resource of the first reference signal are determined based on the acquired indication signaling.

The operation that the PUCCH transmission is performed with the determined uplink beam includes: the PUCCH transmission is performed by the QCL relationships.

In some embodiments, the operation that the QCL relationships between the DMRS port of the PUCCH and all the ports or the appointed ports on the resource of the first reference signal are determined based on the acquired indication signaling, and the PUCCH transmission is performed by the QCL relationships includes that: a resource of a first reference signal in a plurality of pre-configured resources of the first reference signal is determined based on the acquired indication signaling, the DMRS port of the PUCCH and the port on the determined resource of the first reference signal are determined to have a QCL relationship, and the PUCCH transmission is performed by the QCL relationship; or, a resource of a first reference signal in a plurality of pre-configured resources of the first reference signal and at least one port on the resource of the first reference signal are determined based on the acquired indication signaling, the DMRS port of the PUCCH and the at least one determined port on the resource of the first reference signal are determined to have a QCL relationship, and the PUCCH transmission is performed by the QCL relationship.

In some embodiments, the operation that the uplink beam used for PUCCH transmission is determined based on the acquired indication signaling includes that: the uplink beam used for the PUCCH transmission is determined based on an acquired high-layer signaling.

In some embodiments, the operation that the uplink beam used for PUCCH transmission is determined based on the acquired high-layer signaling includes that: the high-layer signaling informs one uplink beam only, and the uplink beam informed by the high-layer signaling is determined to be used to perform the PUCCH transmission based on the acquired high-layer signaling.

In some embodiments, the operation that the uplink beam used for PUCCH transmission is determined based on the acquired high-layer signaling includes that: the high-layer signaling informs a plurality of uplink beams, where each uplink beam corresponds to one downlink beam or one group of downlink beams; and when a PDCCH and/or a PDSCH using a downlink beam-x is received, and the downlink beam-x corresponds to a first uplink beam in the plurality of uplink beams informed by the high-layer signaling: the first uplink beam is determined to be used to perform the PUCCH transmission, where the PUCCH carries at least an ACK/NACK related to the PDCCH and/or PDSCH using the downlink beam-x.

Or, the high-layer signaling informs a plurality of uplink beams, where each uplink beam corresponds to one downlink beam or one group of downlink beams; and when a PDCCH and/or a PDSCH using the downlink beam-x is received, the downlink beam-x corresponds to a first uplink beam in the plurality of beams informed by the high-layer signaling, a PDCCH and/or a PDSCH using a downlink beam-y is also received, an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: the first uplink beam is determined to be used to execute the following operation: transmitting the PUCCH configured to carry the ACK/NACK related to the PDCCH and/or PDSCH using the downlink beam-x, and the second uplink beam is determined to be used to execute the following operation: transmitting the PUCCH configured to carry the ACK/NACK related to the PDCCH and/or PDSCH using the downlink beam-y; or, the first uplink beam is determined to be used to execute the following operation: transmitting the ACK/NACK related to the PDCCH and/or PDSCH using the downlink beam-x and the ACK/NACK related to the PDCCH and/or PDSCH using the downlink beam-y on the same PUCCH.

Or, the high-layer signaling informs a plurality of uplink beams, where each uplink beam corresponds to one downlink beam or one group of downlink beams; and when only the PDCCH and/or PDSCH using the downlink beam-y is received, and the downlink beam-y corresponds to a second uplink beam in the plurality of uplink beams informed by the high-layer signaling: the second uplink beam is determined to be used to perform the PUCCH transmission; or, the first uplink beam is determined to be used to perform the PUCCH transmission. The first uplink beam is different from the second uplink beam, and the PUCCH carries the ACK/NACK related to the PDCCH and/or PDSCH using the downlink beam-y.

In some embodiments, the operation that the uplink beam used for PUCCH transmission is determined based on the acquired indication signaling includes that: the uplink beam used for the PUCCH transmission is determined based on an indication signaling received from the PDCCH.

In some embodiments, the ACK/NACK corresponding to the PDCCH is carried in the PUCCH, and the PDCCH is configured to indicate a downlink Semi-persistent Scheduling (SPS) resource to be released; and/or, the PDCCH corresponds to one PDSCH, and the ACK/NACK corresponding to the PDSCH is carried in the PUCCH; or, the PDCCH is a multicast PDCCH.

In some embodiments, when a plurality of PDCCHs (i.e., PDCCHs with DCI sizes and at least one different beam in the used beams) are received, and the ACK/NACK feedbacks related to the plurality of PDCCHs are transmitted at the same moment (i.e., the ACKs/NACKs of the PDCCHs or the ACKs/NACKs of the PDSCHs corresponding to the PDCCHs need to be fed back at the same moment), any one or a combination of the following schemes is used.

Scheme 1: taking uplink beams determined based on a plurality of indication signalings as the uplink beams used for the PUCCH transmission, where it is always assumed that indication contents of the various indication signalings received by the plurality of PDCCHs are the same (otherwise, it is determined as an error case); and transmitting ACKs/NACKs (including the ACKs/NACKs of the PDCCHs and the ACKs/NACKs of the PDSCHs corresponding to the PDCCHs, the same below) related to the plurality of PDCCHs on the same PUCCH with the determined uplink beams.

Scheme 2: determining at least one uplink beam based on various indication signalings received through the plurality of PDCCHs, and selecting one uplink beam from the at least one uplink beam as the uplink beam used for the PUCCH transmission; and transmitting the ACKs/NACKs related to the plurality of PDCCHs on the same PUCCH with the determined uplink beam.

Scheme 3: selecting one PDCCH from the plurality of PDCCHs, and determining the uplink beam used for the PUCCH transmission according to the indication signaling received from the selected PDCCH; and transmitting the ACKs/NACKs related to the plurality of PDCCHs on the same PUCCH with the determined uplink beam.

If the indication contents are different, the beam may also be selected from one group of beams according to the above selection scheme, that is, the beam may be selected by reusing the selection rule corresponding to the scheme 2 or the scheme 3.

In some embodiments, the operation that one uplink beam is selected from the at least one uplink beam as the uplink beam used for PUCCH transmission includes that: one beam is selected from the at least one uplink beam as the uplink beam used for the PUCCH transmission according to a pre-configured or appointed uplink beam priority level or cell priority leve, for example, a specific number order of the beams or cells is regarded as the priority level (an ascending order or a descending order); or, when the at least one uplink beam includes a pre-configured or appointed uplink main beam, the uplink main beam is determined to be taken as the uplink beam used for the PUCCH transmission, and when the at least one uplink beam does not include the uplink main beam, an auxiliary beam with a specified number in the at least one beam is determined to be taken as the uplink beam used for the PUCCH transmission, such as, according to the ascending order or descending order of the numbers, where the uplink main beam is pre-configured or appointed; or, when the at least one uplink beam includes an uplink beam corresponding to a pre-configured or appointed main cell, the uplink beam corresponding to the main cell is determined to be taken as the uplink beam used for the PUCCH transmission, and when the at least one uplink beam does not include an uplink beam corresponding to the main cell, an uplink beam corresponding to an auxiliary cell is determined to be taken as the uplink beam used for the PUCCH transmission.

In some embodiments, the operation that one PDCCH is selected from a plurality of PDCCHs, and the uplink beam used for PUCCH transmission is determined according to the indication signaling received from the selected PDCCH includes: a PDCCH with the highest priority level is selected from the plurality of PDCCHs according to a pre-configured or appointed downlink beam priority level, downlink beam group priority level or cell priority level, and the uplink beam used for the PUCCH transmission is determined according to the indication signaling received from the selected PDCCH, for example, a specific number order of the beams or beam groups or cells is regarded as the priority level (an ascending order or a descending order); or, the uplink beam used for the PUCCH transmission is determined according to the indication signaling in a PDCCH transmitted by using a downlink main beam, and/or, the uplink beam used for the PUCCH transmission is determined according to the indication signaling in a PDCCH received from a main cell, and, when no PDCCH transmitted by using the downlink main beam is received or no PDCCH is received from the main cell, the uplink beam used for the PUCCH transmission is determined according to the indication signaling in a received PDCCH using a specifically numbered downlink auxiliary beam; and/or, the uplink beam used for the PUCCH transmission is determined according to the indication signaling in a PDCCH received from a specifically numbered auxiliary cell, such as, according to the ascending order or descending order of the numbers, where the downlink main beam and the main cell are pre-configured or appointed; or, the uplink beam used for the PUCCH transmission is determined according to an instruction received by at least one downlink beam in a downlink main beam group and carried by the PDCCH, when no instruction carried by the PDCCH is received from any one downlink beam in the downlink main beam group, the uplink beam used for the PUCCH transmission is determined according to an instruction received from a downlink beam in an auxiliary beam group and carried by the PDCCH, and if one beam group includes a plurality of downlink beams, a plurality of different PDCCHs needing to feed back the ACKs/NACKs at the same moment in the same downlink beam group are determined, and indication contents of signalings acquired from the plurality of different PDCCHs are determined to be the same, or if the indication contents are different, the above priority levels or the defining methods of the main/auxiliary beam are reused for selection, where the downlink main beam group is pre-configured or appointed.

In the embodiment of the present disclosure, if the indication contents are different, the beam may also be selected from one group of beams according to the above selection scheme, that is, the beam may be selected by reusing the selection rule corresponding to the scheme 2 or the scheme 3.

In some embodiments, when a plurality of downlink beams and a plurality of uplink beams are divided into a plurality of groups, and the indication signalings in the PDCCHs using the downlink beams in the same group indicate the uplink beams in the same group, the following operations are executed: the PUCCH carrying the ACK/NACK related to the PDCCH using the downlink beam-x is transmitted by the first uplink beam determined according to the indication signaling in the PDCCH using the downlink beam-x, where the downlink beam-x and the first uplink beam are in the same group; the PUCCH carrying the ACK/NACK related to the PDCCH using the downlink beam-y is transmitted by the second uplink beam determined according to the indication signaling in the PDCCH using the downlink beam-y, where the downlink beam-y and the second uplink beam are in the same group, where it is always assumed that the indication contents of the indication signalings in the PDCCHs received by the downlink beams of the same group are the same (otherwise, it may occur an error case).

In some embodiments, if a plurality of PDCCHs are received, and when the ACK/NACK feedback timing indicated by the PDCCHs is different, the terminal determines the corresponding beam used for the PUCCH transmission according to indication information in the corresponding PDCCHs, and transmits the ACKs/NACKs related to the corresponding PDCCHs on the corresponding PUCCH.

In some embodiments, the operation that the uplink beam used for PUCCH transmission is determined based on the acquired indication signaling includes the following operations.

The high-layer signaling pre-configures one downlink main beam, one uplink main beam is determined according to the downlink main beam, and the uplink main beam is determined to be taken as the uplink beam used for the PUCCH transmission.

Or, the high-layer signaling pre-configures one main beam pair including one uplink main beam and one downlink main beam, and the uplink main beam in the main beam pair is determined to be taken as the uplink beam used for the PUCCH transmission.

Or, the high-layer signaling pre-configures a plurality of beam groups, where each beam group corresponds to one uplink main beam, and each beam group includes one or more downlink beams, when the PDCCH and/or PDSCH transmitted by using the downlink beam in the first beam group is received, the first uplink main beam corresponding to the first beam group is determined to be used to perform the PUCCH transmission, where the PUCCH carries at least the ACK/NACK related to the PDCCH and/or PDSCH transmitted by using the downlink beam in the first beam group.

Or, the high-layer signaling pre-configures a plurality of beam groups, where each beam group corresponds to one uplink main beam, and each beam group comprises one or more downlink beams, when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: the first uplink main beam corresponding to the first beam group is determined to be used to transmit the PUCCH carrying the ACK/NACK related to the PDCCH and/or PDSCH transmitted by using the beams in the first beam group, and the second uplink main beam corresponding to the second beam group is determined to be used to transmit the PUCCH carrying the ACK/NACK related to the PDCCH and/or PDSCH transmitted by using the beams in the second beam group; or, the first uplink main beam corresponding to the first beam group is determined to be used to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, the high-layer signaling pre-configures a plurality of beam groups, where each beam group corresponds to one uplink main beam, and each beam group comprises one or more downlink beams; when only the PDCCH and/or PDSCH transmitted by using the downlink beam in the second beam group is received, the second uplink main beam corresponding to the second beam group is determined to be used for the PUCCH transmission, or the first uplink main beam corresponding to the first beam group is determined to be used for the PUCCH transmission, where the PUCCH carries the ACK/NACK related to the PDCCH and/or PDSCH transmitted by using the downlink beam in the second beam group.

Embodiment II

Figure 2:
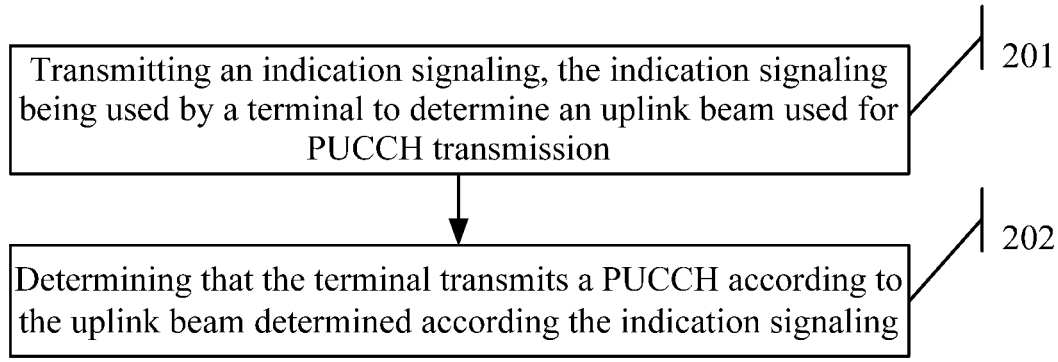
FIG. 2 is a flow diagram of another PUCCH transmission method in an embodiment of the present disclosure.

Referring to FIG. 2, based on the same inventive concept as the Embodiment I, the embodiment of the present disclosure provides another PUCCH transmission method. The method includes the following steps.

Step 201: transmitting an indication signaling, the indication signaling being used by a terminal to determine an uplink beam used for PUCCH transmission.

Step 202: determining that the terminal transmits a PUCCH according to the uplink beam determined according to the indication signaling.

In a specific implementation process, the terminal may be the terminal applied to the method in Embodiment I, and the embodiment of the present disclosure is not limited thereto.

In some embodiments, the step that the indication signaling is transmitted, the indication signaling being used by the terminal to determine the uplink beam used for PUCCH transmission includes that: the indication signaling indicates a BPL, where the BPL is configured to determine the uplink beam used for the PUCCH transmission or a QCL relationship between a DMRS port of a PUCCH and a port on a resource of a first reference signal.

The step that the terminal is determined to transmit the PUCCH according to the uplink beam determined according to the indication signaling includes that: the terminal is determined to transmit the PUCCH with the uplink beam corresponding to the BPL; or, the terminal is determined to determine the QCL relationship between the DMRS port of the PUCCH and the port on the resource of the first reference signal according to the BPL, and transmit the PUCCH by the QCL relationship.

In some embodiments, the step that the indication signaling is transmitted, the indication signaling being used by the terminal to determine the uplink beam used for PUCCH transmission includes that: the indication signaling indicates a beam index for identifying the uplink beam for the PUCCH transmission.

The step that the terminal is determined to transmit the PUCCH according to the uplink beam determined on the basis of the indication signaling includes that: the terminal is determined to transmit the PUCCH with the uplink beam corresponding to the beam index.

In some embodiments, the step that the indication signaling is transmitted, the indication signaling being used by the terminal to determine the uplink beam used for PUCCH transmission includes that: the indication signaling indicates QCL relationships between the DMRS port of the PUCCH and all the ports or the appointed ports on the resource of the first reference signal; and the step that the terminal is determined to transmit the PUCCH according to the uplink beam determined on the basis of the indication signaling includes that: the terminal is determined to transmit the PUCCH by the QCL relationships.

In some embodiments, the step that the indication signaling indicates the QCL relationships between the DMRS port of the PUCCH and all the ports or the appointed ports on the resource of the first reference signal, and the PUCCH transmission is performed by the QCL relationships includes the following operations.

The indication signaling indicates a resource of a first reference signal in a plurality of pre-configured resources of the first reference signal; and the terminal is determined to transmit the PUCCH according to the QCL relationship between the DMRS port of the PUCCH and the port on the resource of the first reference signal.

Or, the indication signaling indicates at least one port on one first reference signal resource in a plurality of pre-configured resources of the first reference signal; and the terminal is determined to transmit the PUCCH according to the QCL relationship between the DMRS port of the PUCCH and the at least one port on the resource of the first reference signal.

In some embodiments, the step that the indication signaling is transmitted, the indication signaling being used by the terminal to determine the uplink beam used for PUCCH transmission includes that: the indication signaling is transmitted through a high-layer signaling.

In some embodiments, the step that the indication signaling is transmitted through the high-layer signaling includes that: the high-layer signaling informs one uplink beam only, and the terminal is determined to transmit the PUCCH with the uplink beam informed by the high-layer signaling.

In some embodiments, the step that the indication signaling is transmitted through the high-layer signaling includes the following operations.

The high-layer signaling informs a plurality of uplink beams, where each uplink beam corresponds to one downlink beam or one group of downlink beams; and when a PDCCH and/or a PDSCH using a downlink beam-x is received, and the downlink beam-x corresponds to a first uplink beam in the plurality of beams informed by the high-layer signaling: the terminal is determined to transmit the PUCCH by the first uplink beam, where the PUCCH carries at least an ACK/NACK related to the PDCCH and/or PDSCH using the downlink beam-x.

Or, the high-layer signaling informs a plurality of uplink beams, where each uplink beam corresponds to one downlink beam or one group of downlink beams; and when a PDCCH and/or a PDSCH using the downlink beam-x is received, the downlink beam-x corresponds to a first uplink beam in the plurality of uplink beams informed by the high-layer signaling, a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: the terminal is determined to use the first uplink beam to execute the following operation: transmitting the PUCCH configured to carry the ACK/NACK related to the PDCCH and/or PDSCH using the downlink beam-x; and the terminal is determined to use the second uplink beam to execute the following operation: transmitting the PUCCH configured to carry the ACK/NACK related to the PDCCH and/or PDSCH using the downlink beam-y; or, the terminal is determined to use the first uplink beam to execute the following operation: transmitting the ACK/NACK related to the PDCCH and/or PDSCH using the downlink beam-x and the PUCCH configured to carry the ACK/NACK related to the PDCCH and/or PDSCH using the downlink beam-y.

Or, the high-layer signaling informs a plurality of uplink beams, where each uplink beam corresponds to one downlink beam or one group of downlink beams; and when only the PDCCH and/or PDSCH using the downlink beam-y is received, and the downlink beam-y corresponds to a second uplink beam in the plurality of uplink beams informed by the high-layer signaling: the terminal is determined to transmit the PUCCH by using the second uplink beam; or, the terminal is determined to transmit the PUCCH by using the first uplink beam, where the first uplink beam is different from the second uplink beam, and the PUCCH carries the ACK/NACK related to the PDCCH and/or PDSCH using the downlink beam-y.

In some embodiments, the step that the indication signaling is transmitted, the indication signaling being used by the terminal to determine the uplink beam used for PUCCH transmission includes that: the indication signaling is transmitted through the PDCCH.

In some embodiments, the ACK/NACK corresponding to the PDCCH is carried in the PUCCH, and the PDCCH indicates a downlink SPS resource to be released; and/or, the PDCCH corresponds to one PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, the terminal is determined to use any one or a combination of the following methods.

In the embodiment of the present disclosure, the ACK/NACK related to the PDCCH includes: when the PDCCH is a PDCCH indicating a SPS resource to be released, the ACK/NACK is the ACK/NACK of the PDCCH; and when the PDCCH has a corresponding PDSCH, the ACK/NACK is the ACK/NACK of the PDSCH. The above ACK/NACK being transmitted at the same moment means that: the HARQ-ACK feedback timing indicated by the above PDCCH is the same, or the HARQ-ACK feedback timing indicated by the above PDCCH and/or a time domain position determined by a time domain resource position indicated in the above PDCCH is the same.

Method 1: uplink beams determined based on the indication signalings in the plurality of PDCCHs are taken as the uplink beams used for the PUCCH transmission, where indication contents of the various indication signalings received by the plurality of PDCCHs are the same; the ACKs/NACKs related to the plurality of PDCCHs are transmitted on the same PUCCH with the determined uplink beams.

Method 2: at least one uplink beam is determined based on various indication signalings received through the plurality of PDCCHs, and one uplink beam is selected from the at least one uplink beam as the uplink beam used for the PUCCH transmission; the ACKs/NACKs related to the plurality of PDCCHs are transmitted on the same PUCCH with the determined uplink beam.

Method 3: one PDCCH is selected from the plurality of PDCCHs, and the uplink beam used for the PUCCH transmission is determined according to the indication signaling received from the selected PDCCH; and the ACKs/NACKs related to the plurality of PDCCHs are transmitted on the same PUCCH with the determined uplink beam.

In some embodiments, the step that one beam is selected from the at least one uplink beam as the uplink beam used for the PUCCH transmission includes the following operations.

One uplink beam is selected from the at least one uplink beam as the uplink beam used for the PUCCH transmission according to a pre-configured or appointed uplink beam priority level or cell priority level.

Or, when the at least one uplink beam includes a pre-configured or appointed uplink main beam, the uplink main beam is taken as the uplink beam used for the PUCCH transmission; and when the at least one uplink beam does not include the uplink main beam, an auxiliary beam with a specified number in the at least one beam is taken as the uplink beam used for the PUCCH transmission, where the uplink main beam is pre-configured or appointed.

Or, when the at least one uplink beam includes an uplink beam corresponding to a pre-configured or appointed main cell, the uplink beam corresponding to the main cell is taken as the uplink beam used for the PUCCH transmission; and when the at least one uplink beam does not include an uplink beam corresponding to the main cell, an uplink beam corresponding to an auxiliary cell is taken as the uplink beam used for the PUCCH transmission.

In some embodiments, the step that one PDCCH is selected from the plurality of PDCCHs, and the uplink beam used for the PUCCH transmission is determined according to the indication signaling received from the selected PDCCH includes the following operations.

A PDCCH with the highest priority level is selected from the plurality of PDCCHs according to a pre-configured or appointed downlink beam priority level, downlink beam group priority level or cell priority level, and the uplink beam used for the PUCCH transmission is determined according to the indication signaling received from the selected PDCCH.

Or, the uplink beam used for the PUCCH transmission is determined according to an instruction received from a downlink main beam and carried by the PDCCH; and/or, the uplink beam used for the PUCCH transmission is determined according to an instruction received from a main cell and carried by the PDCCH; and, when no instruction carried by the PDCCH is received from the downlink main beam or main cell, the uplink beam used for the PUCCH transmission is determined according to an instruction carried by the PDCCH and received from a downlink auxiliary beam with a specified number; and/or, the uplink beam used for the PUCCH transmission is determined according to an instruction carried by the PDCCH and received from an auxiliary cell, where the downlink main beam and the main cell are pre-configured or appointed.

Or, the uplink beam used for the PUCCH transmission is determined according to an instruction received from at least one downlink beam in a downlink main beam group and carried by the PDCCH; and when no instruction carried by the PDCCH is received from any one downlink beam in the downlink main beam, the beam used for the PUCCH transmission is determined according to an instruction received from a downlink beam in an auxiliary beam group and carried by the PDCCH; and if one beam group includes a plurality of downlink beams, a plurality of different PDCCHs needing to feed back the ACKs/NACKs at the same moment in the same downlink beam group are determined, and indication contents of signalings acquired from the plurality of different PDCCHs are determined to be the same, where the downlink main beam group is pre-configured or appointed.

In some embodiments, when a plurality of downlink beams and a plurality of uplink beams are divided into a plurality of groups, the indication signalings in the PDCCHs using the downlink beams in the same group indicate the uplink beams in the same group, and the terminal is determined to execute the following processes: the indication contents of the indication signalings in the PDCCHs received by the downlink beams of the same group are determined to be the same; the PUCCH carrying the ACK/NACK related to the PDCCH using the downlink beam-x is transmitted by the first uplink beam determined according to the indication signaling in the PDCCH using the downlink beam-x, where the downlink beam-x and the first uplink beam are in the same group; the PUCCH carrying the ACK/NACK related to the PDCCH using the downlink beam-y is transmitted by the second uplink beam determined according to the indication signaling in the PDCCH using the downlink beam-y, where the downlink beam-y and the second uplink beam are in the same group.

In some embodiments, the step that the indication signaling is transmitted, the indication signaling being used by the terminal to determine the uplink beam used for PUCCH transmission includes the following operations.

The high-layer signaling pre-configures one downlink main beam, and the terminal is determined to determine one uplink main beam according to the downlink main beam and takes the uplink main beam as the uplink beam used for the PUCCH transmission.

Or, the high-layer signaling pre-configures one main beam pair including one uplink main beam and one downlink main beam, and the terminal is determined to take the uplink main beam in the main beam pair as the uplink beam used for the PUCCH transmission.

Or, the high-layer signaling pre-configures a plurality of beam groups, where each beam group corresponds to one uplink main beam, and each beam group includes one or more downlink beams; when the PDCCH and/or PDSCH transmitted by using the downlink beam in the first beam group is received, the terminal is determined to transmit the PUCCH by using the first uplink main beam corresponding to the first beam group, wherein the PUCCH carries at least the ACK/NACK related to the PDCCH and/or PDSCH transmitted by using the downlink beam in the first beam group.

Or, the high-layer signaling pre-configures a plurality of beam groups, where each beam group corresponds to one uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: the terminal is determined to use the first uplink main beam corresponding to the first beam group to transmit the PUCCH carrying the ACK/NACK related to the PDCCH and/or PDSCH transmitted by using the beams in the first beam group; and the terminal is determined to use the second uplink main beam corresponding to the second beam group to transmit the PUCCH carrying the ACK/NACK related to the PDCCH and/or PDSCH transmitted by using the beams in the second beam group; or, the terminal is determined to use the first uplink main beam corresponding to the first beam group to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, the high-layer signaling pre-configures a plurality of beam groups, wherein each beam group corresponds to one uplink main beam, and each beam group includes one or more downlink beams; when only the PDCCH and/or PDSCH transmitted by using the downlink beam in the second beam group is received, the terminal is determined to transmit the PUCCH by using the second uplink main beam corresponding to the second beam group, or the terminal is determined to transmit the PUCCH by using the first uplink main beam corresponding to the first beam group, where the PUCCH carries the ACK/NACK related to the PDCCH and/or PDSCH transmitted by using the downlink beam in the second beam group.

Embodiment III

Figure 3:
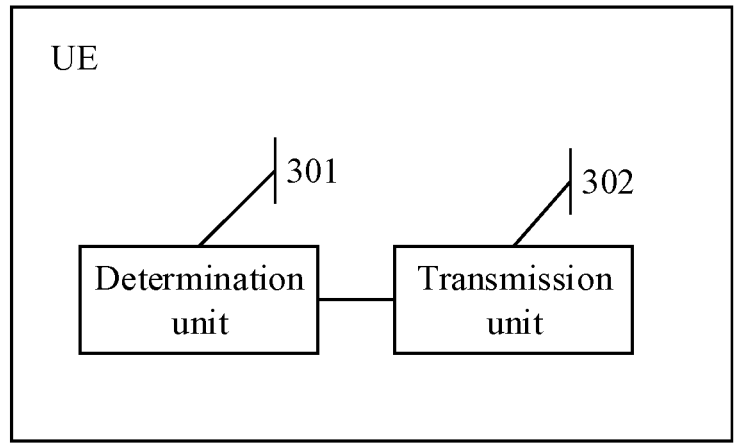
FIG. 3 is a structural block diagram of UE in an embodiment of the present disclosure.

Referring to FIG. 3, the embodiment of the present disclosure provides UE. The UE includes a determination unit 301 and a transmission unit 302.

The determination unit 301 is configured to determine an uplink beam used for PUCCH transmission based on an acquired indication signaling.

The transmission unit 302 is configured to perform the PUCCH transmission with the determined uplink beam.

In some embodiments, the determination unit 301 is configured to determine a BPL based on the acquired indication signaling, and the BPL is configured to determine the uplink beam used for the PUCCH transmission or a QCL relationship between a DMRS port of a PUCCH and a port on a resource of a first reference signal.

The transmission unit 302 is configured to perform the PUCCH transmission with the uplink beam corresponding to the BPL; or, to determine the QCL relationship between the DMRS port of the PUCCH and the port on the resource of the first reference signal according to the BPL, and perform the PUCCH transmission by the QCL relationship.

In some embodiments, the determination unit 301 is configured to determine a beam index for identifying the uplink beam for the PUCCH transmission based on the acquired indication signaling.

The transmission unit 302 is configured to perform the PUCCH transmission with the uplink beam corresponding to the beam index.

In some embodiments, the determination unit 301 is configured to determine the QCL relationships between the DMRS port of the PUCCH and all the ports or the appointed ports on the resource of the first reference signal based on the acquired indication signaling.

The transmission unit 302 is configured to perform the PUCCH transmission by the QCL relationship.

In some embodiments, the determination unit 301 is configured to determine a resource of a first reference signal in a plurality of pre-configured resources of the first reference signal based on the acquired indication signaling, and determine that the DMRS port of the PUCCH and the port on the determined resource of the first reference signal have a QCL relationship.

The transmission unit 302 is configured to perform the PUCCH transmission by the QCL relationship.

Or, the determination unit 301 is configured to determine a resource of a first reference signal in a plurality of pre-configured resources of the first reference signal and at least one port on the resource of the first reference signal based on the acquired indication signaling, and determine that the DMRS port of the PUCCH and the at least one determined port on the resource of the first reference signal have a QCL relationship; and the transmission unit 302 is configured to perform the PUCCH transmission by the QCL relationship.

In some embodiments, the operation that the uplink beam used for PUCCH transmission is determined based on the acquired indication signaling includes that: the uplink beam used for the PUCCH transmission is determined based on an acquired high-layer signaling.

In some embodiments, when the high-layer signaling only informs one uplink beam, the determination unit 301 is configured to determine that the uplink beam informed by the high-layer signaling is used to perform the PUCCH transmission based on the acquired high-layer signaling.

In some embodiments, when the high-layer signaling informs a plurality of uplink beams, where each uplink beam corresponds to one downlink beam or one group of downlink beams, the determination unit 301 is configured to: when a PDCCH and/or a PDSCH using a downlink beam-x is received, and the downlink beam-x corresponds to a first uplink beam in the plurality of beams informed by the high-layer signaling: determine that the first uplink beam is used to perform the PUCCH transmission, wherein the PUCCH at least carries an acknowledgement (ACK)/a non-acknowledgement (NACK) related to the PDCCH and/or PDSCH using the downlink beam-x.

When the high-layer signaling informs a plurality of uplink beams, where each uplink beam corresponds to one downlink beam or one group of downlink beams, the determination unit 301 is configured to: when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: determine that the first uplink beam is used to execute the following operations: transmitting the PUCCH configured to carry the ACK/NACK related to the PDCCH and/or PDSCH using the downlink beam-x; and determine that the second uplink beam is used to execute the following operation: transmitting the PUCCH configured to carry the ACK/NACK related to the PDCCH and/or PDSCH using the downlink beam-y; or, determine that the first uplink beam is used to execute the following operation: transmitting the PUCCH configured to carry the ACK/NACK related to the PDCCH and/or PDSCH using the downlink beam-x and the ACK/NACK related to the PDCCH and/or PDSCH using the downlink beam-y.

When the high-layer signaling informs a plurality of uplink beams, and each uplink beam corresponds to one downlink beam or one group of downlink beams, the determination unit 301 is configured to: when only the PDCCH and/or the PDSCH using the downlink beam-y is received, and the downlink beam-y corresponds to a second uplink beam in the plurality of uplink beams informed by the high-layer signaling: determine that the second uplink beam is used to perform the PUCCH transmission; or, determine that the first uplink beam is used to perform the PUCCH transmission, where the first uplink beam is different from the second uplink beam, and the PUCCH carries the ACK/NACK related to the PDCCH and/or PDSCH using the downlink beam-y.

In some embodiments, the determination unit 301 is configured to determine the uplink beam used for the PUCCH transmission based on an indication signaling received from a PDCCH.

In some embodiments, the ACK/NACK corresponding to the PDCCH is carried in the PUCCH, and the PDCCH is configured to indicate a downlink Semi-persistent Scheduling (SPS) resource to be released; and/or, the PDCCH corresponds to one PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, any one or a combination of the following methods is used.

Method 1: the determination unit 301 is configured to take uplink beams determined based on the indication signalings in the plurality of PDCCHs as the uplink beams used for the PUCCH transmission, where indication contents of the various indication signalings received by the plurality of PDCCHs are the same; and the transmission unit 302 is configured to transmit the ACKs/NACKs related to the plurality of PDCCHs on the same PUCCH with the determined uplink beams.

Method 2: the determination unit 301 is configured to determine at least one uplink beam based on various indication signalings received through the plurality of PDCCHs, and select one uplink beam from the at least one uplink beam as the uplink beam used for the PUCCH transmission; and the transmission unit 302 is configured to transmit the ACKs/NACKs related to the plurality of PDCCHs on the same PUCCH with the determined uplink beam.

Method 3: the determination unit 301 is configured to select one PDCCH from the plurality of PDCCHs, and determine the uplink beam used for the PUCCH transmission according to the indication signaling received from the selected PDCCH; and the transmission unit 302 is configured to transmit the ACKs/NACKs related to the plurality of PDCCHs on the same PUCCH with the determined uplink beam.

In some embodiments, the determination unit 301 is configured to: select one beam from the at least one uplink beam as the uplink beam used for the PUCCH transmission according to a pre-configured or appointed uplink beam priority level or cell priority level.

Or, the determination unit 301 is configured to: when the at least one uplink beam includes a pre-configured or appointed uplink main beam, determine that the uplink main beam is taken as the uplink beam used for the PUCCH transmission; and when the at least one uplink beam does not include the uplink main beam, determine that an auxiliary beam with a specified number in the at least one beam is taken as the uplink beam used for the PUCCH transmission, where the uplink main beam is pre-configured or appointed.

Or, the determination unit 301 is configured to: when the at least one uplink beam includes an uplink beam corresponding to a pre-configured or appointed main cell, determine that the uplink beam corresponding to the main cell is taken as the uplink beam used for the PUCCH transmission; and when the at least one uplink beam does not include an uplink beam corresponding to the main cell, determine that an uplink beam corresponding to an auxiliary cell is taken as the uplink beam used for the PUCCH transmission.

In some embodiments, the determination unit 301 is configured to: select a PDCCH with the highest priority level from the plurality of PDCCHs according to a pre-configured or appointed downlink beam priority level, downlink beam group priority level or cell priority level, and determine the uplink beam used for the PUCCH transmission according to the indication signaling received from the selected PDCCH.

Or, the determination unit 301 is configured to: determine the uplink beam used for the PUCCH transmission according to an instruction received from a downlink main beam and carried by the PDCCH; and/or, determine the uplink beam used for the PUCCH transmission according to an instruction received from a main cell and carried by the PDCCH; and, when no instruction carried by the PDCCH is received received from the downlink main beam or main cell, determine the uplink beam used for the PUCCH transmission according to an instruction carried by the PDCCH and received from a downlink auxiliary beam with a specified number; and/or, determine the uplink beam used for the PUCCH transmission according to an instruction carried by the PDCCH and received from an auxiliary cell, where the downlink main beam and the main cell are pre-configured or appointed.

Or, the determination unit 301 is configured to: determine the uplink beam used for the PUCCH transmission according to an instruction received from at least one downlink beam in a downlink main beam group and carried by the PDCCH; and when no instruction carried by the PDCCH is received from any one downlink beam in the downlink main beam group, determine the beam used for the PUCCH transmission according to an instruction received from a downlink beam in an auxiliary beam group and carried by the PDCCH; and if one beam group includes a plurality of downlink beams, determine a plurality of different PDCCHs needing to feed back the ACKs/NACKs at the same moment in the same downlink beam group, and determine that indication contents of signalings acquired from the plurality of different PDCCHs are the same, where the downlink main beam group is pre-configured or appointed.

In some embodiments, when a plurality of downlink beams and a plurality of uplink beams are divided into a plurality of groups, and the indication signalings in the PDCCHs using the downlink beams in the same group indicate the uplink beams in the same group, the determination unit 301 is configured to: determine that indication contents of the indication signalings in the PDCCHs received by the downlink beams of the same group are the same; the transmission unit 302 is configured to transmit the PUCCH carrying the ACK/NACK related to the PDCCH using the downlink beam-x by the first uplink beam determined according to the indication signaling in the PDCCH using the downlink beam-x, wherein the downlink beam-x and the first uplink beam are in the same group; and the transmission unit 302 is configured to transmit the PUCCH carrying the ACK/NACK related to the PDCCH using the downlink beam-y by the second uplink beam determined according to the indication signaling in the PDCCH using the downlink beam-y, wherein the downlink beam-y and the second uplink beam are in the same group.

In some embodiments, the transmission unit 302 is configured to: pre-configure, by the high-layer signaling, one downlink main beam, and determine that one uplink main beam according to the downlink main beam, and determine that the uplink main beam is the uplink beam used for the PUCCH transmission; or, pre-configure, by the high-layer signaling, one main beam pair including one uplink main beam and one downlink main beam, and determine that the uplink main beam in the main beam pair is the uplink beam used for the PUCCH transmission; or, pre-configure, by the high-layer signaling, a plurality of beam groups, where each beam group corresponds to one uplink main beam, and each beam group includes one or more downlink beams; when the PDCCH and/or PDSCH transmitted by using the downlink beam in the first beam group is received, determine that the first uplink main beam corresponding to the first beam group is used to perform the PUCCH transmission, where the PUCCH at least carries the ACK/NACK related to the PDCCH and/or PDSCH transmitted by using the downlink beam in the first beam group; or, pre-configure, by the high-layer signaling, a plurality of beam groups, wherein each beam group corresponds to one uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: determine that the first uplink main beam corresponding to the first beam group is used to transmit the PUCCH carrying the ACK/NACK related to the PDCCH and/or PDSCH transmitted by using the beams in the first beam group; and determine that the second uplink main beam corresponding to the second beam group is used to transmit the PUCCH carrying the ACK/NACK related to the PDCCH and/or PDSCH transmitted by using the beams in the second beam group; or, determine that the first uplink main beam corresponding to the first beam group is used to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH; or, pre-configure, by the high-layer signaling, a plurality of beam groups, where each beam group corresponds to one uplink main beam, and each beam group includes one or more downlink beams; when only the PDCCH and/or PDSCH transmitted by using the downlink beam in the second beam group is received, determine that the second uplink main beam corresponding to the second beam group is used for the PUCCH transmission, or determine that the first uplink main beam corresponding to the first beam group is used for the PUCCH transmission, where the PUCCH carries the ACK/NACK related to the PDCCH and/or PDSCH transmitted by using the downlink beam in the second beam group.

Embodiment IV

Figure 4:
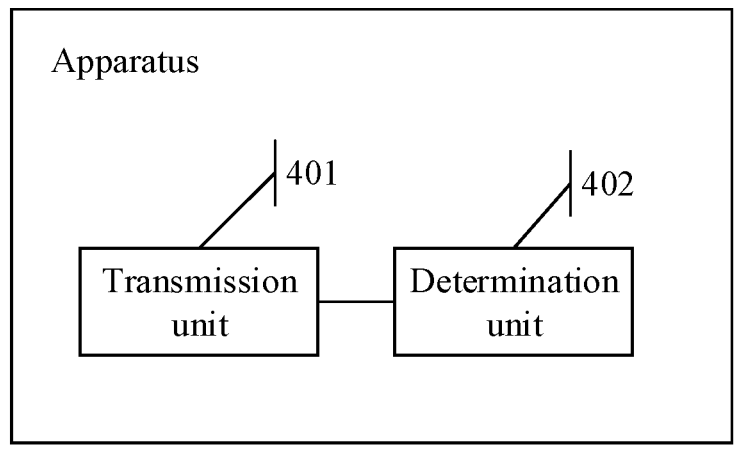
FIG. 4 is a structural block diagram of an apparatus in an embodiment of the present disclosure.

Referring to FIG. 4, the embodiment of the present disclosure further provides an apparatus. The apparatus includes a transmission unit 401 and a determination unit 402.

The transmission unit 401 is configured to transmit an indication signaling, the indication signaling being used by a terminal to determine an uplink beam used for PUCCH transmission.

The determination unit 402 is configured to determine that the terminal transmits a PUCCH according to the uplink beam determined on the basis of the indication signaling.

In some embodiments, the indication signaling indicates a BPL, and the BPL is configured to determine the uplink beam used for the PUCCH transmission or a QCL relationship between a DMRS port of a PUCCH and a port on a resource of a first reference signal.

The determination unit 402 is configured to determine that the terminal transmits the PUCCH with the uplink beam corresponding to the BPL; or, determine that the terminal determines the QCL relationship between the DMRS port of the PUCCH and the port on the resource of the first reference signal according to the BPL, and transmits the PUCCH by the QCL relationship.

In some embodiments, the indication signaling is configured to indicate a beam index for identifying the uplink beam for the PUCCH transmission; and the determination unit 402 is configured to determine that the terminal transmits the PUCCH with the uplink beam corresponding to the beam index.

In some embodiments, the indication signaling indicates QCL relationships between the DMRS port of the PUCCH and all the ports or the appointed ports on the resource of the first reference signal; and the determination unit 402 is configured to determine that the terminal transmits the PUCCH by the QCL relationships.

In some embodiments, the determination unit 402 is configured to: determine that the terminal transmits the PUCCH according to the QCL relationship between the DMRS port of the PUCCH and the port on one first reference signal resource when the indication signaling indicates the resource of the first reference signal in a plurality of pre-configured resources of the first reference signal; or, determine that the terminal transmits the PUCCH according to the QCL relationship between the DMRS port of the PUCCH and at least one port on one first reference signal resource when the indication signaling indicates the at least one port on the resource of the first reference signal in a plurality of pre-configured resources of the first reference signal.

In some embodiments, the transmission unit 401 is configured to transmit the indication signaling through a high-layer signaling.

In some embodiments, the determination unit 402 is configured to determine that the terminal transmits the PUCCH with the uplink beam informed by the high-layer signaling when the high-layer signaling only informs one uplink beam.

In some embodiments, the transmission unit 401 is configured to: inform, by the high-layer signaling, a plurality of uplink beams, where each uplink beam corresponds to one downlink beam or one group of downlink beams; and when a PDCCH and/or a PDSCH using a downlink beam-x is received, and the downlink beam-x corresponds to a first uplink beam in the plurality of beams informed by the high-layer signaling: determine that the terminal transmits the PUCCH by the first uplink beam by using the first uplink beam, where the PUCCH at least carries an ACK/NACK related to the PDCCH and/or PDSCH using the downlink beam-x.

Or, the transmission unit 401 is configured to: inform, by the high-layer signaling, a plurality of uplink beams, where each uplink beam corresponds to one downlink beam or one group of downlink beams; and when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: determine that the terminal uses the first uplink beam to execute the following operation: transmitting the PUCCH configured to carry the ACK/NACK related to the PDCCH and/or PDSCH using the downlink beam-x; and determine that the terminal uses the second uplink beam to execute the following operation: transmitting the PUCCH configured to carry the ACK/NACK related to the PDCCH and/or PDSCH using the downlink beam-y; or, determine that the terminal uses the first uplink beam to execute the following operation: transmitting the PUCCH configured to carry the ACK/NACK related to the PDCCH and/or PDSCH using the downlink beam-x and the ACK/NACK related to the PDCCH and/or PDSCH using the downlink beam-y.

Or, the transmission unit 401 is configured to: inform, by the high-layer signaling, a plurality of uplink beams, wherein each uplink beam corresponds to one downlink beam or one group of downlink beams; and when only the PDCCH and/or PDSCH using the downlink beam-y is received, and the downlink beam-y corresponds to a second uplink beam in the plurality of uplink beams informed by the high-layer signaling: determine that the terminal transmits the PUCCH by using the second uplink beam; or, determine that the terminal transmits the PUCCH by using the first uplink beam, where the first uplink beam is different from the second uplink beam, and the PUCCH carries the ACK/NACK related to the PDCCH and/or PDSCH using the downlink beam-y.

In some embodiments, the transmission unit 401 is configured to transmit the indication signaling through the PDCCH.

In some embodiments, the ACK/NACK corresponding to the PDCCH is carried in the PUCCH, and the PDCCH is configured to indicate a downlink Semi-persistent Scheduling (SPS) resource to be released; and/or, the PDCCH corresponds to one PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, the terminal is determined to use any one or a combination of the following methods.

Method 1: the determination unit 402 is configured to take uplink beams determined based on the indication signalings in the plurality of PDCCHs as the uplink beams used for the PUCCH transmission, wherein indication contents of the various indication signalings received by the plurality of PDCCHs are the same; and the transmission unit 401 is configured to transmit the ACKs/NACKs related to the plurality of PDCCHs on the same PUCCH with the determined uplink beams.

Method 2: the determination unit 402 is configured to determine at least one uplink beam based on various indication signalings received through the plurality of PDCCHs, and select one uplink beam from the at least one uplink beam as the uplink beam used for the PUCCH transmission; and the transmission unit 401 is configured to transmit the ACKs/NACKs related to the plurality of PDCCHs on the same PUCCH with the determined uplink beam.

Method 3: the determination unit 402 is configured to select one PDCCH from the plurality of PDCCHs, and determine the uplink beam used for the PUCCH transmission according to the indication signaling received from the selected PDCCH; and the transmission unit 401 is configured to transmit the ACKs/NACKs related to the plurality of PDCCHs on the same PUCCH with the determined uplink beam.

In some embodiments, the determination unit 402 is configured to: select one beam from the at least one uplink beam as the uplink beam used for the PUCCH transmission according to a pre-configured or appointed uplink beam priority level or cell priority level.

Or, the determination unit 402 is configured to: when the at least one uplink beam includes a pre-configured or appointed uplink main beam, determine that the uplink main beam is taken as the uplink beam used for the PUCCH transmission; and when the at least one uplink beam does not include the uplink main beam, determine that an auxiliary beam with a specified number in the at least one beam is taken as the uplink beam used for the PUCCH transmission, where the uplink main beam is pre-configured or appointed.

Or, the determination unit 402 is configured to: when the at least one uplink beam includes an uplink beam corresponding to a pre-configured or appointed main cell, determine that the uplink beam corresponding to the main cell is taken as the uplink beam used for the PUCCH transmission; and when the at least one uplink beam does not include an uplink beam corresponding to the main cell, determine that an uplink beam corresponding to an auxiliary cell is taken as the uplink beam used for the PUCCH transmission.

In some embodiments, the determination unit 402 is configured to: select a PDCCH with the highest priority level from the plurality of PDCCHs according to a pre-configured or appointed downlink beam priority level, downlink beam group priority level or cell priority level, and determine the uplink beam used for the PUCCH transmission according to the indication signaling received from the selected PDCCH.

Or, the determination unit 402 is configured to: determine the uplink beam used for the PUCCH transmission according to an instruction received from a downlink main beam and carried by the PDCCH; and/or, determine the uplink beam used for the PUCCH transmission according to an instruction received from a main cell and carried by the PDCCH; and, when no instruction received from the downlink main beam or main cell and carried by the PDCCH is received, determine the uplink beam used for the PUCCH transmission according to an instruction carried by the PDCCH and received from a downlink auxiliary beam with a specified number; and/or, determine the uplink beam used for the PUCCH transmission according to an instruction carried by the PDCCH and received from an auxiliary cell, where the downlink main beam and the main cell are pre-configured or appointed.

Or, the determination unit 402 is configured to: determine the uplink beam used for the PUCCH transmission according to an instruction received from at least one downlink beam in a downlink main beam group and carried by the PDCCH; and when no instruction carried by the PDCCH is received from any one downlink beam in the downlink main beam group, determine the beam used for the PUCCH transmission according to an instruction received from a downlink beam in an auxiliary beam group and carried by the PDCCH; and if one beam group includes a plurality of downlink beams, determine a plurality of different PDCCHs needing to feed back the ACKs/NACKs at the same moment in the same downlink beam group, and determine that indication contents of signalings acquired from the plurality of different PDCCHs are the same, where the downlink main beam group is pre-configured or appointed.

In some embodiments, when a plurality of downlink beams and a plurality of uplink beams are divided into a plurality of groups, and the indication signalings in the PDCCHs using the downlink beams in the same group indicate the uplink beams in the same group, the determination unit 402 is configured to: determine that indication contents of the indication signalings in the PDCCHs received by the downlink beams of the same group are the same.

The transmission unit 401 is configured to transmit the PUCCH carrying the ACK/NACK related to the PDCCH using the downlink beam-x by the first uplink beam determined according to the indication signaling in the PDCCH using the downlink beam-x, wherein the downlink beam-x and the first uplink beam are in the same group.

The transmission unit 401 is configured to transmit the PUCCH carrying the ACK/NACK related to the PDCCH using the downlink beam-y by the second uplink beam determined according to the indication signaling in the PDCCH using the downlink beam-y, wherein the downlink beam-y and the second uplink beam are in the same group.

In some embodiments, the transmission unit 401 is configured to: pre-configure, by the high-layer signaling, one downlink main beam, and determine that the terminal determines one uplink main beam according to the downlink main beam and takes the uplink main beam as the uplink beam used for the PUCCH transmission.

Or, the transmission unit 401 is configured to: pre-configure, by the high-layer signaling, one main beam pair including one uplink main beam and one downlink main beam, and determine that the terminal takes the uplink main beam in the main beam pair as the uplink beam used for the PUCCH transmission.

Or, the transmission unit 401 is configured to: pre-configure, by the high-layer signaling, a plurality of beam groups, wherein each beam group corresponds to one uplink main beam, and each beam group includes one or more downlink beams; when the PDCCH and/or PDSCH transmitted by using the downlink beam in the first beam group is received, determine that the terminal transmits the PUCCH by using the first uplink main beam corresponding to the first beam group, wherein the PUCCH at least carries the ACK/NACK related to the PDCCH and/or PDSCH transmitted by using the downlink beam in the first beam group.

Or, the transmission unit 401 is configured to: pre-configure, by the high-layer signaling, a plurality of beam groups, wherein each beam group corresponds to one uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: determine that the terminal uses the first uplink main beam corresponding to the first beam group to transmit the PUCCH carrying the ACK/NACK related to the PDCCH and/or PDSCH transmitted by using the beams in the first beam group; and determine that the terminal uses the second uplink main beam corresponding to the second beam group to transmit the PUCCH carrying the ACK/NACK related to the PDCCH and/or PDSCH transmitted by using the beams in the second beam group; or, determine that the terminal uses the first uplink main beam corresponding to the first beam group to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, the transmission unit 401 is configured to: pre-configure, by the high-layer signaling, a plurality of beam groups, wherein each beam group corresponds to one uplink main beam, and each beam group includes one or more downlink beams; when only the PDCCH and/or PDSCH transmitted by using the downlink beam in the second beam group is received, determine that the terminal transmits the PUCCH by using the second uplink main beam corresponding to the second beam group, or the determine that the terminal transmits the PUCCH by using the first uplink main beam corresponding to the first beam group, where the PUCCH carries the ACK/NACK related to the PDCCH and/or PDSCH transmitted by using the downlink beam in the second beam group.

Embodiment V

Figure 5:
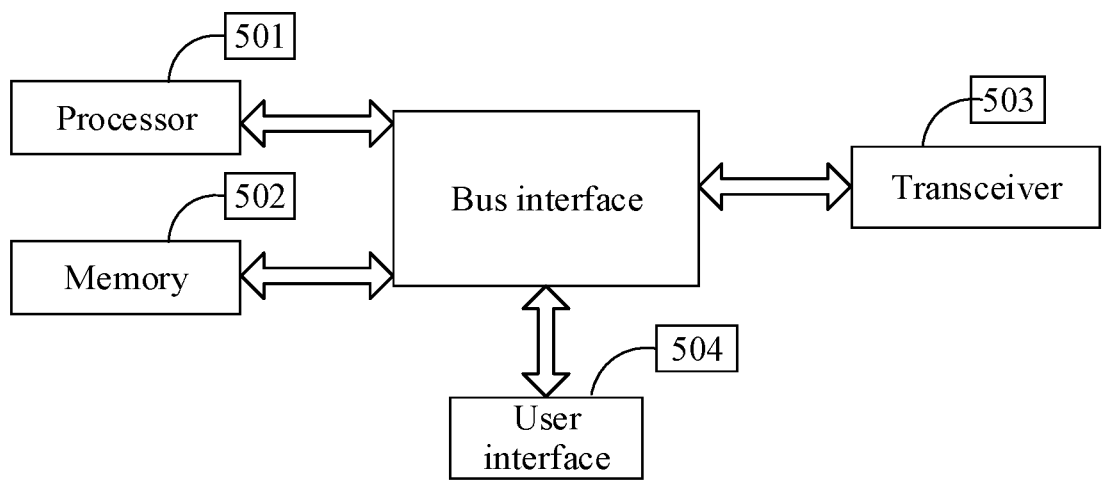
FIG. 5 is a structural schematic diagram of UE in an embodiment of the present disclosure.

Referring to FIG. 5, the embodiment of the present disclosure provides another UE. The UE includes a processor 501, and a memory 502 and a transceiver 503 connected with the processor 501.

In FIG. 5, a bus architecture may include any number of interconnected buses and bridges, and is particularly formed by linking one or more of processors represented by the processor 501 and various circuits of memories represented by the memory 502 together. The bus architecture may also link various other circuits such as peripherals, voltage regulators and power management circuits, and the various other circuits are well known in the art and, therefore, will not be further described herein. A bus interface provides an interface. The transceiver 503 may be a plurality of elements, namely including a transmitter and a receiver and providing units that communicate with various other apparatuses on a transmission medium. For different UE, a user interface 504 may be an interface capable of externally and internally connecting desired devices, and the connected devices include, but not limited to, a keypad, a display, a speaker, a microphone, a joystick, and the like.

The processor 501 is responsible for managing the bus architecture and performing usual processing, and the memory 502 may store data used when the processor 501 performs operations.

The processor 501 is configured to read a program in the memory 502 and perform the following processes that: an uplink beam used for PUCCH transmission is determined based on an acquired indication signaling; the transceiver 503 is controlled to perform the PUCCH transmission with the determined uplink beam.

In some embodiments, the process that the uplink beam used for PUCCH transmission is determined based on the acquired indication signaling includes that: a BPL is determined based on the acquired indication signaling, where the BPL is configured to determine the uplink beam used for the PUCCH transmission or a QCL relationship between a DMRS port of a PUCCH and a port on a resource of a first reference signal.

The process that the transceiver 503 is controlled to perform the PUCCH transmission with the determined uplink beam includes that: the transceiver 503 is controlled to perform the PUCCH transmission with the uplink beam corresponding to the BPL; or, the QCL relationship between the DMRS port of the PUCCH and the port on the resource of the first reference signal is determined according to the BPL, and the transceiver 503 is controlled to perform the PUCCH transmission by the QCL relationship.

In some embodiments, the process that the uplink beam used for PUCCH transmission is determined based on the acquired indication signaling includes that: a beam index for identifying the uplink beam for the PUCCH transmission is determined based on the acquired indication signaling.

The process that the transceiver 503 is controlled to perform the PUCCH transmission with the determined uplink beam includes that: the transceiver 503 is controlled to perform the PUCCH transmission with the uplink beam corresponding to the beam index.

In some embodiments, the process that the uplink beam used for PUCCH transmission is determined based on the acquired indication signaling includes that: QCL relationships between the DMRS port of the PUCCH and all the ports or the appointed ports on the resource of the first reference signal are determined based on the acquired indication signaling. The process that the transceiver 503 is controlled to perform the PUCCH transmission with the determined uplink beam includes that: the transceiver 503 is controlled to perform the PUCCH transmission by the QCL relationships.

In some embodiments, the process that the QCL relationships between the DMRS port of the PUCCH and all the ports or the appointed ports on the resource of the first reference signal are determined based on the acquired indication signaling, and the PUCCH transmission is performed by the QCL relationships includes the following operations.

A resource of a first reference signal in a plurality of pre-configured resources of the first reference signal is determined based on an acquired indication signaling; the DMRS port of the PUCCH and the port on the determined resource of the first reference signal are determined to have a QCL relationship; and the transceiver 503 is controlled to perform the PUCCH transmission by the QCL relationship.

Or, a resource of a first reference signal in a plurality of pre-configured resources of the first reference signal and at least one port on the resource of the first reference signal are determined based on the acquired indication signaling; the DMRS port of the PUCCH and the at least one port on the determined resource of the first reference signal are determined to have a QCL relationship; and the transceiver 503 is controlled to perform the PUCCH transmission by the QCL relationship.

In some embodiments, the process that the uplink beam used for PUCCH transmission is determined based on the acquired indication signaling includes that: the uplink beam used for the PUCCH transmission is determined based on an acquired high-layer signaling.

In some embodiments, the process that the uplink beam used for PUCCH transmission is determined based on the acquired high-layer signaling includes that: the high-layer signaling informs one uplink beam only, and the uplink beam informed by the high-layer signaling is determined to be used to perform the PUCCH transmission based on the acquired high-layer signaling.

In some embodiments, the process that the uplink beam used for the PUCCH transmission is determined based on the acquired high-layer signaling includes that the following operations.

The high-layer signaling informs a plurality of uplink beams, where each uplink beam corresponds to one downlink beam or one group of downlink beams; and when a PDCCH and/or a PDSCH using a downlink beam-x is received, and the downlink beam-x corresponds to a first uplink beam in the plurality of beams informed by the high-layer signaling: the first uplink beam is determined to be used to perform the PUCCH transmission, wherein the PUCCH at least carries an acknowledgement (ACK)/a non-acknowledgement (NACK) related to the PDCCH and/or PDSCH using the downlink beam-x.

Or, the high-layer signaling informs a plurality of uplink beams, wherein each uplink beam corresponds to one downlink beam or one group of downlink beams; and when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: the first uplink beam is determined to be used to execute the following operation: controlling the transceiver 503 to transmit the PUCCH configured to carry the ACK/NACK related to the PDCCH and/or PDSCH using the downlink beam-x, and the second uplink beam is determined to be used to execute the following operation: transmitting the PUCCH configured to carry the ACK/NACK related to the PDCCH and/or PDSCH using the downlink beam-y; or, the first uplink beam is determined to be used to execute the following operation: controlling the transceiver 503 to transmit the PUCCH configured to carry the ACK/NACK related to the PDCCH and/or PDSCH using the downlink beam-x and the ACK/NACK related to the PDCCH and/or PDSCH using the downlink beam-y.

Or, the high-layer signaling informs a plurality of uplink beams, where each uplink beam corresponds to one downlink beam or one group of downlink beams; and when only the PDCCH and/or PDSCH using the downlink beam-y is received, and the downlink beam-y corresponds to a second uplink beam in the plurality of uplink beams informed by the high-layer signaling: the second uplink beam is determined to be used to perform the PUCCH transmission; or, the first uplink beam is determined to be used to perform the PUCCH transmission, wherein the first uplink beam is different from the second uplink beam; the PUCCH carries the ACK/NACK related to the PDCCH and/or PDSCH using the downlink beam-y.

In some embodiments, the process that the uplink beam used for PUCCH transmission is determined based on the acquired indication signaling includes that: the uplink beam used for the PUCCH transmission is determined based on an indication signaling received from the PDCCH.

In some embodiments, the ACK/NACK corresponding to the PDCCH is carried in the PUCCH, and the PDCCH is configured to indicate a downlink SPS resource to be released; and/or, the PDCCH corresponds to one PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, any one or a combination of the following methods is used.

Method 1: uplink beams determined based on the indication signalings in the plurality of PDCCHs are taken as the uplink beams used for the PUCCH transmission, wherein indication contents of the various indication signalings received by the plurality of PDCCHs are the same; and the transceiver 503 is controlled to transmit the ACKs/NACKs related to the plurality of PDCCHs on the same PUCCH with the determined uplink beams.

Method 2: at least one uplink beam is determined based on various indication signalings received through the plurality of PDCCHs, and one uplink beam is selected from the at least one uplink beam as the uplink beam used for the PUCCH transmission; and the transceiver 503 is controlled to transmit the ACKs/NACKs related to the plurality of PDCCHs on the same PUCCH with the determined uplink beam.

Method 3: one PDCCH is selected from the plurality of PDCCHs, and the uplink beam used for the PUCCH transmission is determined according to the indication signaling received from the selected PDCCH; and the transceiver 503 is controlled to transmit the ACKs/NACKs related to the plurality of PDCCHs on the same PUCCH with the determined uplink beam.

In some embodiments, the process that one beam is selected from the at least one uplink beam as the uplink beam used for PUCCH transmission includes the following operations.

A beam is selected from the at least one uplink beam as the uplink beam used for the PUCCH transmission according to a pre-configured or appointed uplink beam priority level or cell priority level.

Or, when the at least one uplink beam includes a pre-configured or appointed uplink main beam, the uplink main beam is determined to be taken as the uplink beam used for the PUCCH transmission; and when the at least one uplink beam does not include the uplink main beam, an auxiliary beam with a specified number in the at least one beam is determined to be taken as the uplink beam used for the PUCCH transmission, where the uplink main beam is pre-configured or appointed.

Or, when the at least one uplink beam includes an uplink beam corresponding to a pre-configured or appointed main cell, the uplink beam corresponding to the main cell is determined to be taken as the uplink beam used for the PUCCH transmission; and when the at least one uplink beam does not include an uplink beam corresponding to the main cell, an uplink beam corresponding to an auxiliary cell is determined to be taken as the uplink beam used for the PUCCH transmission.

In some embodiments, the process that one PDCCH is selected from the plurality of PDCCHs, and the uplink beam used for PUCCH transmission is determined according to the indication signaling received from the selected PDCCH includes the following operations.

A PDCCH with the highest priority level is selected from the plurality of PDCCHs according to a pre-configured or appointed downlink beam priority level, downlink beam group priority level or cell priority level, and the uplink beam used for the PUCCH transmission is determined according to the indication signaling received from the selected PDCCH.

Or, the uplink beam used for the PUCCH transmission is determined according to an instruction received from a downlink main beam and carried by the PDCCH; and/or, the uplink beam used for the PUCCH transmission is determined according to an instruction received from a main cell and carried by the PDCCH; and, when no instruction carried by the PDCCH is received from the downlink main beam or main cell, the uplink beam used for the PUCCH transmission is determined according to an instruction carried by the PDCCH and received from a downlink auxiliary beam with a specified number; and/or, the uplink beam used for the PUCCH transmission is determined according to an instruction carried by the PDCCH and received from an auxiliary cell, where the downlink main beam and the main cell are pre-configured or appointed.

Or, the uplink beam used for the PUCCH transmission is determined according to an instruction received from at least one downlink beam in a downlink main beam group and carried by the PDCCH; and when no instruction carried by the PDCCH is received from any one downlink beam in the downlink main beam group, the beam used for the PUCCH transmission is determined according to an instruction received from a downlink beam in an auxiliary beam group and carried by the PDCCH; and if one beam group includes a plurality of downlink beams, a plurality of different PDCCHs needing to feed back the ACKs/NACKs at the same moment in the same downlink beam group are determined, and indication contents of signalings acquired from the plurality of different PDCCHs are determined to be the same, where the downlink main beam group is pre-configured or appointed.

In some embodiments, when a plurality of downlink beams and a plurality of uplink beams are divided into a plurality of groups, and the indication signalings in the PDCCHs using the downlink beams in the same group indicate the uplink beams in the same group, the following processes are executed: the indication contents of the indication signalings in the PDCCHs received by the downlink beams of the same group are determined to be the same; the transceiver 503 is controlled to transmit the PUCCH carrying the ACK/NACK related to the PDCCH using the downlink beam-x by the first uplink beam determined according to the indication signaling in the PDCCH using the downlink beam-x, wherein the downlink beam-x and the first uplink beam are in the same group; the transceiver 503 is controlled to transmit the PUCCH carrying the ACK/NACK related to the PDCCH using the downlink beam-y by the second uplink beam determined according to the indication signaling in the PDCCH using the downlink beam-y, wherein the downlink beam-y and the second uplink beam are in the same group.

In some embodiments, the process that the uplink beam used for PUCCH transmission is determined based on the acquired indication signaling includes the following operations.

The high-layer signaling pre-configures one downlink main beam, and one uplink main beam is determined according to the downlink main beam, and the uplink main beam is determined to be taken as the uplink beam used for the PUCCH transmission.

Or, the high-layer signaling pre-configures one main beam pair including one uplink main beam and one downlink main beam, and the uplink main beam in the main beam pair is determined to be taken as the uplink beam used for the PUCCH transmission.

Or, the high-layer signaling pre-configures a plurality of beam groups, wherein each beam group corresponds to one uplink main beam, and each beam group includes one or more downlink beams; when the PDCCH and/or PDSCH transmitted by using the downlink beam in the first beam group is received, the first uplink main beam corresponding to the first beam group is determined to be used to perform the PUCCH transmission, wherein the PUCCH at least carries the ACK/NACK related to the PDCCH and/or PDSCH transmitted by using the downlink beam in the first beam group.

Or, the high-layer signaling pre-configures a plurality of beam groups, wherein each beam group corresponds to one uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: the first uplink main beam corresponding to the first beam group is determined to be used to transmit the PUCCH carrying the ACK/NACK related to the PDCCH and/or PDSCH transmitted by using the beams in the first beam group; and the second uplink main beam corresponding to the second beam group is determined to be used to transmit the PUCCH carrying the ACK/NACK related to the PDCCH and/or PDSCH transmitted by using the beams in the second beam group; or, the first uplink main beam corresponding to the first beam group is determined to be used to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, the high-layer signaling pre-configures a plurality of beam groups, wherein each beam group corresponds to one uplink main beam, and each beam group includes one or more downlink beams; when only the PDCCH and/or PDSCH transmitted by using the downlink beam in the second beam group is received, the second uplink main beam corresponding to the second beam group is determined to be used for the PUCCH transmission, or the first uplink main beam corresponding to the first beam group is determined to be used for the PUCCH transmission, where the PUCCH carries the ACK/NACK related to the PDCCH and/or PDSCH transmitted by using the downlink beam in the second beam group.

Embodiment VI

Figure 6:
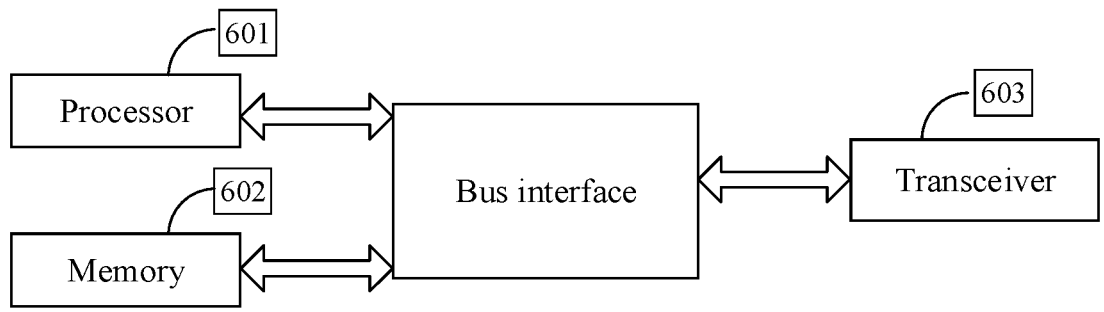
FIG. 6 is a structural schematic diagram of an apparatus in an embodiment of the present disclosure.

Referring to FIG. 6, the embodiment of the present disclosure provides another apparatus. The apparatus includes a processor 601, and a memory 602 and a transceiver 603 connected with the processor 601.

In FIG. 6, a bus architecture may include any number of interconnected buses and bridges, and is particularly formed by linking one or more of processors represented by the processor 601 and various circuits of memories represented by the memory 602 together. The bus architecture may also link various other circuits such as peripherals, voltage regulators and power management circuits, and the various other circuits are well known in the art and, therefore, will not be further described herein. A bus interface provides an interface. The transceiver 603 may be a plurality of elements, namely including a transmitter and a transceiver and providing units that communicate with various other apparatuses on a transmission medium. The processor 601 is responsible for managing the bus architecture and performing usual processing, and the memory 602 may store data used when the processor 601 performs operations.

The processor 601 is configured to read a program in the memory 602 and perform the following processes that: the transceiver 603 is controlled to transmit an indication signaling, the indication signaling being used by a terminal to determine an uplink beam used for PUCCH transmission; and the terminal is determined to transmit the PUCCH according to the uplink beam determined on the basis of the indication signaling.

In some embodiments, the process that the indication signaling is transmitted, the indication signaling being used by the terminal to determine the uplink beam used for PUCCH transmission includes that: the indication signaling indicates a BPL, where the BPL is configured to determine the uplink beam used for the PUCCH transmission or a QCL relationship between a DMRS port of a PUCCH and a port on a resource of a first reference signal.

The process that the terminal is determined to transmit the PUCCH according to the uplink beam determined on the basis of the indication signaling includes that: the terminal is determined to transmit the PUCCH with the uplink beam corresponding to the BPL; or, the terminal is determined to determine the QCL relationship between the DMRS port of the PUCCH and the port on the resource of the first reference signal according to the BPL, and transmit the PUCCH by the QCL relationship.

In some embodiments, the process that the transceiver 603 is controlled to transmit the indication signaling, the indication signaling being used by the terminal to determine the uplink beam used for PUCCH transmission includes that: the indication signaling indicates a beam index for identifying the uplink beam for the PUCCH transmission.

The process that the terminal is determined to transmit the PUCCH according to the uplink beam determined on the basis of the indication signaling includes that: the terminal is determined to transmit the PUCCH with the uplink beam corresponding to the beam index.

In some embodiments, the process that the transceiver 603 is controlled to transmit the indication signaling, the indication signaling being used by the terminal to determine the uplink beam used for PUCCH transmission includes that: the indication signaling indicates QCL relationships between the DMRS port of the PUCCH and all the ports or the appointed ports on the resource of the first reference signal; and the process that the terminal is determined to transmit the PUCCH according to the uplink beam determined on the basis of the indication signaling includes that: the terminal is determined to transmit the PUCCH by the QCL relationships.

In some embodiments, the process that the indication signaling indicates the QCL relationships between the DMRS port of the PUCCH and all the ports or the appointed ports on the resource of the first reference signal, and the PUCCH transmission is performed by the QCL relationships includes that: the indication signaling indicates a resource of a first reference signal in a plurality of pre-configured resources of the first reference signal; the terminal is determined to transmit the PUCCH according to the QCL relationship between the DMRS port of the PUCCH and the port on the resource of the first reference signal; or, the indication signaling indicates at least one port on one first reference signal resource in a plurality of pre-configured resources of the first reference signal; and the terminal is determined to transmit the PUCCH according to the QCL relationship between the DMRS port of the PUCCH and the at least one port on the resource of the first reference signal.

In some embodiments, the process that the transceiver 603 is controlled to transmit the indication signaling, the indication signaling being used by the terminal to determine the uplink beam used for PUCCH transmission includes that: the transceiver 603 is controlled to transmit the indication signaling through a high-layer signaling.

In some embodiments, the process that the transceiver 603 is controlled to transmit the indication signaling through the high-layer signaling includes that: the high-layer signaling informs one uplink beam only, and the terminal is determined to transmit the PUCCH with the uplink beam informed by the high-layer signaling.

In some embodiments, the process that the transceiver 603 is controlled to transmit the indication signaling through the high-layer signaling includes the following operations.

The high-layer signaling informs a plurality of uplink beams, wherein each uplink beam corresponds to one downlink beam or one group of downlink beams; and when a PDCCH and/or a PDSCH using a downlink beam-x is received, and the downlink beam-x corresponds to a first uplink beam in the plurality of beams informed by the high-layer signaling: the terminal is determined to transmit the PUCCH by the first uplink beam, wherein the PUCCH at least carries an ACK/NACK related to the PDCCH and/or PDSCH using the downlink beam-x.

Or, the high-layer signaling informs a plurality of uplink beams, wherein each uplink beam corresponds to one downlink beam or one group of downlink beams; and when a PDCCH and/or a PDSCH using the downlink beam-x is received, and the downlink beam-x corresponds to a first uplink beam in the plurality of beams informed by the high-layer signaling, and a PDCCH and/or a PDSCH using a downlink beam-y is also received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling: the terminal is determined to use the first uplink beam to execute the following operation: transmitting the PUCCH configured to carry the ACK/NACK related to the PDCCH and/or PDSCH using the downlink beam-x, and the terminal is determined to use the second uplink beam to execute the following operation: transmitting the PUCCH configured to carry the ACK/NACK related to the PDCCH and/or PDSCH using the downlink beam-y; or, the terminal is determined to use the first uplink beam to execute the following operation: transmitting the PUCCH configured to carry the ACK/NACK related to the PDCCH and/or PDSCH using the downlink beam-x and the ACK/NACK related to the PDCCH and/or PDSCH using the downlink beam-y.

Or, the high-layer signaling informs a plurality of uplink beams, wherein each uplink beam corresponds to one downlink beam or one group of downlink beams; and when only the PDCCH and/or PDSCH using the downlink beam-y is received, and the downlink beam-y corresponds to a second uplink beam in the plurality of uplink beams informed by the high-layer signaling: the terminal is determined to transmit the PUCCH by using the second uplink beam; or, the terminal is determined to transmit the PUCCH by using the first uplink beam, wherein the first uplink beam is different from the second uplink beam, where the PUCCH carries the ACK/NACK related to the PDCCH and/or PDSCH using the downlink beam-y.

In some embodiments, the process that the transceiver 603 is controlled to transmit the indication signaling, the indication signaling being used by the terminal to determine the uplink beam used for PUCCH transmission includes that: the transceiver 603 is controlled to transmit the indication signaling through the PDCCH.

In some embodiments, the ACK/NACK corresponding to the PDCCH is carried in the PUCCH, and the PDCCH is configured to indicate a downlink Semi-persistent Scheduling (SPS) resource to be released; and/or, the PDCCH corresponds to one PDSCH, and the ACK/NACK corresponding to the PDSCH is carried in the PUCCH; or, the PDCCH is a multicast PDCCH.

In some embodiments, when a plurality of PDCCHs are received, and ACK/NACK feedbacks related to the plurality of PDCCHs are transmitted at the same moment, the terminal is determined to use any one or a combination of the following methods.

Method 1: uplink beams determined based on the indication signalings in the plurality of PDCCHs are taken as the uplink beams used for the PUCCH transmission, wherein indication contents of the various indication signalings received by the plurality of PDCCHs are the same; the ACKs/NACKs related to the plurality of PDCCHs are transmitted on the same PUCCH with the determined uplink beams.

Method 2: at least one uplink beam is determined based on various indication signalings received through the plurality of PDCCHs, and one uplink beam is selected from the at least one uplink beam as the uplink beam used for the PUCCH transmission; the ACKs/NACKs related to the plurality of PDCCHs are transmitted on the same PUCCH with the determined uplink beam.

Method 3: one PDCCH is selected from the plurality of PDCCHs, and the uplink beam used for the PUCCH transmission is determined according to the indication signaling received from the selected PDCCH; the ACKs/NACKs related to the plurality of PDCCHs are transmitted on the same PUCCH with the determined uplink beam.

In some embodiments, the process that one beam is selected from the at least one uplink beam as the uplink beam used for PUCCH transmission includes the following operations.

One beam is selected from the at least one uplink beam as the uplink beam used for the PUCCH transmission according to a pre-configured or appointed uplink beam priority level or cell priority level.

Or, when the at least one uplink beam includes a pre-configured or appointed uplink main beam, the uplink main beam is determined to be taken as the uplink beam used for the PUCCH transmission; and when the at least one uplink beam does not include the uplink main beam, an auxiliary beam with a specified number in the at least one beam is determined to be taken as the uplink beam used for the PUCCH transmission, where the uplink main beam is pre-configured or appointed.

Or, when the at least one uplink beam includes an uplink beam corresponding to a pre-configured or appointed main cell, the uplink beam corresponding to the main cell is determined to be taken as the uplink beam used for the PUCCH transmission; and when the at least one uplink beam does not include an uplink beam corresponding to the main cell, an uplink beam corresponding to an auxiliary cell is determined to be taken as the uplink beam used for the PUCCH transmission.

In some embodiments, the process that one PDCCH is selected from the plurality of PDCCHs, and the uplink beam used for PUCCH transmission is determined according to the indication signaling received from the selected PDCCH includes the following operations.

A PDCCH with the highest priority level is selected from the plurality of PDCCHs according to a pre-configured or appointed downlink beam priority level, downlink beam group priority level or cell priority level, and the uplink beam used for the PUCCH transmission is determined according to the signaling received from the selected PDCCH.

Or, the uplink beam used for the PUCCH transmission is determined according to an instruction received from a downlink main beam and carried by the PDCCH; and/or, the uplink beam used for the PUCCH transmission is determined according to an instruction received from a main cell and carried by the PDCCH; and, when no instruction carried by the PDCCH is received from the downlink main beam or main cell, the uplink beam used for the PUCCH transmission is determined according to an instruction carried by the PDCCH and received from a downlink auxiliary beam with a specified number; and/or, the uplink beam used for the PUCCH transmission is determined according to an instruction carried by the PDCCH and received from an auxiliary cell, where the downlink main beam and the main cell are pre-configured or appointed.

Or, the uplink beam used for the PUCCH transmission is determined according to an instruction received from at least one downlink beam in a downlink main beam group and carried by the PDCCH; and when no instruction carried by the PDCCH is received from any one downlink beam in the downlink main beam group, the beam used for the PUCCH transmission is determined according to an instruction received from a downlink beam in an auxiliary beam group and carried by the PDCCH; and if one beam group includes a plurality of downlink beams, a plurality of different PDCCHs needing to feed back the ACKs/NACKs at the same moment in the same downlink beam group are determined, and indication contents of signalings acquired from the plurality of different PDCCHs are determined to be the same, where the downlink main beam group is pre-configured or appointed.

In some embodiments, when a plurality of downlink beams and a plurality of uplink beams are divided into a plurality of groups, and the indication signalings in the PDCCHs using the downlink beams in the same group indicate the uplink beams in the same group, the terminal is determined to execute the following processes that: the indication contents of the indication signalings in the PDCCHs received by the downlink beams of the same group are determined to be the same; the PUCCH carrying the ACK/NACK related to the PDCCH using the downlink beam-x is transmitted by the first uplink beam determined according to the indication signaling in the PDCCH using the downlink beam-x, wherein the downlink beam-x and the first uplink beam are in the same group; and the PUCCH carrying the ACK/NACK related to the PDCCH using the downlink beam-y is transmitted by the second uplink beam determined according to the indication signaling in the PDCCH using the downlink beam-y, wherein the downlink beam-y and the second uplink beam are in the same group.

In some embodiments, the process that the transceiver 603 is controlled to transmit the indication signaling, the indication signaling being used by the terminal to determine the uplink beam used for PUCCH transmission includes the following operations.

The high-layer signaling pre-configures one downlink main beam, and the terminal is determined to determine one uplink main beam according to the downlink main beam and takes the uplink main beam as the uplink beam used for the PUCCH transmission.

Or, the high-layer signaling pre-configures one main beam pair including one uplink main beam and one downlink main beam, and the terminal is determined to take the uplink main beam in the main beam pair as the uplink beam used for the PUCCH transmission.

Or, the high-layer signaling pre-configures a plurality of beam groups, wherein each beam group corresponds to one uplink main beam, and each beam group includes one or more downlink beams; when the PDCCH and/or PDSCH transmitted by using the downlink beam in the first beam group is received, the terminal is determined to transmit the PUCCH by using the first uplink main beam corresponding to the first beam group, wherein the PUCCH at least carries the ACK/NACK related to the PDCCH and/or PDSCH transmitted by using the downlink beam in the first beam group.

Or, the high-layer signaling pre-configures a plurality of beam groups, wherein each beam group corresponds to one uplink main beam, and each beam group includes one or more downlink beams; when the PDCCH and/or PDSCH transmitted by using the downlink beam in the first beam group and the PDCCH and/or PDSCH transmitted by using the downlink beam in the second beam group are received, and the ACK/NACK related to the PDCCH and/or PDSCH transmitted by using the downlink beam in the second beam group and the ACK/NACK related to the PDCCH and/or PDSCH transmitted by using the downlink beam in the first beam group are transmitted at the same moment: the terminal is determined to use the first uplink main beam corresponding to the first beam group to transmit the PUCCH carrying the ACK/NACK related to the PDCCH and/or PDSCH transmitted by using the beams in the first beam group; and the terminal is determined to use the second uplink main beam corresponding to the second beam group to transmit the PUCCH carrying the ACK/NACK related to the PDCCH and/or PDSCH transmitted by using the beams in the second beam group; or, the terminal is determined to use the first uplink main beam corresponding to the first beam group to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH.

Or, the high-layer signaling pre-configures a plurality of beam groups, wherein each beam group corresponds to one uplink main beam, and each beam group includes one or more downlink beams; when only the PDCCH and/or PDSCH transmitted by using the downlink beam in the second beam group is received, the terminal is determined to transmit the PUCCH by using the second uplink main beam corresponding to the second beam group, or the terminal is determined to transmit the PUCCH by using the first uplink main beam corresponding to the first beam group, where the PUCCH carries the ACK/NACK related to the PDCCH and/or PDSCH transmitted by using the downlink beam in the second beam group.

Embodiment VII

The high-layer signaling pre-informs a terminal of an uplink main beam. The terminal transmits a PUCCH by using the uplink main beam regardless of the number of PDCCHs received by the terminal and the type of the beams of the received PDCCHs. The PUCCH carries ACKs/

NACKs related to the PDCCHs (i.e., the ACKs/NACKs of the PDCCHs or the ACKs/NACKs of PDSCHs scheduled by the PDCCHs, this is also understood in the subsequent descriptions).

If a plurality of beams are directly maintained in the uplink, an uplink beam index may be directly informed. If there is no definition of a beam in the uplink, a BPL index may be informed. One uplink beam is determined to be taken as an uplink main beam according to the BPL, or a QCL relationship is informed in a way of informing a resource of a first reference signal or resource and port, so that transmission carried out according to the QCL relationship is regarded as transmission of the PUCCH by using the uplink main beam. Furthermore, it may also be understood or interpreted like this in other embodiments.

The beam may be directly embodied as beam, or the QCL relationship or the BPL. Furthermore, the beam may also be understood or interpreted like this in other embodiments.

Embodiment VIII

A high-layer signaling pre-informs a terminal of an uplink main beam 1 and an uplink main beam 2 (or referred to as an uplink auxiliary beam). The uplink main beams 1 and 2 respectively have corresponding relationships with one or more downlink beams. For example, if there are uplink beams 1 to 4 and downlink beams 1 to 4, the uplink beams 1 and 2 and the downlink beams 1 and 2 have corresponding relationships (for example, planned as one group and corresponding to one same TRP1), and the uplink beams 3 and 4 and the downlink beams 3 and 4 have corresponding relationships (for example, planned as one group and corresponding to one same TRP2). It is assumed that the high-layer signaling informs that the uplink main beam 1 is an uplink beam 1 and the uplink main beam 2 is an uplink beam 3.

One implementation mode is that: the terminal transmits a PUCCH by using the uplink main beam 1 regardless of the number of PDCCHs received by the terminal and the type of the beams of the received PDCCHs, and the PUCCH carries ACKs/NACKs related to the PDCCHs.

Another implementation mode is that: when the terminal receives PDCCHs (i.e., the PDCCH from the TRP1) using the downlink beam 1 and/or beam 2, the terminal transmits a PUCCH by using the uplink main beam 1 (i.e., the uplink beam 1), and the PUCCH carries ACKs/NACKs related to the PDCCHs using the downlink beam 1 and/or beam 2; when the terminal receives PDCCHs (i.e., the PDCCH from the TRP2) using the downlink beam 3 and/or beam 4, the terminal transmits a PUCCH by using the uplink main beam 2 (i.e., the uplink beam 3), and the PUCCH carries ACKs/NACKs related to the PDCCHs using the downlink beam 3 and/or beam 4; if the ACKs/NACKs related to the PDCCHs using the downlink beam 1 and/or beam 2 and the ACKs/NACKs related to the PDCCHs using the downlink beam 3 and/or beam 4 are transmitted at the same moment, the terminal may simultaneously transmit the two PUCCHs by respectively using the uplink main beam 1 and the uplink main beam 2 to respectively carry the ACKs/NACKs related to the corresponding PDCCHs, or the terminal may also transmit the ACKs/NACKs related to the PDCCHs by using the uplink main beam 1 on the same PUCCH.

Embodiment IX

It is assumed that there are a downlink beam 1, beam 2, beam 3, beam 4, beam 5, beam 6, and an uplink beam 1, beam 2, beam 3 and beam 4 (these uplink beams and downlink beams all correspond to one TRP, or the downlink beam 1, beam 2 and beam 3 and the uplink beam 1 and beam 2 are planned as one group and correspond to TRP1, and the downlink beam 4, beam 5 and beam 6 and the uplink beam 3 and beam 4 are planned as one group and correspond to TRP2, and an ideal backhaul is between the TRP1 and the TRP2), and the terminal receives a PDCCH by using a specific downlink beam (such as the downlink beam 1 or in a way of blind detection of the downlink beam 1 and beam 4), and the PDCCH includes a 2-bit indication domain that indicates the numbers of the uplink beams 1 to 4.

On first circumstance: when only the PDCCH using the beam 1 or the beam 4 is received, the uplink beam is directly determined according to the 2-bit indication domain in the received PDCCH, and the PUCCH is transmitted according to the determined uplink beam.

On second circumstance: when the PDCCHs using the beam 1 and the beam 4 are simultaneously received, and the ACKs/NACKs related to the PDCCHs are fed back at the same moment, and the 2-bit indication domains in the two PDCCHs indicate the same contents, the uplink beams are directly determined according to the 2-bit indication domains in the received PDCCHs, and the PUCCH is transmitted according to the determined uplink beams, and the PUCCH carries the ACKs/NACKs related to the PDCCHs using the beam 1 and the beam 4 at the same time.

On third circumstance: if the PDCCHs using the beam 1 and the beam 4 are simultaneously received, and the ACKs/NACKs related to the PDCCHs are fed back at the same moment, and the 2-bit indication domains in the two PDCCHs indicate different contents, selection is carried out according to a priority level of the downlink beams. For example, if it is defined that the priority levels of the downlink beam indexes are reduced in sequence from low to high, or the downlink beam 1 is a downlink main beam, or beam groups are defined, and the beam group including the downlink beam 1 has a high priority level, the uplink beam is determined according to the 2-bit indication domain in the PDCCH using the downlink beam 1, and the PUCCH is transmitted according to the determined uplink beam, and the PUCCH carries the ACKs/NACKs related to the PDCCHs using the beam 1 and the beam 4 at the same time.

On fourth circumference: if the PDCCHs using the beam 1 and the beam 4 are simultaneously received, and the ACK/NACK related to the PDCCH using the beam 1 and the ACK/NACK related to the PDCCH using the beam 4 are not fed back at the same moment, the uplink beam (such as the uplink beam 1) is determined according to the 2-bit indication domain in the PDCCH using the downlink beam 1, and the PUCCH carrying the ACK/NACK related to the PDCCH using the downlink beam 1 is transmitted according to the uplink beam at the corresponding moment 1; and the uplink beam (such as the uplink beam 2) is determined according to the 2-bit indication domain in the PDCCH using the downlink beam 4, and the PUCCH carrying the ACK/NACK related to the PDCCH using the downlink beam 4 is transmitted according to the uplink beam at the corresponding moment 2.

Embodiment X

It is assumed that there are a downlink beam 1, beam 2, beam 3, beam 4, beam 5 and beam 6, and an uplink beam 1, beam 2, beam 3 and beam 4, where the downlink beam 1, beam 2 and beam 3 and the uplink beam 1 and beam 2 are planned as one group (corresponding to TRP1), and the downlink beam 4, beam 5 and beam 6 and the uplink beam 3 and beam 4 are planned as one group (corresponding to TRP2, and a non-ideal backhaul is between the TRP1 and the TRP2). The terminal receives a PDCCH by using a specific downlink beam (such as the downlink beam 1 and beam 4), and the PDCCH includes a 1-bit indication domain, and the 1-bit indicatin domain indicates the numbers of the two uplink beams in each group.

On first circumstance: when only the PDCCH using the beam 1 or the beam 4 is received, the uplink beam is directly determined according to the 1-bit indication domain in the received PDCCH, and the PUCCH is transmitted according to the determined uplink beam.

On second circumference: if the PDCCHs using the beam 1 and the beam 4 are simultaneously received, and ACKs/NACKs related to the PDCCHs using the beam 1 and the beam 4 are fed back at the same moment, the uplink beam (such as the uplink beam 1) is determined according to the 1-bit indication domain in the PDCCH using the downlink beam 1, and the PUCCH carrying the ACK/NACK related to the PDCCH using the downlink beam 1 is transmitted according to the uplink beam; and the uplink beam (such as the uplink beam 3) is determined according to the 1-bit indication domain in the PDCCH using the downlink beam 4, and the PUCCH carrying the ACK/NACK related to the PDCCH using the downlink beam 4 is transmitted according to the uplink beam, that is the two PUCCHs using different uplink beams are simultaneously transmitted at the same moment.

On third circumference: if the PDCCHs using the beam 1 and the beam 4 are simultaneously received, and the ACK/NACK related to the PDCCH using the beam 1 and the ACK/NACK related to the PDCCH using the beam 4 are not fed back at the same moment, the uplink beam (such as the uplink beam 1) is determined according to the 1-bit indication domain in the PDCCH using the downlink beam 1, and the PUCCH carrying the ACK/NACK related to the PDCCH using the downlink beam 1 is transmitted according to the uplink beam at the corresponding moment 1; and the uplink beam (such as the uplink beam 3) is determined according to the 1-bit indication domain in the PDCCH using the downlink beam 4, and the PUCCH carrying the ACK/NACK related to the PDCCH using the downlink beam 4 is transmitted according to the uplink beam at the corresponding moment 2.

Embodiment XI

The high-layer signaling pre-informs a terminal of one downlink main beam. The downlink main beam corresponds to one uplink beam according to the reciprocity between uplink and downlink, or a pair relationship between the downlink beam and the uplink beam is pre-defined, so that the terminal transmits a PUCCH by using the uplink beam determined according to the downlink main beam regardless of the number of PDCCHs received by the terminal and the type of the beams of the received PDCCHs, and the PUCCH carries the ACKs/NACKs related to the PDCCH.

Embodiment XII

The high-layer signaling pre-informs a terminal of a downlink main beam 1 and a downlink main beam 2 (or referred to as a downlink auxiliary beam), and the downlink main beams 1 and 2 respectively have a corresponding relationship (the reciprocity between uplink and downlink) with an uplink beam. For example, if there are uplink beams 1 to 4 and downlink beams 1 to 4, the uplink beams 1 and 2 and the downlink beams 1 and 2 are planned as one group, where the downlink beam 1 is the main downlink beam 1 (corresponding to the same TRP1). The uplink beams 3 and 4 and the downlink beams 3 and 4 are planned as one group, and the downlink beam 3 is a main downlink beam 2 (corresponding to the same TRP2).

The first implementation mode is that: the terminal transmits a PUCCH by using an uplink beam determined according to the downlink main beam 1 regardless of the number of PDCCHs received by the terminal and the type of the beams of the received PDCCHs, and the PUCCH carries ACKs/NACKs related to the PDCCHs.

The second implementation mode is that: when the terminal receives PDCCHs (i.e., the PDCCH from the TRP1) using the downlink beam 1 and/or beam 2, the terminal transmits a PUCCH by using the uplink beam (it is assumed that the uplink beam is determined to be the uplink beam 1 according to the reciprocity between uplink and downlink or the pre-set pair relationship) determined according to the downlink main beam 1, and the PUCCH carries the ACKs/NACKs related to the PDCCHs using the downlink beam 1 and/or beam 2; when the terminal receives PDCCHs (i.e., the PDCCH from the TRP2) using the downlink beam 3 and/or beam 4, the terminal transmits a PUCCH by using the uplink beam (it is assumed that the uplink beam is determined to be the uplink beam 3 according to the reciprocity between uplink and downlink or the pre-set pair relationship) determined according to the downlink main beam 2, and the PUCCH carries the ACKs/NACKs related to the PDCCH using the downlink beam 3 and/or beam 4; if the ACKs/NACKs related to the PDCCHs using the downlink beam 1 and/or beam 2 and the ACKs/NACKs related to the PDCCHs using the downlink beam 3 and/or beam 4 are transmitted at the same moment, the terminal may simultaneously transmit the two PUCCHs by respectively using the uplink beam (the uplink beam 1) determined according to the downlink main beam 1 and the uplink beam (the uplink beam 3) determined according to the downlink main beam 1, the two PUCCHs respectively carry the ACKs/NACKs related to the corresponding PDCCHs, or the terminal may also transmit the ACKs/NACKs related to all the above PDCCHs on the same PUCCH by using the uplink beam (the uplink beam 1) determined according to the downlink main beam 1.

One or more technical solutions in the above technical solutions have the following technical effects or advantages.

First, in the embodiments of the present disclosure, the method for determining the uplink beam used for the PUCCH transmission in a 5 Generation New RAT (5G NR) is provided, and can support a PUCCH transmission scene in a new wireless communication system to ensure correct transmission of the PUCCH.

Second, in the embodiments of the present disclosure, the uplink beam used for the PUCCH transmission is determined on the basis of the acquired indication signaling, so that the PUCCH transmission method in the embodiments of the present disclosure can adjust the uplink beam needing to be used through the indication signaling according to an actual need, and can adapt to various working environments and meet a demand for high reliability.

Although the embodiments of the present disclosure have been described, those skilled in the art can make other changes and modifications to these embodiments once they acquire the basic creative concept. Therefore, attached claims are intended to be explained as including the embodiments and all the changes and modifications that fall within the scope of the present disclosure.

Those skilled in the art should understand that the embodiments of the present disclosure may provide a method, a system or a computer program product. Therefore, the present disclosure may adopt the form of a complete hardware embodiment, a complete software embodiment, or a software and hardware combination embodiment. In addition, the present disclosure may adopt the form of a computer program product implemented on one or multiple computer-available storage media (including, but not limited to, a magnetic disk memory, a Compact Disc Read-Only Memory (CD-ROM), an optical memory and the like) including computer-sensitive program codes.

The present disclosure is described by referring to flow diagrams and/or block diagrams of methods, devices (systems) and computer program products according to the embodiments of the present disclosure. It should be understood that computer program instructions may implement each flow and/or each block in the flowcharts and/or the block diagrams and combination of the flows and/or the blocks in the flowcharts and/or the block diagrams. These computer program instructions may be provided for a general computer, a dedicated computer, an embedded processor or processing units of other programmable data processing devices to generate a machine, thereby making the instructions that are executed by the computer or the processing units of other programmable data processing devices generate apparatuses for realizing specified functions in one or multiple flows of the flowcharts and/or one or multiple blocks of the block diagrams.

These computer program instructions also may be stored in a computer readable memory capable of guiding the computer or other programmable data processing devices to work in a specific manner, thereby making the instructions that are stored in the computer readable memory generate manufactured products that include instruction apparatuses. The instruction apparatuses realize the specified functions in one or multiple flows of the flowcharts and/or one or multiple blocks of the block diagrams.

These computer program instructions also may be loaded onto the computer or other programmable data processing devices to execute a series of operation steps on the computer or other programmable data processing devices to generate computer implemented processing, so that the instructions executed on the computer or other programmable data processing devices provide steps for realizing the specified functions in one or multiple flows of the flowcharts and/or one or multiple blocks of the block diagrams.

Although the embodiments of the present disclosure have been described, those skilled in the art can make other changes and modifications to these embodiments once they acquire the basic creative concept. Therefore, attached claims are intended to be explained as including the embodiments and all the changes and modifications that fall within the scope of the present disclosure.

Obviously, those skilled in the art can make various changes and transformations to the embodiments of the present disclosure without departing from the spirit and scope of the present disclosure. Therefore, if these changes and transformations of the embodiments of the present disclosure fall within the scope of the claims of the present disclosure and equivalent technologies of the present disclosure, the present disclosure is intended to include these changes and modifications.

What is claimed is:

1. A Physical Uplink Control Channel (PUCCH) transmission method, comprising:

determining an uplink beam used for PUCCH transmission based on an acquired indication signaling; and performing the PUCCH transmission with the determined uplink beam;

wherein the determining the uplink beam used for the PUCCH transmission based on the acquired indication signaling comprises one of the following methods:

method 1:

determining a Beam Pair Linkage (BPL) based on the acquired indication signaling, wherein the BPL is configured to determine the uplink beam used for the PUCCH transmission or a Quasi-Co-Location (QCL) relationship between a Demodulation Reference Signal (DMRS) port of the PUCCH and a port on a resource of a first reference signal; and the performing the PUCCH transmission with the determined uplink beam comprises:

performing the PUCCH transmission with an uplink beam corresponding to the BPL; or, determining the QCL relationship between a DMRS port of the PUCCH and a port on the resource of the first reference signal according to the BPL, and performing the PUCCH transmission by the QCL relationship;

method 2:

determining a beam index for identifying the uplink beam for the PUCCH transmission based on the acquired indication signaling; and the performing the PUCCH transmission with the determined uplink beam comprises:

performing the PUCCH transmission with the uplink beam corresponding to the beam index;

method 3:

determining QCL relationships between a DMRS port of the PUCCH and all ports or appointed ports on a resource of a first reference signal based on the acquired indication signaling; and the performing the PUCCH transmission with the determined uplink beam comprises:

performing the PUCCH transmission by the QCL relationships;

wherein the method 3 further comprises:

determining a resource of a first reference signal in a plurality of pre-configured resources of the first reference signal based on the acquired indication signaling;

determining that a DMRS port of the PUCCH and a port on the determined resource of the first reference signal have a QCL relationship; and performing the PUCCH transmission by the QCL relationship;

or, determining a resource of a first reference signal in a plurality of pre-configured resources of the first reference signal and at least one port on the determined resource of the first reference signal based on the acquired indication signaling;

determining that a DMRS port of the PUCCH and the at least one port on the determined resource of the first reference signal have a QCL relationship; and performing the PUCCH transmission by the QCL relationship.

2. The method according to claim 1, wherein the determining the uplink beam used for the PUCCH transmission based on the acquired indication signaling comprises one of the following methods:

method 4:
determining the uplink beam used for the PUCCH transmission based on the acquired high-layer signaling;

method 5:
determining the uplink beam used for the PUCCH transmission based on the indication signaling received from a PDCCH;

method 6:
pre-configuring, by a high-layer signaling, a downlink main beam, determining an uplink main beam according to the downlink main beam, and determining that the uplink main beam is taken as the uplink beam used for the PUCCH transmission;

method 7:
pre-configuring, by a high-layer signaling, a main beam pair comprising an uplink main beam and a downlink main beam, and determining that the uplink main beam in the main beam pair is taken as the uplink beam used for the PUCCH transmission;

method 8:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a first beam group is received, determining that a first uplink main beam corresponding to the first beam group is used for the PUCCH transmission, wherein the PUCCH carries at least an ACK/NACK related to the PDCCH and/or PDSCH transmitted by using the downlink beam in the first beam group;

method 9:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a first beam group and a PDCCH and/or PDSCH transmitted by using the downlink beam in a second beam group are received, and an ACK/NACK related to the PDCCH and/or PDSCH transmitted by using the downlink beam in the second beam group and an ACK/NACK related to the PDCCH and/or PDSCH transmitted by using the downlink beam in the first beam group are transmitted at the same moment:
determining that a first uplink main beam corresponding to the first beam group is used to transmit a PUCCH carrying the ACK/NACK related to the PDCCH and/or PDSCH transmitted by using the downlink beam in the first beam group; and determining that a second uplink main beam corresponding to the second beam group is used to transmit a PUCCH carrying the ACK/NACK related to the PDCCH and/or PDSCH transmitted by using the downlink beam in the second beam group;
or, determining that a first uplink main beam corresponding to the first beam group is used to transmit and carry the ACK/NACK related to the PDCCH and/or PDSCH transmitted by using the beams in the first beam group and the ACK/NACK related to the PDCCH and/or PDSCH transmitted by using the beams in the second beam group on the same PUCCH;

method 10:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a second beam group is received, determining that a second uplink main beam corresponding to the second beam group is used for the PUCCH transmission, or determining that a first uplink main beam corresponding to a first beam group is used for the PUCCH transmission,
wherein the PUCCH carries an ACK/NACK related to the PDCCH and/or PDSCH transmitted by using the downlink beam in the second beam group.

3. The method according to claim 2, wherein the method comprises:
informing, by the high-layer signaling, an uplink beam, and determining that the uplink beam informed by the high-layer signaling is used to perform the PUCCH transmission based on the acquired high-layer signaling;

or, informing, by the high-layer signaling, a plurality of uplink beams, wherein each uplink beam corresponds to a downlink beam or a downlink beams group; and when a Physical Downlink Control Channel (PDCCH) and/or a Physical Downlink Shared Channel (PDSCH) using a downlink beam-x is received, and the downlink beam-x corresponds to a first uplink beam in the plurality of uplink beams informed by the high-layer signaling:
determining that the first uplink beam is used for the PUCCH transmission, wherein the PUCCH carries at least an acknowledgement, ACK/a non-acknowledgement, NACK, related to the PDCCH and/or PDSCH using the downlink beam-x;

or, informing, by the high-layer signaling, a plurality of uplink beams, wherein each uplink beam corresponds to a downlink beam or a downlink beams group; and when a PDCCH and/or a PDSCH using a downlink beam-x is received, the downlink beam-x corresponds to a first uplink beam in the plurality of uplink beams informed by the high-layer signaling, a PDCCH and/or a PDSCH using a downlink beam-y is received, an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling:
determining that the first uplink beam is used to execute a following operation: transmitting the PUCCH that carries the ACK/NACK related to the PDCCH and/or PDSCH using the downlink beam-x, and determining that the second uplink beam is used to execute a following operation: transmitting the PUCCH that carries the ACK/NACK related to the PDCCH and/or PDSCH using the downlink beam-y; or,
determining that the first uplink beam is used to execute a following operation: transmitting the ACK/NACK related to the PDCCH and/or PDSCH using the downlink beam-x and the ACK/NACK related to the PDCCH and/or PDSCH using the downlink beam-y on the same PUCCH;

or,
informing, by the high-layer signaling, a plurality of uplink beams, wherein each uplink beam corresponds to a downlink beam or a downlink beams group; and when PDCCH and/or PDSCH using a downlink beam-y is received, and the downlink beam-y corresponds to a second uplink beam in the plurality of uplink beams informed by the high-layer signaling:
determining that the second uplink beam is used to perform the PUCCH transmission; or,
determining that a first uplink beam is used to perform the PUCCH transmission, wherein the first uplink beam is different from the second uplink beam;
wherein the PUCCH carries an ACK/NACK related to the PDCCH and/or PDSCH using the downlink beam-y.

4. The method according to claim 2, wherein the method further comprises at least one of the following methods:
method 11:
when a plurality of PDCCHs are received, and ACK/NACK feedbacks related to the plurality of PDCCHs are transmitted at the same moment, at least one of following schemes is used:
scheme 1:
taking uplink beams determined based on indication signalings in the plurality of PDCCHs as uplink beams used for the PUCCH transmission, wherein indication contents of the indication signalings received by the plurality of PDCCHs are the same; and
transmitting ACKs/NACKs related to the plurality of PDCCHs on the same PUCCH with the determined uplink beams;
scheme 2:
determining at least one uplink beam based on indication signalings received through the plurality of PDCCHs, and selecting an uplink beam from the at least one uplink beam as the uplink beam used for the PUCCH transmission; and
transmitting ACKs/NACKs related to the plurality of PDCCHs on the same PUCCH with the determined uplink beam;
scheme 3:
selecting a PDCCH from the plurality of PDCCHs, and determining the uplink beam used for the PUCCH transmission according to an indication signaling received from the selected PDCCH; and
transmitting ACKs/NACKs related to the plurality of PDCCHs on the same PUCCH with the determined uplink beam;
method 12:
when a plurality of downlink beams and a plurality of uplink beams are divided into a plurality of groups, and indication signalings in PDCCHs using downlink beams in the same group indicate uplink beams in the same group, the method further comprises:
transmitting a PUCCH carrying an ACK/NACK related to a PDCCH using a downlink beam by an uplink beam determined according to an indication signaling in the PDCCH using the downlink beam, wherein the downlink beam and the uplink beam are in the same group,
wherein indication contents of indication signalings in PDCCHs received by downlink beams of the same group are the same.

5. The method according to claim 4, wherein the selecting the uplink beam from the at least one uplink beam as the uplink beam used for the PUCCH transmission comprises one of the following methods:
method 13:
selecting the uplink beam in the at least one uplink beam as the uplink beam used for the PUCCH transmission according to a pre-configured or appointed uplink beam priority level or cell priority level;
method 14:
when the at least one uplink beam comprises a pre-configured or appointed uplink main beam, determining that the pre-configured or appointed uplink main beam is taken as the uplink beam used for the PUCCH transmission; and
when the at least one uplink beam does not comprise an uplink main beam, determining that an auxiliary beam with a specified number in the at least one uplink beam is taken as the uplink beam used for the PUCCH transmission,
wherein the uplink main beam is pre-configured or appointed;
method 15:
when the at least one uplink beam comprises an uplink beam corresponding to a pre-configured or appointed main cell, determining that the uplink beam corresponding to the pre-configured or appointed main cell is taken as the uplink beam used for the PUCCH transmission; and
when the at least one uplink beam does not comprise an uplink beam corresponding to a main cell, determining that an uplink beam corresponding to an auxiliary cell is taken as the uplink beam used for the PUCCH transmission;
and/or,
the selecting the PDCCH from the plurality of PDCCHs, and determining the uplink beam used for the PUCCH transmission according to the indication signaling received from the selected PDCCH comprises one of the following methods:
method 16:
selecting a PDCCH with a highest priority level from the plurality of PDCCHs according to a pre-configured or appointed downlink beam priority level, downlink beam group priority level or cell priority level, and determining the uplink beam used for the PUCCH transmission according to the indication signaling received from the selected PDCCH;
method 17:
determining the uplink beam used for the PUCCH transmission according to an indication signaling in a PDCCH transmitted by using a downlink main beam; and/or, determining the uplink beam used for the PUCCH transmission according to an indication signaling in a PDCCH received from a main cell;
and,
when no PDCCH transmitted by using the downlink main beam is received or no PDCCH is received from the main cell, determining the uplink beam used for the PUCCH transmission according to an indication signaling in a received PDCCH using a specifically numbered downlink auxiliary beam; and/or, determining the uplink beam used for the PUCCH transmission according to an indication signaling in a PDCCH received from a specifically numbered auxiliary cell,
wherein the downlink main beam and the main cell are pre-configured or appointed;

method 18:
determining the uplink beam used for the PUCCH transmission according to an indication signaling in a PDCCH transmitted by using at least one downlink beam in a downlink main beam group; and
when no PDCCH using any one downlink beam in the downlink main beam group is received, determining the uplink beam used for the PUCCH transmission according to an indication signaling in a PDCCH transmitted by using a downlink beam in an auxiliary beam group, wherein when a beam group comprises a plurality of downlink beams, contents indicated by indication signalings in the plurality of PDCCHs needing to perform ACK/NACK feedbacks at the same moment in the same downlink beam group are the same,
wherein the downlink main beam group is pre-configured or appointed.

6. A Physical Uplink Control Channel (PUCCH) transmission method, comprising:
transmitting an indication signaling, the indication signaling being used by a terminal to determine an uplink beam used for PUCCH transmission; and
determining that the terminal transmits a PUCCH according to the uplink beam determined according to the indication signaling;
wherein the transmitting the indication signaling, the indication signaling being used by the terminal to determine the uplink beam used for the PUCCH transmission comprises one of the following methods:
method 1:
indicating, by the indication signaling, a Beam Pair Linkage (BPL) wherein the BPL is configured to determine the uplink beam used for the PUCCH transmission or a Quasi-Co-Location (QCL) relationship between a Demodulation Reference Signal (DMRS) port of the PUCCH and a port on a resource of a first reference signal; and
the determining that the terminal transmits the PUCCH according to the uplink beam determined according to the indication signaling comprises:
determining that the terminal transmits the PUCCH with an uplink beam corresponding to the BPL; or,
determining that the terminal determines the QCL relationship between a DMRS port of the PUCCH and a port on the resource of the first reference signal, and performs the PUCCH transmission by the QCL relationship;
method 2:
indicating, by the indication signaling, a beam index for identifying the uplink beam used for the PUCCH transmission; and
the determining that the terminal transmits the PUCCH according to the uplink beam determined according to the indication signaling comprises:
determining that the terminal transmits the PUCCH with the uplink beam corresponding to the beam index;
method 3:
indicating, by the indication signaling, QCL relationships between a DMRS port of the PUCCH and all ports or appointed ports on a resource of a first reference signal; and
the determining that the terminal transmits the PUCCH according to the uplink beam determined according to the indication signaling comprises:
determining that the terminal performs the PUCCH transmission by the QCL relationships;
wherein the method 3 comprises:
indicating, by the indication signaling, a resource of a first reference signal in a plurality of pre-configured resources of the first reference signal; and
determining that the terminal performs the PUCCH transmission according to a QCL relationship between a DMRS port of the PUCCH and a port on the indicated first reference signal resource;
or, indicating, by the indication signaling, at least one port on a resource of a first reference signal in a plurality of pre-configured resources of the first reference signal; and
determining that the terminal performs the PUCCH transmission according to a QCL relationship between a DMRS port of the PUCCH and the at least one port on the resource of the first reference signal.

7. The method according to claim 6, wherein the transmitting the indication signaling, the indication signaling being used by the terminal to determine the uplink beam used for the PUCCH transmission comprises one of the following methods:
method 4:
transmitting the indication signaling through a high-layer signaling;
method 5:
transmitting the indication signaling through a PDCCH;
method 6:
pre-configuring, by a high-layer signaling, a downlink main beam, determining that the terminal determines an uplink main beam according to the downlink main beam and takes the uplink main beam as the uplink beam used for the PUCCH transmission;
method 7:
pre-configuring, by a high-layer signaling, a main beam pair comprising an uplink main beam and a downlink main beam, and determining that the terminal takes the uplink main beam in the main beam pair as the uplink beam used for the PUCCH transmission;
method 8:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a first beam group is received, determining that the terminal performs the PUCCH transmission by using a first uplink main beam corresponding to the first beam group, wherein the PUCCH carries at least an ACK/NACK related to the PDCCH and/or PDSCH transmitted by using the downlink beam in the first beam group;
method 9:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a first beam group and a PDCCH and/or PDSCH transmitted by using the downlink beam in a second beam group are received, and an ACK/NACK related to the PDCCH and/or PDSCH transmitted by using the downlink beam in the second beam group and an ACK/NACK related to the PDCCH and/or PDSCH transmitted by using the downlink beam in the first beam group are transmitted at the same moment:
determining that the terminal uses a first uplink main beam corresponding to the first beam group to transmit a PUCCH carrying the ACK/NACK related to the PDCCH and/or PDSCH transmitted by using the downlink beam in the first beam group; and determining that the terminal uses a second uplink main beam corresponding to the second beam group to transmit a PUCCH carrying the ACK/NACK related to the PDCCH and/or PDSCH transmitted by using the downlink beam in the second beam group;

or, determining that the terminal uses the first uplink main beam corresponding to the first beam group to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH;

method 10:

pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a second beam group is received, determining that the terminal performs the PUCCH transmission by using a second uplink main beam corresponding to the second beam group, or determining that the terminal performs the PUCCH transmission by using a first uplink main beam corresponding to a first beam group, wherein the PUCCH carries an ACK/NACK related to the PDCCH and/or PDSCH transmitted by using the downlink beam in the second beam group.

8. The method according to claim 7, wherein the method 7 comprises:

informing, by the high-layer signaling, one uplink beam, and determining that the terminal performs the PUCCH transmission with the uplink beam informed by the high-layer signaling;

or, informing, by the high-layer signaling, a plurality of uplink beams, wherein each uplink beam corresponds to a downlink beam or a downlink beams group; and when a Physical Downlink Control Channel (PDCCH) and/or a Physical Downlink Shared Channel (PDSCH) using a downlink beam-x is received, and the downlink beam-x corresponds to a first uplink beam in the plurality of uplink beams informed by the high-layer signaling:

determining that the terminal performs the PUCCH transmission by the first uplink beam, wherein the PUCCH carries at least an acknowledgement (ACK)/a non-acknowledgement (NACK) related to the PDCCH and/or PDSCH using the downlink beam-x;

or, informing, by the high-layer signaling, a plurality of uplink beams, wherein each uplink beam corresponds to a downlink beam or a downlink beams group; and when a PDCCH and/or a PDSCH using a downlink beam-x is received, the downlink beam-x corresponds to a first uplink beam in the plurality of uplink beams informed by the high-layer signaling, a PDCCH and/or a PDSCH using a downlink beam-y is received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling:

determining that the terminal uses the first uplink beam to execute a following operation: transmitting the PUCCH configured to carry the ACK/NACK related to the PDCCH and/or PDSCH using the downlink beam-x, and determining that the terminal uses the second uplink beam to execute a following operation: transmitting the PUCCH configured to carry the ACK/NACK related to the PDCCH and/or PDSCH using the downlink beam-y; or, determining that the terminal uses the first uplink beam to execute a following operation: transmitting the ACK/NACK related to the PDCCH and/or PDSCH using the downlink beam-x and the ACK/NACK related to the PDCCH and/or PDSCH using the downlink beam-y on the same PUCCH;

or, informing, by the high-layer signaling, a plurality of uplink beams, wherein each uplink beam corresponds to a downlink beam or a downlink beams group; and when the PDCCH and/or PDSCH using a downlink beam-y is received, and the downlink beam-y corresponds to a second uplink beam in the plurality of uplink beams informed by the high-layer signaling:

determining that the terminal performs the PUCCH transmission by using the second uplink beam; or, determining that the terminal performs the PUCCH transmission by using a first uplink beam, wherein the first uplink beam is different from the second uplink beam;

wherein the PUCCH carries an ACK/NACK related to the PDCCH and/or PDSCH using the downlink beam-y.

9. The method according to claim 7, wherein the method further comprises at least one of the following methods:

method 11:

when a plurality of PDCCHs are received, and ACK/NACK feedbacks related to the plurality of PDCCHs are transmitted at the same moment, the terminal is determined to use at least one of following schemes:

scheme 1:

taking uplink beams determined based on indication signalings in the plurality of PDCCHs as uplink beams used for the PUCCH transmission, wherein indication contents of the indication signalings received by the plurality of PDCCHs are the same; and transmitting ACKs/NACKs related to the plurality of PDCCHs on the same PUCCH with the determined uplink beams;

scheme 2:

determining at least one uplink beam based on indication signalings received through the plurality of PDCCHs, and selecting an uplink beam from the at least one uplink beam as the uplink beam used for the PUCCH transmission; and transmitting ACKs/NACKs related to the plurality of PDCCHs on the same PUCCH with the determined uplink beam;

scheme 3:

selecting a PDCCH from the plurality of PDCCHs, and determining the uplink beam used for the PUCCH transmission according to an indication signaling received from the selected PDCCH; and transmitting ACKs/NACKs related to the plurality of PDCCHs on the same PUCCH with the determined uplink beam;

method 12:

when a plurality of downlink beams and a plurality of uplink beams are divided into a plurality of groups, and indication signalings in PDCCHs using downlink beams in the same group indicate uplink beams in the same group, the terminal is determined to execute following operations:
determining that indication contents of indication signalings in PDCCHs received by using downlink beams of the same group are the same;
transmitting a PUCCH carrying an ACK/NACK related to a PDCCH using a downlink beam by an uplink beam determined according to an indication signaling in the PDCCH using the downlink beam, wherein the downlink beam and the uplink beam are in the same group,
wherein indication contents of indication signalings in PDCCHs received by downlink beams of the same group are the same.

10. The method according to claim 9, wherein the selecting the uplink beam from the at least one uplink beam as the uplink beam used for the PUCCH transmission comprises one of the following methods:
method 13:
selecting the uplink beam in the at least one uplink beam as the uplink beam used for the PUCCH transmission according to a pre-configured or appointed uplink beam priority level or cell priority level;
method 14:
when the at least one uplink beam comprises a pre-configured or appointed uplink main beam, determining that the pre-configured or appointed uplink main beam is taken as the uplink beam used for the PUCCH transmission; and
when the at least one uplink beam does not comprise an uplink main beam, determining that an auxiliary beam with a specified number in the at least one beam is taken as the uplink beam used for the PUCCH transmission,
wherein the uplink main beam is pre-configured or appointed;
method 15:
when the at least one uplink beam comprises an uplink beam corresponding to a pre-configured or appointed main cell, determining that the uplink beam corresponding to the pre-configured or appointed main cell is taken as the uplink beam used for the PUCCH transmission; and
when the at least one uplink beam does not comprise an uplink beam corresponding to the main cell, determining that an uplink beam corresponding to an auxiliary cell is taken as the uplink beam used for the PUCCH transmission;
and/or,
the selecting the PDCCH from the plurality of PDCCHs, and determining the uplink beam used for the PUCCH transmission according to the indication signaling received from the selected PDCCH comprises one of the following methods:
method 16:
selecting a PDCCH with a highest priority level from the plurality of PDCCHs according to a pre-configured or appointed downlink beam priority level, downlink beam group priority level or cell priority level, and determining the uplink beam used for the PUCCH transmission according to the indication signaling received from the selected PDCCH;
method 17:
determining the uplink beam used for the PUCCH transmission according to an indication signaling in a PDCCH transmitted by using a downlink main beam; and/or, determining the uplink beam used for the PUCCH transmission according to an indication signaling in a PDCCH received from a main cell;
and,
when no PDCCH transmitted by using the downlink main beam is received or no PDCCH is received from the main cell, determining the uplink beam used for the PUCCH transmission according to an indication signaling in a received PDCCH using a specifically numbered downlink auxiliary beam; and/or, determining the uplink beam used for the PUCCH transmission according to an indication signaling in a PDCCH received from a specifically numbered auxiliary cell,
wherein the downlink main beam and the main cell are pre-configured or appointed;
method 18:
determining the uplink beam used for the PUCCH transmission according to an indication signaling in a PDCCH transmitted by using at least one downlink beam in a downlink main beam group; and
when no PDCCH using any one downlink beam in the downlink main beam group is received, determining the uplink beam used for the PUCCH transmission according to an indication signaling in a PDCCH transmitted by using a downlink beam in an auxiliary beam group, wherein when one beam group comprises a plurality of downlink beams, contents indicated by indication signalings in the plurality of PDCCHs needing to perform ACK/NACK feedbacks at the same moment in the same downlink beam group are the same,
wherein the downlink main beam group is pre-configured or appointed.

11. An apparatus, comprising a memory and at least one processor, wherein the at least one processor is configured to read and execute programs stored in the memory to perform the method of claim 6.

12. The apparatus according to claim 11, wherein the at least one processor is further configured to read and execute programs stored in the memory to perform one of the following methods:
method 4:
transmitting the indication signaling through a high-layer signaling;
method 5:
transmitting the indication signaling through a PDCCH;
method 6:
pre-configuring, by a high-layer signaling, a downlink main beam, and determining that the terminal determines an uplink main beam according to the downlink main beam and takes the uplink main beam as the uplink beam used for the PUCCH transmission;
method 7:
pre-configuring, by a high-layer signaling, a main beam pair comprising an uplink main beam and a downlink main beam, and determining that the terminal takes the uplink main beam in the main beam pair as the uplink beam used for the PUCCH transmission;
method 8:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in the first beam group is received, determining that the terminal performs the PUCCH transmission by using a first uplink main beam corresponding to the first beam group, wherein the PUCCH carries at least an ACK/

NACK related to the PDCCH and/or PDSCH transmitted by using the downlink beam in the first beam group;
method 9:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in the first beam group and a PDCCH and/or PDSCH transmitted by using the downlink beam in the second beam group are received, and an ACK/NACK related to the PDCCH and/or PDSCH transmitted by using the downlink beam in the second beam group and an ACK/NACK related to the PDCCH and/or PDSCH transmitted by using the downlink beam in the first beam group are transmitted at the same moment:
determining that the terminal uses a first uplink main beam corresponding to the first beam group to transmit a PUCCH carrying the ACK/NACK related to the PDCCH and/or PDSCH transmitted by using the downlinkbeam in the first beam group; and determining that the terminal uses a second uplink main beam corresponding to the second beam group to transmit the PUCCH carrying the ACK/NACK related to the PDCCH and/or PDSCH transmitted by using the downlink beam in the second beam group;
or,
determining that the terminal uses a first uplink main beam corresponding to the first beam group to transmit the ACK/NACK related to the PDCCH and/or PDSCH transmitted by using the beam in the first beam group and the ACK/NACK related to the PDCCH and/or PDSCH transmitted by using the beam in the second beam group on the same PUCCH;
method 10:
pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a second beam group is received, determining that the terminal performs the PUCCH transmission by using the second uplink main beam corresponding to the second beam group, or determining that the terminal performs the PUCCH transmission by using a first uplink main beam corresponding to a first beam group,
wherein the PUCCH carries an ACK/NACK related to the PDCCH and/or PDSCH transmitted by using the downlink beam in the second beam group.

13. The apparatus according to claim 12, wherein the at least one processor is further configured to read and execute programs stored in the memory to:
determine that the terminal performs the PUCCH transmission with the uplink beam informed by the high-layer signaling when the high-layer signaling informs one uplink beam;
or,
inform, by the high-layer signaling, a plurality of uplink beams, wherein each uplink beam corresponds to a downlink beam or a downlink beams group; and when a Physical Downlink Control Channel (PDCCH) and/or a Physical Downlink Shared Channel (PDSCH) using a downlink beam-x is received, and the downlink beam-x corresponds to a first uplink beam in the plurality of uplink beams informed by the high-layer signaling:
determine that the terminal performs the PUCCH transmission by using the first uplink beam, wherein the PUCCH carries at least an acknowledgement (ACK)/a non-acknowledgement (NACK) related to the PDCCH and/or PDSCH using the downlink beam-x;
or,
inform, by the high-layer signaling, a plurality of uplink beams, wherein each uplink beam corresponds to a downlink beam or a downlink beams group; and when a PDCCH and/or a PDSCH using a downlink beam-x is received, and the downlink beam-x corresponds to a first uplink beam in the plurality of uplink beams informed by the high-layer signaling, a PDCCH and/or a PDSCH using a downlink beam-y is received, and an ACK/NACK related to the PDCCH and/or PDSCH using the downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling:
determine that the terminal uses the first uplink beam to execute a following operation: transmitting the PUCCH configured to carry the ACK/NACK related to the PDCCH and/or PDSCH using the downlink beam-x, and determine that the terminal uses the second uplink beam to execute a following operation: transmitting the PUCCH configured to carry the ACK/NACK related to the PDCCH and/or PDSCH using the downlink beam-y; or,
determine that the terminal uses the first uplink beam to execute a following operation: transmitting the ACK/NACK related to the PDCCH and/or PDSCH using the downlink beam-x and the ACK/NACK related to the PDCCH and/or PDSCH using the downlink beam-y on the same PUCCH;
or,
inform, by the high-layer signaling, a plurality of uplink beams, wherein each uplink beam corresponds to a downlink beam or a downlink beams group; and when the PDCCH and/or PDSCH using the downlink beam-y is received, and the downlink beam-y corresponds to a second uplink beam in the plurality of uplink beams informed by the high-layer signaling:
determine that the terminal performs the PUCCH transmission by using the second uplink beam; or,
determine that the terminal performs the PUCCH transmission by using a first uplink beam, wherein the first uplink beam is different from the second uplink beam;
wherein the PUCCH carries an ACK/NACK related to the PDCCH and/or PDSCH using the downlink beam-y.

14. The apparatus according to claim 12, wherein
when a plurality of PDCCHs are received, and ACK/NACK feedbacks related to the plurality of PDCCHs are transmitted at the same moment, the at least one processor is further configured to read and execute programs stored in the memory to:
scheme 1:
take uplink beams determined based on indication signalings in the plurality of PDCCHs as the uplink beams used for the PUCCH transmission, wherein indication contents of the indication signalings received by the plurality of PDCCHs are the same; and
transmit ACKs/NACKs related to the plurality of PDCCHs on the same PUCCH with the determined uplink beams;
scheme 2:
determine at least one uplink beam based on indication signalings received through the plurality of PDCCHs, and select an uplink beam from the at least one uplink beam as the uplink beam used for the PUCCH transmission; and transmit ACKs/NACKs related to the plurality of PDCCHs on the same PUCCH with the determined uplink beam;

scheme 3:

select a PDCCH from the plurality of PDCCHs, and determine the uplink beam used for the PUCCH transmission according to an indication signaling received from the selected PDCCH; and transmit ACKs/NACKs related to the plurality of PDCCHs on the same PUCCH with the determined uplink beam;

and/or, when a plurality of downlink beams and a plurality of uplink beams are divided into a plurality of groups, and indication signalings in PDCCHs using downlink beams in the same group indicate uplink beams in the same group, the at least one processor is further configured to read and execute programs stored in the memory to:

determine that indication contents of the indication signalings in the PDCCHs received by the downlink beams of the same group are the same;

transmit a PUCCH carrying an ACK/NACK related to a PDCCH using a downlink beam by an uplink beam determined according to an indication signaling in the PDCCH using the downlink beam, wherein the downlink beam and the uplink beam are in the same group, wherein indication contents of indication signalings in PDCCHs received by downlink beams of the same group are the same.

15. The apparatus according to claim 14, wherein the at least one processor is further configured to read and execute programs stored in the memory to:

select the uplink beam in the at least one uplink beam as the uplink beam used for the PUCCH transmission according to a pre-configured or appointed uplink beam priority level or cell priority level;

or, when the at least one uplink beam comprises a pre-configured or appointed uplink main beam, determine that the pre-configured or appointed uplink main beam is taken as the uplink beam used for the PUCCH transmission; and when the at least one uplink beam does not comprise an uplink main beam, determine that an auxiliary beam with a specified number in the at least one beam is taken as the uplink beam used for the PUCCH transmission, wherein the uplink main beam is pre-configured or appointed;

or, when the at least one uplink beam comprises an uplink beam corresponding to a pre-configured or appointed main cell, determine that the uplink beam corresponding to the pre-configured or appointed main cell is taken as the uplink beam used for the PUCCH transmission; and when the at least one uplink beam does not comprise an uplink beam corresponding to the main cell, determine that an uplink beam corresponding to an auxiliary cell is taken as the uplink beam used for the PUCCH transmission;

and/or, select a PDCCH with a highest priority level from the plurality of PDCCHs according to a pre-configured or appointed downlink beam priority level, downlink beam group priority level or cell priority level, and determine the uplink beam used for the PUCCH transmission according to an indication signaling received from the selected PDCCH;

or, determine the uplink beam used for the PUCCH transmission according to an indication signaling in a PDCCH transmitted by using a downlink main beam; and/or, determine the uplink beam used for the PUCCH transmission according to an indication signaling in a PDCCH received from a main cell;

and, when no PDCCH transmitted by using the downlink main beam is received or no PDCCH is received from the main cell, determine the uplink beam used for the PUCCH transmission according to an indication signaling in a received PDCCH using a specifically numbered downlink auxiliary beam; and/or, determine the uplink beam used for the PUCCH transmission according to an indication signaling in a PDCCH received from a specifically numbered auxiliary cell, wherein the downlink main beam and the main cell are pre-configured or appointed;

or, determine the uplink beam used for the PUCCH transmission according to an indication signaling in a PDCCH transmitted by at least one downlink beam in a downlink main beam group; and when no PDCCH using any one downlink beam in the downlink main beam group is received, determine the uplink beam used for the PUCCH transmission according to an indication signaling in a PDCCH transmitted by using a downlink beam in an auxiliary beam group, wherein when one beam group comprises a plurality of downlink beams, contents indicated by indication signalings in the plurality of PDCCHs needing to perform ACK/NACK feedbacks at the same moment in the same downlink beam group are the same, wherein the downlink main beam group is pre-configured or appointed.

16. User Equipment (UE), comprising a memory and at least one processor, wherein the at least one processor is configured to read and execute programs stored in the memory to:

determine an uplink beam used for Physical Uplink Control Channel (PUCCH) transmission based on an acquired indication signaling; and perform the PUCCH transmission with the determined uplink beam;

wherein the at least one processor is further configured to read and execute programs stored in the memory to:

determine a Beam Pair Linkage (BPL) based on the acquired indication signaling; the BPL is configured to determine the uplink beam used for the PUCCH transmission or a Quasi-Co-Location (QCL) relationship between a Demodulation Reference Signal (DMRS) port of the PUCCH and a port on a resource of a first reference signal; and perform the PUCCH transmission with an uplink beam corresponding to the BPL; or, determine the QCL relationship between a DMRS port of the PUCCH and a port on the resource of the first reference signal according to the BPL, and perform the PUCCH transmission by the QCL relationship;

or, determine a beam index for identifying the uplink beam for the PUCCH transmission based on the acquired indication signaling; and perform the PUCCH transmission with the uplink beam corresponding to the beam index;

or, determine QCL relationships between a DMRS port of the PUCCH and all ports or appointed ports on a resource of a first reference signal based on the acquired indication signaling; and perform the PUCCH transmission by the QCL relationships;

wherein the at least one processor is configured to read and execute programs stored in the memory to:

determine a resource of a first reference signal in a plurality of pre-configured resources of the first reference signal based on the acquired indication signaling, and determine that a DMRS port of the PUCCH and a port on the determined resource of the first reference signal have a QCL relationship; and perform the PUCCH transmission by the QCL relationship;

or, determine a resource of a first reference signal in a plurality of pre-configured resources of the first reference signal and at least one port on the determined resource of the first reference signal based on the acquired indication signaling, and determine that a DMRS port of the PUCCH and the at least one port on the determined resource of the first reference signal have a QCL relationship;

perform the PUCCH transmission by the QCL relationship.

17. The UE according to claim 16, wherein the at least one processor is configured to read and execute programs stored in the memory to perform one of the following methods:

method 4:

determining the uplink beam used for the PUCCH transmission based on the acquired high-layer signaling;

method 5:

determining the uplink beam used for the PUCCH transmission based on the indication signaling received from a PDCCH;

method 6:

pre-configuring, by a high-layer signaling, a downlink main beam, determining an uplink main beam according to the downlink main beam, and determining that the uplink main beam is taken as the uplink beam used for the PUCCH transmission;

method 7:

pre-configuring, by a high-layer signaling, a main beam pair comprising an uplink main beam and a downlink main beam, and determining that the uplink main beam in the main beam pair is taken as the uplink beam used for the PUCCH transmission;

method 8:

pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a first beam group is received, determining that a first uplink main beam corresponding to the first beam group is used for the PUCCH transmission, wherein the PUCCH carries at least an ACK/NACK related to the PDCCH and/or PDSCH transmitted by using the downlink beam in the first beam group;

method 9:

pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a first beam group and a PDCCH and/or PDSCH transmitted by using the downlink beam in a second beam group are received, and an ACK/NACK related to the PDCCH and/or PDSCH transmitted by using the downlink beam in the second beam group and an ACK/NACK related to the PDCCH and/or PDSCH transmitted by using the downlink beam in the first beam group are transmitted at the same moment:

determining that a first uplink main beam corresponding to the first beam group is used to transmit a PUCCH carrying the ACK/NACK related to the PDCCH and/or PDSCH transmitted by using the downlink beam in the first beam group; and determining that a second uplink main beam corresponding to the second beam group is used to transmit a PUCCH carrying the ACK/NACK related to the PDCCH and/or PDSCH transmitted by using the downlink beam in the second beam group;

or, determining that a first uplink main beam corresponding to the first beam group is used to transmit the ACK/NACK related to the PDCCH and/or PDSCH transmitted by using the beams in the first beam group and the ACK/NACK related to the PDCCH and/or PDSCH transmitted by using the beams in the second beam group on the same PUCCH;

method 10:

pre-configuring, by a high-layer signaling, a plurality of beam groups, wherein each beam group corresponds to an uplink main beam, and each beam group comprises one or more downlink beams; when a PDCCH and/or PDSCH transmitted by using a downlink beam in a second beam group is received, determining that a second uplink main beam corresponding to the second beam group is used for the PUCCH transmission, or determining that a first uplink main beam corresponding to a first beam group is used for the PUCCH transmission, wherein the PUCCH carries an ACK/NACK related to the PDCCH and/or PDSCH transmitted by using the downlink beam in the second beam group.

18. The UE according to claim 17, wherein when the high-layer signaling informs an uplink beam, the at least one processor is configured to read and execute programs stored in the memory to determine that the uplink beam informed by the high-layer signaling is used to perform the PUCCH transmission based on the acquired high-layer signaling;

or, when the high-layer signaling informs a plurality of uplink beams, and each uplink beam corresponds to a downlink beam or a downlink beams group, the at least one processor is configured to read and execute programs stored in the memory to:

when a Physical Downlink Control Channel (PDCCH) and/or a Physical Downlink Shared Channel (PDSCH) using a downlink beam-x is received, and the downlink beam-x corresponds to a first uplink beam in the plurality of uplink beams informed by the high-layer signaling:

determine that the first uplink beam is used for the PUCCH transmission, wherein the PUCCH carries at least an acknowledgement (ACK)/a non-acknowledgement (NACK) related to the PDCCH and/or PDSCH using the downlink beam-x;

or, when the high-layer signaling informs a plurality of uplink beams, and each uplink beam corresponds to a downlink beam or a downlink beams group, the at least one processor is configured to read and execute programs stored in the memory to:

when a PDCCH and/or a PDSCH using a downlink beam-x is received, and the downlink beam-x corresponds to a first uplink beam in the plurality of uplink beams informed by the high-layer signaling, a PDCCH and/or a PDSCH using a downlink beam-y is received, and an ACK/NACK related to the PDCCH and/or PDSCH using a downlink beam-y and an ACK/NACK related to the PDCCH and/or PDSCH using the downlink beam-x need to be transmitted at the same moment, and the downlink beam-y corresponds to a second uplink beam in the plurality of uplink beams informed by the high-layer signaling:

determine that the first uplink beam is used to execute a following operation: transmitting the PUCCH that carries the ACK/NACK related to the PDCCH and/or PDSCH using the downlink beam-x, and determine that the second uplink beam is used to execute a following operation: transmitting the PUCCH that carries the ACK/NACK related to the PDCCH and/or PDSCH using the downlink beam-y; or, determine that the first uplink beam is used to execute a following operation: transmitting the ACK/NACK related to the PDCCH and/or PDSCH using the downlink beam-x and the ACK/NACK related to the PDCCH and/or PDSCH using the downlink beam-y on the same PUCCH;

or, when the high-layer signaling informs a plurality of uplink beams, and each uplink beam corresponds to a downlink beam or a downlink beams group, the at least one processor is configured to read and execute programs stored in the memory to:

when a PDCCH and/or PDSCH using a downlink beam-y is received, and the downlink beam-y corresponds to a second uplink beam in the plurality of beams informed by the high-layer signaling:

determine that the second uplink beam is used to perform the PUCCH transmission; or, determine that a first uplink beam is used to perform the PUCCH transmission, wherein the first uplink beam is different from the second uplink beam, wherein the PUCCH carries an ACK/NACK related to the PDCCH and/or PDSCH using the downlink beam-y.

19. The UE according to claim 17, wherein when a plurality of PDCCHs are received, and ACK/NACK feedbacks related to the plurality of PDCCHs are transmitted at the same moment, the at least one processor is configured to read and execute programs stored in the memory to:

scheme 1:

take uplink beams determined based on indication signalings in the plurality of PDCCHs as uplink beams used for the PUCCH transmission, wherein indication contents of the indication signalings received by the plurality of PDCCHs are the same; and transmit ACKs/NACKs related to the plurality of PDCCHs on the same PUCCH with the determined uplink beams;

scheme 2:

determine at least one uplink beam based on indication signalings received through the plurality of PDCCHs, and select an uplink beam from the at least one uplink beam as the uplink beam used for the PUCCH transmission; and transmit ACKs/NACKs related to the plurality of PDCCHs on the same PUCCH with the determined uplink beam;

scheme 3:

select a PDCCH from the plurality of PDCCHs, and determine the uplink beam used for the PUCCH transmission according to an indication signaling received from the selected PDCCH; and transmit ACKs/NACKs related to the plurality of PDCCHs on the same PUCCH with the determined uplink beam;

and/or, when a plurality of downlink beams and a plurality of uplink beams are divided into a plurality of groups, and indication signalings in PDCCHs using downlink beams in the same group indicate uplink beams in the same group, the at least one processor is configured to read and execute programs stored in the memory to:

determine that indication contents of the indication signalings in the PDCCHs received by the downlink beams of the same group are the same;

transmit a PUCCH carrying an ACK/NACK related to a PDCCH using a downlink beam by an uplink beam determined according to an indication signaling in the PDCCH using the downlink beam, wherein the downlink beam and the uplink beam are in the same group, wherein indication contents of indication signalings in PDCCHs received by downlink beams of the same group are the same.

20. The UE according to claim 19, wherein the at least one processor is configured to read and execute programs stored in the memory to:

select the uplink beam in the at least one uplink beam as the uplink beam used for the PUCCH transmission according to a pre-configured or appointed uplink beam priority level or cell priority level;

or, when the at least one uplink beam comprises a pre-configured or appointed uplink main beam, determine that the pre-configured or appointed uplink main beam is taken as the uplink beam used for the PUCCH transmission; and when the at least one uplink beam does not comprise an uplink main beam, determine that an auxiliary beam with a specified number in the at least one uplink beam is taken as the uplink beam used for the PUCCH transmission, wherein the uplink main beam is pre-configured or appointed;

or, when the at least one uplink beam comprises an uplink beam corresponding to a pre-configured or appointed main cell, determine that the uplink beam corresponding to the pre-configured or appointed main cell is taken as the uplink beam used for the PUCCH transmission; and when the at least one uplink beam does not comprise an uplink beam corresponding to a main cell, determine that an uplink beam corresponding to an auxiliary cell is taken as the uplink beam used for the PUCCH transmission;

and/or, select a PDCCH with a highest priority level from the plurality of PDCCHs according to a pre-configured or appointed downlink beam priority level, downlink beam group priority level or cell priority level, and determine the uplink beam used for the PUCCH transmission according to the indication signaling received from the selected PDCCH;

or, determine the uplink beam used for the PUCCH transmission according to an indication signaling in a PDCCH transmitted by using a downlink main beam; and/or, determine the uplink beam used for the PUCCH transmission according to an indication signaling in a PDCCH received from a main cell;

and, when no PDCCH transmitted by using the downlink main beam is received or no PDCCH is received from the main cell, determine the uplink beam used for the PUCCH transmission according to an indication signaling in a received PDCCH using a specifically numbered downlink auxiliary beam; and/or, determine the uplink beam used for the PUCCH transmission according to an indication signaling in a PDCCH received from a specifically numbered auxiliary cell, wherein the downlink main beam and the main cell are pre-configured or appointed;

or, determine the uplink beam used for the PUCCH transmission according to an indication signaling in a PDCCH transmitted by at least one downlink beam in a downlink main beam group; and when no PDCCH using any one downlink beam in the downlink main beam group is received, determine the uplink beam used for the PUCCH transmission according to an indication signaling in a PDCCH transmitted by using a downlink beam in an auxiliary beam group, wherein when a beam group comprises a plurality of downlink beams, contents indicated by indication signalings in the plurality of PDCCHs needing to perform ACK/NACK feedbacks at the same moment in the same downlink beam group are the same, wherein the downlink main beam group is pre-configured or appointed.

* * * * *